United States Patent
Kamiya et al.

(10) Patent No.: US 11,996,018 B2
(45) Date of Patent: May 28, 2024

(54) DISPLAY CONTROL DEVICE AND DISPLAY CONTROL PROGRAM PRODUCT

(71) Applicant: DENSO CORPORATION, Kariya (JP)

(72) Inventors: Akira Kamiya, Kariya (JP); Takamitsu Suzuki, Kariya (JP); Takashi Ichida, Kariya (JP); Takeshi Hatoh, Kariya (JP); Kazuki Kojima, Kariya (JP); Daisuke Takemori, Kariya (JP)

(73) Assignee: DENSO CORPORATION, Kariya (JP)

( * ) Notice: Subject to any disclaimer, the term of this patent is extended or adjusted under 35 U.S.C. 154(b) by 338 days.

(21) Appl. No.: 17/568,638

(22) Filed: Jan. 4, 2022

(65) Prior Publication Data

US 2022/0130296 A1 Apr. 28, 2022

Related U.S. Application Data

(63) Continuation of application No. PCT/JP2020/025131, filed on Jun. 26, 2020.

(30) Foreign Application Priority Data

Jul. 8, 2019 (JP) ................................. 2019-127113
Sep. 23, 2019 (JP) ................................. 2019-172399
Jun. 22, 2020 (JP) ................................. 2020-107105

(51) Int. Cl.
*G09G 3/00* (2006.01)
*B60K 35/00* (2006.01)
(Continued)

(52) U.S. Cl.
CPC ............. *G09G 3/002* (2013.01); *B60K 35/00* (2013.01); *G01C 21/367* (2013.01); *G06V 20/58* (2022.01);
(Continued)

(58) Field of Classification Search
CPC ...... G09C 3/002; G06V 20/58; G06V 20/588; G60K 35/00; G60K 35/23; G60K 35/28;
(Continued)

(56) References Cited

U.S. PATENT DOCUMENTS 10,279,824 B2 *  5/2019  Trammell ........... B61L 15/0072
10,502,955 B2 * 12/2019  Kimura .................. B60K 35/81
(Continued)

FOREIGN PATENT DOCUMENTS

JP     2005202787 A    7/2005
JP      201170521 A    4/2011
(Continued)

*Primary Examiner* — Andrew Joseph Rudy
(74) *Attorney, Agent, or Firm* — Harness, Dickey & Pierce, P.L.C.

(57) ABSTRACT

A display control device mounted on a vehicle: determines whether a caution point exists in front of a vehicle; determines whether the caution point is included in an angle of view of a head-up display mounted on the vehicle; displays a caution content as a superimposed content with the caution point as a superimposition target in response to the caution point being determined to be included in the angle of view; displays the caution content as a non-superimposed content with no superimposition target in response to the caution point being determined to be not included in the angle of view; determines a type of the caution point; displays the caution content associated with the determined type of the caution point.

36 Claims, 27 Drawing Sheets

(51) Int. Cl.
*G01C 21/36* (2006.01)
*G06V 20/56* (2022.01)
*G06V 20/58* (2022.01)
*G08G 1/005* (2006.01)
*G08G 1/16* (2006.01)
*B60K 35/23* (2024.01)
*B60K 35/28* (2024.01)
*B60K 35/81* (2024.01)

(52) U.S. Cl.
CPC ........... *G06V 20/588* (2022.01); *G08G 1/005* (2013.01); *G08G 1/166* (2013.01); *B60K 35/23* (2024.01); *B60K 35/28* (2024.01); *B60K 35/81* (2024.01); *B60K 2360/179* (2024.01); *G09G 2340/12* (2013.01); *G09G 2380/10* (2013.01)

(58) Field of Classification Search
CPC ............ G60K 35/81; G60K 2360/179; G01C 21/367; G08G 1/005; G08G 1/66; G09G 2340/12; G09G 2380/10
USPC .......................................................... 701/100
See application file for complete search history.

(56) References Cited

U.S. PATENT DOCUMENTS

| | | | |
|---|---|---|---|
| 10,699,486 B2* | 6/2020 | Tanaka | G09G 3/02 |
| 11,009,781 B2* | 5/2021 | Taniguchi | G06F 9/3004 |
| 11,022,795 B2* | 6/2021 | Ogawa | G06T 7/70 |
| 11,189,250 B2* | 11/2021 | Hato | G02B 27/0101 |
| 11,629,972 B2* | 4/2023 | Kassner | G01C 21/3415 |
| | | | 701/431 |
| 11,710,429 B2* | 7/2023 | Kamiya | G09G 5/00 |
| | | | 345/7 |
| 2005/0125121 A1 | 6/2005 | Isaji et al. | |
| 2016/0327402 A1 | 11/2016 | Funabiki et al. | |
| 2017/0309257 A1 | 10/2017 | Akita et al. | |
| 2019/0080496 A1* | 3/2019 | Wakatsuki | B60R 1/00 |
| 2021/0356289 A1* | 11/2021 | Horihata | G01C 21/365 |
| 2023/0016174 A1* | 1/2023 | Choi | G02B 27/0179 |

FOREIGN PATENT DOCUMENTS

| | | |
|---|---|---|
| JP | 2013237290 A | 11/2013 |
| WO | WO-2015118859 A1 | 8/2015 |
| WO | WO-2016067574 A1 | 5/2016 |

* cited by examiner

DISPLAY CONTROL DEVICE AND DISPLAY CONTROL PROGRAM PRODUCT

CROSS REFERENCE TO RELATED APPLICATIONS

The present application is a continuation application of International Patent Application No. PCT/JP2020/025131 filed on Jun. 26, 2020, which designated the U.S. and claims the benefit of priority from Japanese Patent Application No. 2019-127113 filed on Jul. 8, 2019, Japanese Patent Application No. 2019-172399 filed on Sep. 23, 2019, Japanese Patent Application No. 2020-107105 filed on Jun. 22, 2020. The entire disclosures of all of the above applications are incorporated herein by reference.

TECHNICAL FIELD

The present disclosure relates to a display control device and a display control program product each of which controls a display of virtual image.

BACKGROUND

Conventionally, vehicle-mounted display device that displays contents using a head-up display in superimposed manner is known.

SUMMARY

The present disclosure provides a display control device mounted on a vehicle. The display control device: determines whether a caution point exists in front of a vehicle; determines whether the caution point is included in an angle of view of a head-up display mounted on the vehicle; displays a caution content as a superimposed content with the caution point as a superimposition target in response to the caution point being determined to be included in the angle of view; displays the caution content as a non-superimposed content with no superimposition target in response to the caution point being determined to be not included in the angle of view; determines a type of the caution point; displays the caution content associated with the determined type of the caution point.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
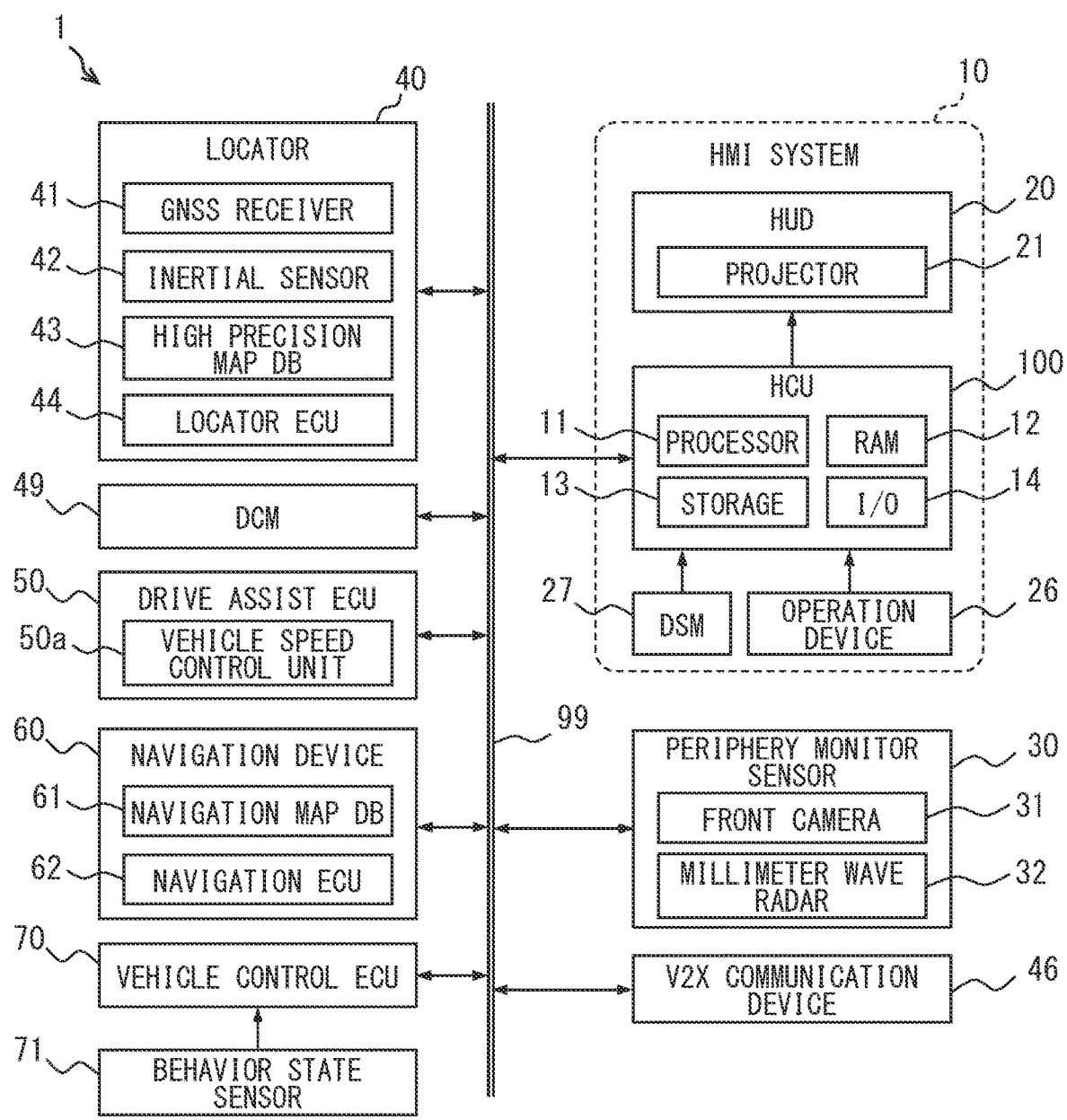
FIG. 1 is a diagram showing an overview of an in-vehicle network including a HCU according to a first embodiment of the present disclosure.

Before describing embodiments of the present disclosure, a display device for vehicle use purpose will be described. A display vehicle mounted on a vehicle displays contents using a head-up display in superimposed manner. This kind of vehicle display device superimposes and displays a content indicating a route from a position of the own vehicle to a guidance point existing in a front view of a driver.

It is conceivable to display, in a superimposed manner, a content indicating existence of a temporary stop point by using the technique of head-up display. However, depending on a surrounding condition, such as a road structure, a situation may occur in which the temporary stop point is not included in an angle of view and the display content cannot be superimposed and displayed on the temporary stop point. In this case, the content is not displayed until the temporary stop point is included in the angle of view. This may cause an inconvenience to an occupant of the vehicle.

According to an aspect of the present disclosure, a display control device used in a vehicle to control a display on a head-up display includes: a point determination unit determining whether a caution point exists in front of the vehicle along a traveling direction of the vehicle; an angle of view determination unit determining whether the caution point is included in an angle of view of the head-up display; and a display control unit displaying a caution content notifying an existence of the caution point to an occupant of the vehicle in response to the point determination unit determining the existence of the caution point. The display control unit displays the caution content as a superimposed content, which is displayed with the caution point as a superimposition target, in response to the angle of view determination unit determining that the caution point is included in the angle of view. The display control unit displays the caution content as a non-superimposed content, which is displayed with no superimposition target, in response to the angle of view determination unit determining that the caution point is not included in the angle of view. The point determination unit determines a type of the caution point. The display control unit notifies the existence of the caution point to the occupant by displaying the caution content associated with the type of the caution point determined by the point determination unit.

According to another aspect of the present disclosure, a display control device used in a vehicle to control a display on a head-up display includes: a point determination unit determining whether a caution point exists in front of the vehicle along a traveling direction of the vehicle; an angle of view determination unit determining whether the caution point is included in an angle of view of the head-up display; a display control unit displaying a caution content notifying an existence of the caution point to an occupant of the vehicle in response to the point determination unit determining the existence of the caution point; and a control information acquisition unit that acquires control information output from a vehicle speed control unit, the vehicle speed control unit controlling a traveling speed of the vehicle. The display control unit displays the caution content as a superimposed content, which is displayed with the caution point as a superimposition target, in response to the angle of view determination unit determining that the caution point is included in the angle of view. The display control unit displays the caution content as a non-superimposed content, which is displayed with no superimposition target, in response to the angle of view determination unit determining that the caution point is not included in the angle of view. In response to the vehicle speed control unit executing a deceleration control before the caution point, the display control unit displays a deceleration notification content with an execution section of the deceleration control as a superimposition target.

According to another aspect of the present disclosure, a display control program product used in a vehicle to control a display on a head-up display is provided. The display control program product is stored in a computer-readable non-transitory tangible storage medium, and includes instructions to be executed by a processor. The instructions include: determining whether a caution point exists in front of the vehicle along a traveling direction of the vehicle; determining a type of the caution point; determining whether the caution point is included in an angle of view of the head-up display; in response to determining that the caution point existing in front of the vehicle and being included in the angle of view, displaying a caution content as a superimposed content, which is displayed with the caution point as a superimposition target, the caution content indicating an existence of the caution point and being displayed associated with the determined type of the caution point; and in response to determining that the caution point existing in front of the vehicle and being not included in the angle of view, displaying the caution content as a non-superimposed content, which is displayed with no superimposition target, the caution content being displayed associated with the determined type of the caution point.

According to another aspect of the present disclosure, a display control program product used in a vehicle to control a display on a head-up display is provided. The display control program product is stored in a computer-readable non-transitory tangible storage medium, and includes instructions to be executed by a processor. The instructions include: determining whether a caution point exists in front of the vehicle along a traveling direction of the vehicle; determining whether the caution point is included in an angle of view of the head-up display; acquiring control information output from a vehicle speed control unit, the vehicle speed control unit controlling a traveling speed of the vehicle; in response to determining that the caution point existing in front of the vehicle and being included in the angle of view, displaying a caution content as a superimposed content, which is displayed with the caution point as a superimposition target, the caution content indicating an existence of the caution point; in response to determining that the caution point existing in front of the vehicle and being not included in the angle of view, displaying the caution content as a non-superimposed content, which is displayed with no superimposition target; and in response to the vehicle speed control unit executing a deceleration control before the caution point, the display control unit displays a deceleration notification content with an execution section of the deceleration control as a superimposition target.

According to the above device and method, when a caution point is included in the angle of view, the caution content is displayed as superimposed content, and when the caution point is not included in the angle of view, the caution content is displayed as non-superimposed content. Thus, even when the caution point is not included in the angle of view and thereby causing the caution content being displayed as the non-superimposed content, the existence of the caution point can be notified to the occupant by the caution content which is displayed as the non-superimposed content. As described above, it is possible to provide a display control device and a display control program product each of which is capable of displaying contents with improved convenience.

First Embodiment

Figure 2:
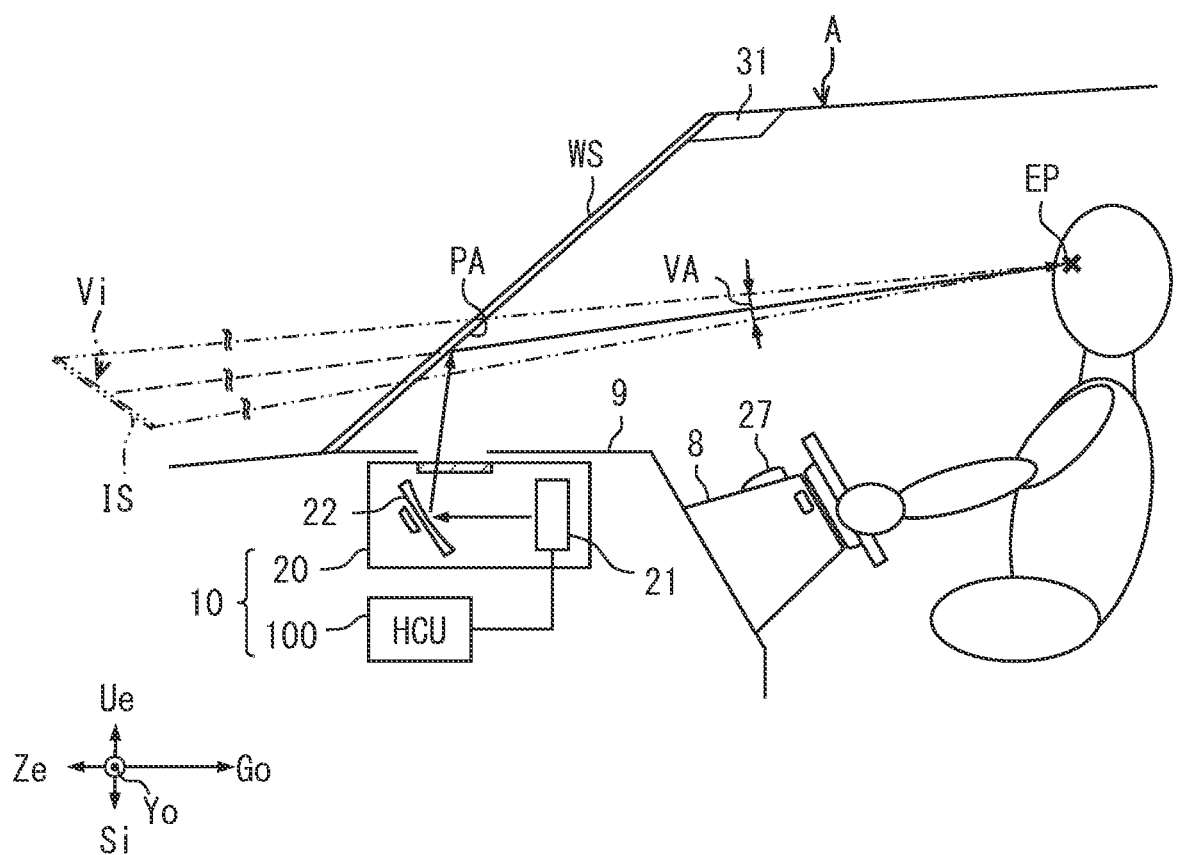
FIG. 2 is a diagram showing a head-up display mounted on a vehicle.

A human machine interface control unit (HCU) 100 shown in FIG. 1 and FIG. 2 executes functions of a display control device according to the first embodiment of the present disclosure. The HCU 100 configures a human machine interface (HMI) system 10 in a vehicle A with a head-up display (hereinafter referred to as HUD) 20. The HMI system 10 further includes an operation device 26 and a driver status monitor (DSM) 27. The HMI system 10 has an input interface function that accepts an operation made by a user (for example, a driver) of the vehicle A, and an output interface function that presents information to a driver.

The HMI system 10 is communicably connected to a communication bus 99 of an in-vehicle network 1 mounted on the vehicle A. The HMI system 10 is one of nodes connected to the in-vehicle network 1. As the nodes, for example, a periphery monitoring sensor 30, a locator 40, a vehicle to everything (V2X) communication device 46, and a data communication module (DCM) 49 are connected to the communication bus 99 of the in-vehicle network 1. A driving assistance electronic control unit (driving assistance ECU) 50, a navigation device 60, and a vehicle control ECU 70 may be connected to the communication bus 99 as the nodes. The multiple nodes connected to the communication bus 99 can communicate with one another. It should be noted that specific nodes among the multiple devices and the multiple ECUs may be directly electrically connected with one another and can communicate with one other without using the communication bus 99.

In the following description, a front-rear direction (see FIG. 2, Ze corresponding to forward, and Go corresponding to rearward) and a left-right (see FIG. 2, Yo corresponding to sideways) are defined with reference to the vehicle A motionlessly stationed on a horizontal plane. Specifically, the front-rear direction is defined along a longitudinal direction (traveling direction) of the vehicle A. The left-right direction is defined along a width direction of the vehicle A. A vertical direction (see FIG. 2, Ue corresponding to upward and Si corresponding to downward) is defined along a direction vertical to the horizontal plane that defines the front-rear direction and the left-right direction. For simplifying the description, the description of the reference numerals indicating each direction will be omitted as appropriate in the following description.

The periphery monitoring sensor 30 is an autonomous sensor that monitors a periphery environment of the vehicle A. The periphery monitoring sensor 30 can detect moving objects and stationary objects in a detection range around the subject vehicle. For example, the moving objects may include pedestrians, cyclists, non-human animals, and other vehicles, and the stationary objects may include falling objects on the road, guardrails, curbs, road markings, lane markings, structures beside the road. The periphery monitoring sensor 30 provides detection information of detecting an object around the vehicle A to the driving assistance ECU 50 and the like via the communication bus 99.

The periphery monitoring sensor 30 includes a front camera 31, one or more millimeter wave radars 32, and the like as detection configurations for object detection. The front camera 31 outputs, as detection information, at least one of image data obtained by photographing a front range of the vehicle A or an analysis result of the image data. The multiple millimeter wave radars 32 are arranged, for example, on front and rear bumpers of the vehicle A at intervals from one another. The millimeter wave radars 32 emit millimeter waves or quasi-millimeter waves toward the front range, a front side range, a rear range, and a rear side range of the vehicle A. Each millimeter wave radar 32 generates detection information by a process of receiving millimeter waves reflected by moving objects, stationary objects, or the like. The periphery monitoring sensor 30 may further include detection configurations such as one or more LiDARs and/or one or more sonars.

The locator 40 generates highly accurate position information of the vehicle A by a complex positioning method that combines multiple types and pieces of acquired information. The locator 40 can specify a travelling lane in which the vehicle A is travelling among multiple lanes. The locator 40 includes a global navigation satellite system (GNSS) receiver 41, an inertial sensor 42, a high-precision map database (hereinafter referred to as a high-precision map DB) 43, and a locator ECU 44.

The GNSS receiver 41 receives positioning signals transmitted from multiple artificial satellites, such as positioning satellites. The GNSS receiver 41 is capable of receiving positioning signals transmitted from respective positioning satellites of at least one satellite positioning system among multiple satellite positioning systems such as GPS, GLONASS, Galileo, IRNSS, QZSS, and Beidou.

For example, the inertial sensor 42 includes a gyro sensor and an acceleration sensor The high-precision map DB 43 is mainly provided in a non-volatile memory, and stores map data (hereinafter referred to as high-precision map data) with higher accuracy than that used in a general-purpose navigation device. The high-precision map data at least includes height (z) direction information in details. The high-precision map data includes information that can be used for advanced driving assistance and autonomous driving, such as three-dimensional shape information about roads (road structure information), information about the number of lanes, and information indicating a travelling direction allowed for each lane.

The locator ECU 44 mainly includes a microcomputer equipped with a processor, a RAM, a storage unit, an input/output interface, and a bus connecting these elements. The locator ECU 44 combines positioning signals received by the GNSS receiver 41, measurement result of the inertial sensor 42, vehicle speed information output to the communication bus 99, and the like. Then, the locator ECU 44 successively specifies a position and a travelling direction of the own vehicle A based on the combined information. The locator ECU 44 provides, through the communication bus 99, position information and direction information of the vehicle A specified based on the positioning result to the HCU 100 and the driving assistance ECU 50.

The vehicle speed information indicates a current traveling speed of the vehicle A, and is generated based on a detection signal of a wheel speed sensor equipped to a hub portion of each wheel of the vehicle A. The node (ECU) that generates the vehicle speed information and outputs the vehicle speed information to the communication bus 99 may be appropriately changed. For example, a brake control ECU that controls a distribution of braking force for the wheels or an in-vehicle ECU such as the HCU 100 may be electrically connected to the wheel speed sensor of each wheel, and successively acquires vehicle speed information and outputs the vehicle speed information to the communication bus 99.

The locator ECU 44 is configured to determine whether requested high-precision map data is stored in the high-precision map DB 43 in response to a request from the HCU 100 and the driving assistance ECU 50. When the requested high-precision map data is stored in the high-precision map DB 43, the locator ECU 44 reads the corresponding high-precision map data from the high-precision map DB 43 and provides it to the request source ECU.

The V2X communication device 46 is a communication module (also referred to as a communication device) mounted on the vehicle A. Among communications, such as road-to-vehicle communication, vehicle-to-vehicle communication, pedestrian-to-vehicle communication, the V2X communication device 46 at least has the road-to-vehicle communication function. As an example, the V2X communication device 46 performs a wireless communication using radio waves or optical communication with a roadside device as the road-to-vehicle communication. Herein the roadside device may be installed at a roadside near an intersection or a pedestrian crossing. The roadside device detects pedestrians or cyclists crossing the road using a detection device (corresponding to a detection unit) such as a camera, and transmits detection information toward the V2X communication device 46 of the vehicle A located within a predetermined range. The V2X communication device 46 may provide the detection information received via the road-to-vehicle communication to the HCU 100 through the communication bus 99.

The V2X communication device 46 has a function as a three-media receiver capable of receiving FM multiplex broadcasting, radio wave beacons and optical beacons. The V2X communication device 46 receives VICS (registered trademark, vehicle information and communication system) information for notifying a traffic congestion section, a road construction section RcS (see FIG. 16), and the like. The navigation device 60 provides congestion information and traffic restriction information provided as VICS information to the driving assistance ECU 50, the navigation device 60, the HCU 100, and the like through the communication bus 99.

The DCM 49 is a communication module (also referred to as a communication device) mounted on the vehicle A. The DCM 49 transmits and receives radio waves to and from base stations around the vehicle A by wireless communication under communication standards, such as long term evolution (LTE) or 5G. By installing the DCM 49, the vehicle A is able to connect to the Internet. The DCM 49 can acquire latest high-precision map data from a cloud-based probe server. The DCM 49 cooperates with the locator ECU 44 to update the high-precision map data stored in the high-precision map DB 43 to the acquired latest high-precision map data.

The driving assistance ECU 50 mainly includes a computer equipped with a processor, RAM, a storage unit, an input/output interface, a bus connecting these elements, and the like. The driving assistance ECU 50 has a driving assistance function to assist the driving operation of a driver. For example, the driving assistance ECU 50 enables partial automated driving control (advanced driving assistance) of the level 2 or lower in the automatic driving level specified by Society of Automotive Engineers.

The driving assistance ECU 50 recognizes a traveling environment around the vehicle A based on the detection information acquired from the periphery monitoring sensor 30. The driving assistance ECU 50 is configured to provide the HCU 100 with the analysis result of the detection information as analyzed detection information. The analysis of the detection information is carried out for recognizing the driving environment of the vehicle. As an example, the driving assistance ECU 50 can provide the HCU 100 with relative positions of the left and right lane markings of the travelling lane of the vehicle A (hereinafter referred to as own travelling lane Lns, refer to FIG. 4) or relative positions of road edges. As described above, the left-right direction referred herein is a direction that coincides with the width direction of the vehicle A motionlessly stationed on the horizontal plane, and is defined with reference to the traveling direction of the vehicle A.

The driving assistance ECU 50 perform multiple functions for providing advanced driving support by executing programs stored in the storage unit using a processor. For example, the driving assistance ECU 50 includes an adaptive cruise control (ACC) controller and a lane trace control (LTC) controller. The ACC controller is a functional unit that performs functions of ACC. The ACC controller controls the vehicle A to travel at a constant speed which is set as a target vehicle speed, or controls the vehicle A to follow a front vehicle A while maintaining a proper distance between the vehicle A and the front vehicle. The LTC controller is a functional unit that performs functions of lane trace control (LTC). LTC is also known as LTA (lane tracing assist). The LTC controller controls the vehicle A to travel within the own travelling lane in cooperation with the ACC controller according to a planned travelling line generated along the own travelling lane Lns.

The driving assistance ECU 50 includes, as a functional unit, a vehicle speed control unit 50*a*. The vehicle speed control unit 50*a* is included in an ACC function unit. The vehicle speed control unit 50*a* has, as auxiliary ACC functions, a limited-access road vehicle speed control function and a general road vehicle speed control function. Herein, limited-access road limits an access by a vehicle having a speed under a predetermined level, and general road has no such kind of access limit. The limited-access road vehicle speed control function and the general road vehicle speed control function control the travelling speed of the vehicle A based on the map data, the traffic congestion information, the traffic restriction information, and the like.

The limited-access road vehicle speed control function may be activated while the vehicle travels on a limited-access road or a motorway. Before a curve section of the limited-access road, the limited-access road vehicle speed control function decreases the speed of the vehicle A that travels under the ACC function to a predetermined speed suitable for traveling the curve section.

The general road vehicle speed control function may be activated while the vehicle travels on an urban road, a major road, and the like. In the general road vehicle speed control function, the vehicle A is automatically decelerated before a curve section, a temporary stop point, a railroad crossing RaC (see FIG. 11), an intersection, a school zone SZ (see FIG. 15), and a road construction section RcS (see FIG. 16). At least a part of the activation targets of the general road vehicle speed control function overlaps with an caution point CP described later. The general road vehicle speed control function can decelerate the vehicle A to 0 km/h, that is, stop the vehicle A. The vehicle speed control unit 50*a* successively outputs, to the HCU 100, control information related to the limited-access road vehicle speed control function and the general road vehicle speed control function.

As will be described later, the general road vehicle speed control function decelerates the vehicle A to a specific speed (for example, 20 km/h), and may not stop the vehicle A. On the premise of such general road vehicle speed control function, the driver needs to perform braking operation to stop the vehicle A during or after the automatic deceleration.

The navigation device 60 searches for a route to a set destination, and guides the vehicle to travel along the route. The navigation device 60 includes a navigation map database (hereinafter referred to as a navigation map DB) 61 and a navigation ECU 62.

The navigation map DB 61 mainly includes a non-volatile memory, and stores map data used for route guidance (hereinafter referred to as navigation map data). The navigation map data includes information such as link data, node data, and shape data of roads. For a specific area, the information stored in the navigation map data is less accurate and less dense than the information stored in the high-precision map data.

The navigation ECU 62 mainly includes a microcomputer, and the microcomputer includes a processor, a RAM, a storage unit, an input output interface, a bus connecting these components. The navigation ECU 62 acquires position information and direction information of the vehicle A, that is, own vehicle from the locator ECU 44 via the communication bus 99. The navigation ECU 62 acquires the operation information input to the operation device 26 through the communication bus 99 and the HCU 100, and sets the destination based on the user operation. The navigation ECU 62 searches for multiple routes to the destination so as to satisfy conditions such as time priority and distance priority. When one of the searched routes is selected, the navigation ECU 62 provides, to the HCU 100 through the communication bus 99, the route information related to the set route together with the related navigation map data.

When the vehicle A approaches a guidance point GP such as an intersection or a branch point included in the set route, the navigation ECU 62 successively outputs a guidance execution request to the HCU 100. At the intersection or the branch point, the vehicle A may make a right turn, a left turn, or a U-turn. For example, the guidance point GP may be set close to a center of an intersection area or a branch area. The intersection area is an area around the intersection, and the branch area is an area around the branch point. The guidance point GP may be set at a point before the intersection area or the branch area. The guidance point GP may be set at a point subsequent to the intersection area or the branch area.

The guidance execution request includes guidance information used for route guidance to the driver. Specifically, the guidance information used for route guidance to the driver includes information about a position of the guidance point GP and information indicating a travelling direction of the vehicle A at the guidance point GP. The guidance execution request is output at a time when a remaining distance Lr1 (see FIG. 4) from the vehicle A to the guidance point GP decreases to be shorter than a first threshold value (for example, about 300 meters). The HCU 100 notifies the information related to route guidance in response to acquiring the guidance execution request from the navigation ECU 62. Instead of the navigation device 60, a user terminal such as a smartphone may be connected to the in-vehicle network 1 or to the HCU 100 by in wired manner or in wirelessly manner as a configuration for providing route guidance to the destination.

The vehicle control ECU 70 mainly includes a microcomputer, and the microcomputer includes a processor, a RAM, a storage unit, an input output interface, a bus connecting these components. The vehicle control ECU 70 controls traveling of the vehicle A based on information from a behavior state sensor 71 and the periphery monitoring sensor 30. The behavior state sensor 71 is configured to detect information related to a behavior of the vehicle A. The behavior state sensor 71 includes a vehicle speed sensor that detects the speed of the vehicle A, a brake pedal sensor that detects a depression amount of a brake pedal, and the like. The behavior state sensor 71 may further include an acceleration sensor that detects an acceleration of the vehicle A, an accelerator pedal sensor that detects a depression amount of an accelerator pedal, a steering angle sensor that detects a steering angle of a steering wheel, and the like.

The following will describe the operation device 26, the DSM 27, the HUD 20, and the HCU 100 included in the HMI system 10 in details with reference to FIG. 1 and FIG. 2.

The operation device 26 is an input portion that receives an operation of user, such as a driver or the like. The operation device 26 receives the user operation for switching, for example, the driving support function and the automatic driving function between an activated state and a deactivated state. Specifically, the operation device 26 includes a steering switch provided on a spoke portion of the steering wheel, an operation lever provided on a steering column portion 8, and a voice input device for detecting the driver's voice or speech.

The DSM 27 includes a near infrared light source, a near infrared camera, and a control unit for controlling the near infrared light source and the near infrared camera. The DSM 27 is installed, for example, on the upper surface of the steering column portion 8 or the upper surface of an instrument panel 9, so that the near-infrared camera faces the headrest portion of the driver's seat. The DSM 27 uses the near-infrared camera to capture the driver's head to which the near-infrared light is emitted from the near-infrared light source. The control unit performs an image analyzing process to the image captured by the near infrared light camera. The control unit extracts information such as the position of the eye point EP and the line-of-sight direction from the captured image, and successively outputs the extracted state information to the HCU 100.

The HUD 20 is mounted on the vehicle A, as one of multiple in-vehicle display devices, along with a meter display, a center information display, and the like. The HUD 20 is electrically connected to the HCU 100, and successively acquires video data generated by the HCU 100. Based on the video data, the HUD 20 presents various information related to the vehicle A, such as route information, sign information, and control information of each in-vehicle function, to the driver using a virtual image Vi.

The HUD 20 is accommodated in a housing space inside the instrument panel 9 below a windshield WS. The HUD 20 projects light formed as the virtual image Vi toward a projection range PA of the windshield WS. The light projected toward the windshield WS is reflected within the projection area PA, and reflected light is transferred toward the driver's seat and is perceived by the driver. The driver visually recognizes a display in which a virtual image Vi is superimposed on a foreground visible through the projection range PA.

The HUD 20 includes a projector 21 and a magnifying optical system 22. The projector 21 includes a liquid crystal display (LCD) panel and a backlight. The projector 21 is fixed to a housing of the HUD 20 so that the display surface of the LCD panel faces the magnifying optical system 22. The projector 21 displays each frame image of the video data on the display surface of the LCD panel, and illuminates the display surface with the backlight that transmits the display surface. Thus, the light formed as a virtual image Vi is emitted toward the magnifying optical system 22. The magnifying optical system 22 includes at least one concave mirror in which metal such as aluminum is vapor-deposited on a surface of base material made of, such as synthetic resin or glass. The magnifying optical system 22 projects the light emitted from the projector 21 on an upper projection range PA while spreading the light by reflection.

In the HUD device 20, an angle of view VA is set. When a virtual range in the space where the virtual image Vi can be imaged by the HUD 20 is defined as an imaging plane IS, the angle of view VA is defined based on a virtual line connecting the driver's eye point EP and an outer edge of the image plane IS. The angle of view VA is a range of angle within which the driver can visually recognize the virtual image Vi when viewed from the eye point EP. In the HUD 20, a horizontal angle of view in the horizontal direction is larger than a vertical angle of view in the vertical direction. When viewed from the eye point EP, a front range that overlaps with the image plane IS is a range of the angle of view VA.

The HUD 20 displays a superimposed content CTs (see FIG. 6) and a non-superimposed content CTn as virtual images Vi. The superimposed content CT is an augmented reality (AR) display object used in AR display. A display position of the superimposed content CTs is associated with a specific superimposition target existing in the foreground, such as a specific position on the road surface, a front vehicle, a pedestrian, and a road sign. The superimposed content CTs is displayed in a superimposed manner on a specific superimposition target in the foreground, and is seemingly fixed relative to the specific superimposition target to be able to follow the specific superimposition target corresponding to a movement of driver's eye line. The relative positional relationship is continuously maintained among the driver's eye point EP, the superimposition target in the foreground, and the superimposed content CTs. Therefore, a shape of the superimposed content CTs may be continuously updated at a predetermined cycle according to the relative position and shape of the superimposition target. For example, the superimposed content CTs is displayed in an orientation closer to horizontal than the non-superimposed content, and has a display shape extended in a depth direction (traveling direction) as seen from the driver.

Among the display objects displayed in the superimposed manner in the foreground, excluding the superimposed content CTs, the remaining non-superimposed content CTn corresponds to a non-AR display object. Unlike the superimposed content CTs, the non-superimposed content CTn is displayed in the superimposed manner on the foreground independently of the superimposition target. The non-superimposed content CTn is displayed at a fixed position within the projection range PA, so that it is displayed as if it is relatively fixed to the vehicle configuration such as the windshield WS.

The HCU 100 is an electronic control unit that integrally controls the display by multiple in-vehicle display devices including the HUD 20 of the HMI system 10. The HCU 100 mainly includes a computer equipped with a processor 11, a RAM 12, a storage unit 13, an input/output interface 14, and a bus connecting these elements. The processor 11 is a hardware combined with the RAM 12, and executes arithmetic processing. The processor 11 is configured to include at least one arithmetic core such as a central processing unit (CPU) and a graphics processing unit (GPU). The processor 11 may be configured to further include a field-programmable gate array (FPGA) and an IP core having other dedicated functions. The RAM 12 may include a video RAM for generating video. The processor 11 accesses the RAM 12 to execute various processes for providing the functions of the respective functional units. The storage unit 13 includes a non-volatile storage medium. The storage unit 13 stores various programs (display control programs, etc.) to be executed by the processor 11.

Figure 3:
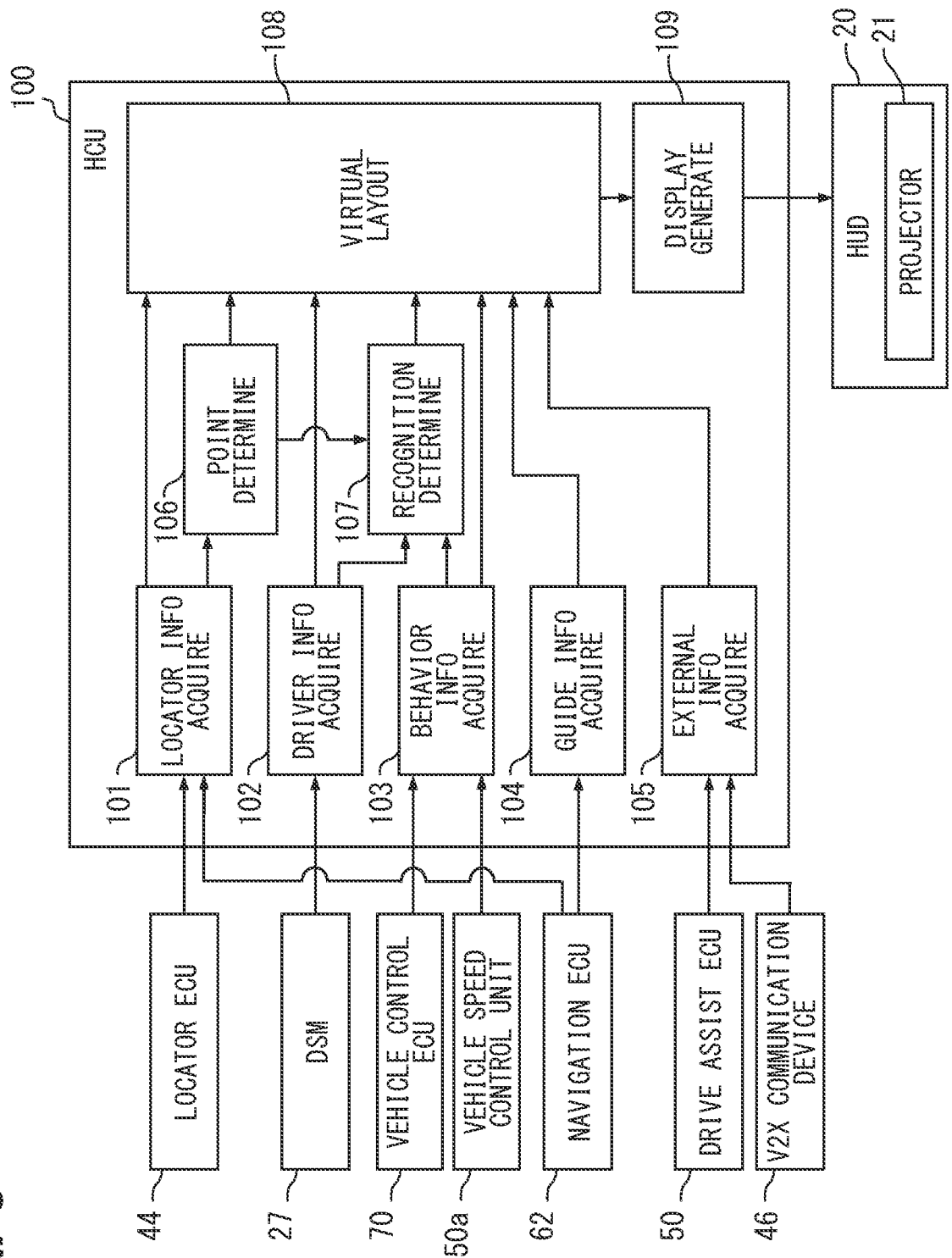
FIG. 3 is a diagram showing an example of a configuration of HCU.

The HCU 100 shown in FIG. 1 to FIG. 3 has multiple functional units for controlling the superimposed display of content by the HUD 20 by executing the display control program stored in the storage unit 13 by the processor 11. Specifically, the HCU 100 includes, as functional units, a locator information acquisition unit 101, a driver information acquisition unit 102, a behavior information acquisition unit 103, a guidance information acquisition unit 104, and an external information acquisition unit 105. The HCU 100 further includes, as functional units, a point determination unit 106, a recognition determination unit 107, a virtual layout unit 108, and a display generation unit 109.

The locator information acquisition unit 101 acquires latest position information and direction information about the vehicle A from the locator ECU 44 as the subject vehicle position information. In addition, the locator information acquisition unit 101 may acquire at least one of the high-precision map data and the navigation map data from the locator ECU 44 or the navigation ECU 62 as the map data of periphery range of the vehicle A. The display generation unit 109 draws the superimposed content CTs by using the map data acquired by the locator information acquisition unit 101.

The high-precision map data and the navigation map data acquired by the locator information acquisition unit 101 include information of a predetermined caution point CP. The caution point CP may be, for example, a point SP where a temporary stop is required by the Road Traffic Act (hereinafter referred to as a temporary stop point) SP, a pedestrian crossing CW (see FIG. 11), a school zone SZ (see FIG. 14), and the like. For example, the information of the temporary stop point SP may be the position coordinates of a central portion of a temporary stop line. The information of the pedestrian crossing CW may be position coordinates of a central portion of a temporary stop line painted together with the pedestrian crossing, position coordinates of four paint marked corners defining a long rectangular shape of the pedestrian crossing. The information of the school zone SZ may be coordinates of a central portion or coordinates of four corners of the school zone mark painted on a road surface.

The locator information acquisition unit 101 preferentially acquires high-precision map data than the navigation map data. The locator information acquisition unit 101 acquires the high-precision map data from the locator ECU 44 about a road range where the high-precision map data is prepared, and acquires navigation map data from the navigation ECU 62 about a road range where the high-precision map data is not prepared as a substitute for the high-precision map data. The locator information acquisition unit 101 determines whether an accuracy of the acquired map data is high or low, in other words, whether the high-precision map data can be acquired. The locator information acquisition unit 101 successively provides, together with information indicating the accuracy of the map data, the acquired vehicle position information and map data to the point determination unit 106 and the virtual layout unit 108.

The driver information acquisition unit 102 identifies, based on status information acquired from the DSM 27, the position and line-of-sight direction of the eye point EP of the driver seated in the driver's seat as driver information. The driver information acquisition unit 102 generates three-dimensional coordinates (hereinafter referred to as eye point coordinates) indicating the position of the eye point EP, and successively provides the generated eye point coordinates to the virtual layout unit 108. The driver information acquisition unit 102 successively provides the eye point coordinates and the line-of-sight direction to the recognition determination unit 107.

The behavior information acquisition unit 103 acquires behavior information related to a behavior of the vehicle A from the vehicle control ECU 70. The behavior information acquisition unit 103 acquires behavior information related to a stop operation of the vehicle A. More specifically, the behavior information acquisition unit 103 acquires, as behavior information, information about the depression amount of brake pedal, information indicating the travelling speed of the vehicle A, and the like. The behavior information acquisition unit 103 successively provides the acquired behavior information to the recognition determination unit 107.

The behavior information acquisition unit 103 acquires, from the vehicle speed control unit 50a, control information of limited-access road vehicle speed control function and control information of general road vehicle speed control function. When the vehicle speed control unit 50a performs deceleration control, the behavior information acquisition unit 103 acquires, as control information of the vehicle speed control unit 50a, information indicating a control target, a deceleration start point, a deceleration completion point, a deceleration value, a target speed after deceleration, and the like. The behavior information acquisition unit 103 successively provides the acquired control information to the virtual layout unit 108.

The guidance information acquisition unit 104 acquires route information for performing route guidance to the destination when the destination is set in the navigation device 60. The guidance information acquisition unit 104 acquires the guidance execution request which is output from the navigation ECU 62 in response to the vehicle approaching the guidance point GP. The guidance information acquisition unit 104 successively provides the route information and the guidance execution request to the virtual layout unit 108.

The external information acquisition unit 105 acquires, from the driving assistance ECU 50, detection information around the vehicle A, particularly, information about a front range. Specifically, the external information acquisition unit 105 acquires detection information indicating relative positions of the left and right lane markings or road edges of the own travelling lane Lns. The external information acquisition unit 105 acquires detection information of obstacles such as a preceding vehicle existing in front of the vehicle A.

The external information acquisition unit 105 acquires, from the V2X communication device 46, information about a caution target existing in a peripheral range of the vehicle A. Specifically, among the received information provided from the V2X communication device 46 by the road-to-vehicle communication, the external information acquisition unit 105 at least receives information for notifying a pedestrian Ped (see FIG. 11) who is crossing the pedestrian crossing CW existing in front of the traveling direction or a pedestrian Ped (see FIG. 11) who exists around the pedestrian crossing CW existing in front of the travelling direction. The pedestrian Ped may be a walking person or a cyclist.

The external information acquisition unit 105 successively provides the acquired detection information and reception information to the point determination unit 106 and the virtual layout unit 108. The external information acquisition unit 105 may acquire the image data captured by the front camera 31 as the detection information instead of the analysis result acquired from the driving assistance ECU 50 as the detection information.

The point determination unit 106 determines whether the caution point CP exists in front of the vehicle A in the traveling direction based on the own vehicle position information and high-precision map data or the navigation map data. Specifically, the point determination unit 106 determines whether a caution point exists within a predetermined range from the current position of the vehicle A. The current position of the vehicle A is a position defined with respect to the current travelling lane Lns of the vehicle, and the predetermined range is defined as a front range in the travelling direction of the vehicle A. The caution point may be one of the temporary stop point SP, the pedestrian crossing CW, or the school zone SZ. The predetermined range is, for example, a range that extends 100 m ahead from the current position of the vehicle.

The point determination unit 106 functions as a temporary stop determination unit, a pedestrian crossing determination unit, a school zone determination unit, and a construction section determination unit. When at least one of the temporary stop point SP, the pedestrian crossing CW, the school zone SZ, or the road construction section RcS is within the predetermined range, the point determination unit 106 determines that the caution point CP exists ahead in the traveling direction. That is, the point determination unit 106 determines whether a remaining distance Lr2 from the vehicle A to the caution point CP is shorter than a threshold value.

The point determination unit 106 further determines whether the temporary stop point SP is a caution point CP related to the railroad crossing RaC based on the map data as the temporary stop determination unit. Specifically, the temporary stop point SP related to the railroad crossing RaC is located before the railroad crossing RaC in the traveling direction of the vehicle A, and the vehicle passes the temporary stop point SP immediately before entering the railroad crossing RaC.

When determining that the caution point CP exists, the point determination unit 106 further determines a type of the caution point CP, and provides the type information to the recognition determination unit 107 and the virtual layout unit 108 together with the coordinate information of the caution point CP. When determining that the caution point CP is the temporary stop point SP, the point determination unit 106 determines further determines whether the temporary stop point SP is related to the railroad crossing RaC, and includes the determination result in the type information.

The recognition determination unit 107 determines, based on the driver information and the behavior information, whether the driver recognizes the caution point CP, such as the temporary stop point SP determined to be existing. For example, the recognition determination unit 107 determines that the driver recognized the temporary stop point SP when the direction of the driver's line of sight conforms to the existing direction of the caution point CP relative to the own vehicle and the deceleration operation of the vehicle A is executed. That is, the recognition determination unit 107 determines that the driver recognized the caution point CP when the driver is visually recognizing the caution point CP and is about to execute temporary stop of the vehicle. The recognition determination unit 107 may perform determination based on at least one of the driver information or the behavior information. The recognition determination unit 107 provides the determination result to the virtual layout unit 108.

Figure 5:
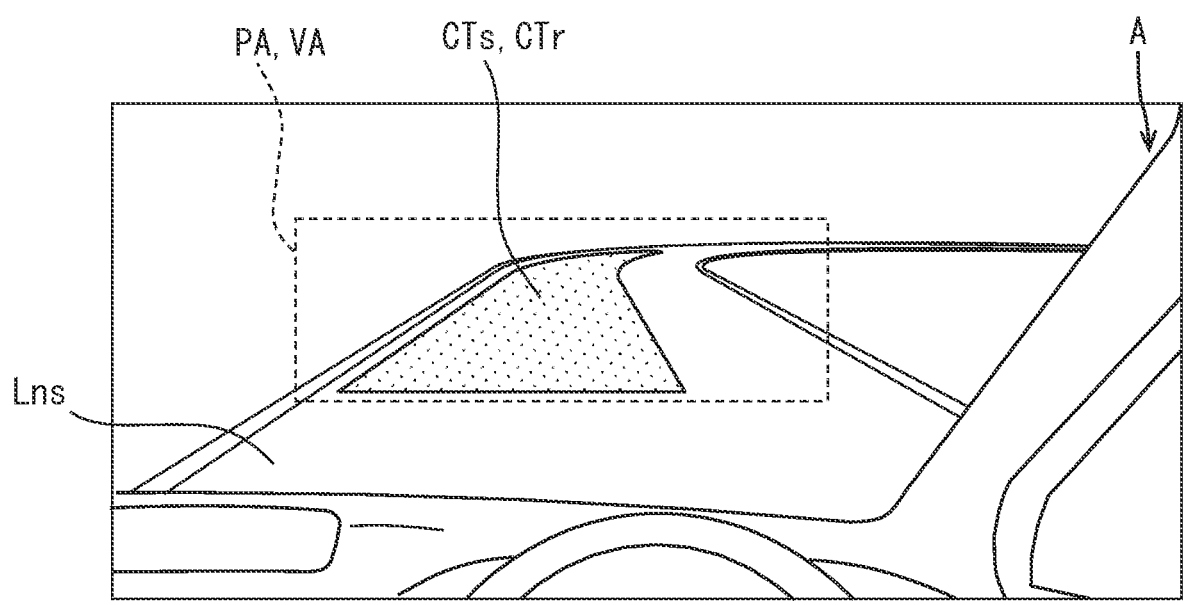
FIG. 5 is a diagram showing an example of a route guidance display.
Figure 9:
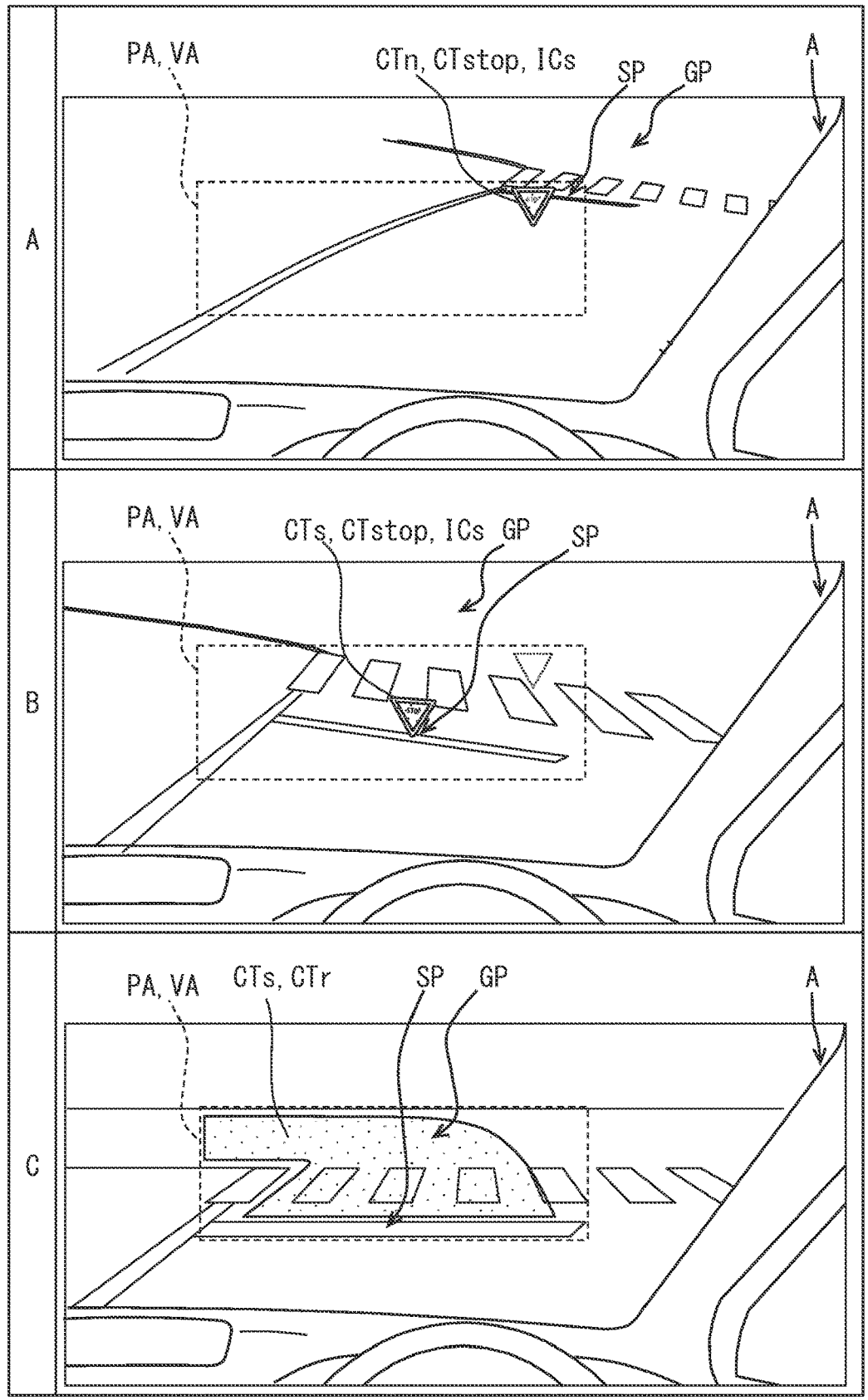
FIG. 9 is a diagram showing a display example in a case where a vehicle approaches a temporary stop point.

The virtual layout unit 108 is configured to select content to be used for information presentation based on various acquired information, and is configured to simulate the display layout of superimposed content CTs (see FIG. 5 and FIG. 9).

When the guidance execution request from the navigation device 60 is acquired, the virtual layout unit 108 selects the content (hereinafter referred to as route content CTr, see FIG. 5) to be used for the route guidance for the guidance point GP. Specifically, a guidance content for a right or left turn at the branch point, such as the intersection, a guidance content for travelling along the road for a predetermined distance, a guidance content for a lane change, and the like may be appropriately selected as the route content CTr.

When the point determination unit 106 determines existence of the caution point, the virtual layout unit 108 selects the content (hereinafter referred to as caution content) used for notifying the existence of caution point CP. The virtual layout unit 108 selects the caution content associated with the type of caution point CP determined by the point determination unit 106. The caution content is selected with higher priority than the content used for route guidance.

The virtual layout unit 108 selects a content (hereinafter referred to as deceleration notification content, see FIG. 17) used for notifying an execution of automatic deceleration in response to the behavior information acquisition unit 103 acquiring the control information indicating a planned execution of the deceleration control using the vehicle speed control unit 50a. The virtual layout unit 108 selects the deceleration notification content associated with the type of automatic deceleration control target (for example, a curve a temporary stop line). The deceleration notification content is selected as a display target with a higher priority than the caution content and the route content CTr (see FIG. 5). The virtual layout unit 108 may select the caution content or the route content CTr as the display target together with the deceleration notification content.

The virtual layout unit 108 executes a virtual layout function that simulates the display layout of the superimposed content CTs based on various provided information. In response to acquiring the guidance execution request from the navigation device 60, or in response to determining existence of the caution point CP by the point determination unit 106, the virtual layout unit 108 reproduces the current traveling environment of the vehicle A in the virtual space. The virtual layout unit 108 also reproduces the current traveling environment of the vehicle A in the virtual space in response to the vehicle speed control unit 50a performing deceleration control before the caution point CP. The virtual layout unit 108 reproduces the traveling environment in the virtual space based on the vehicle position information, high-precision map data or navigation map data, received information, detection information, and the like.

Figure 4:
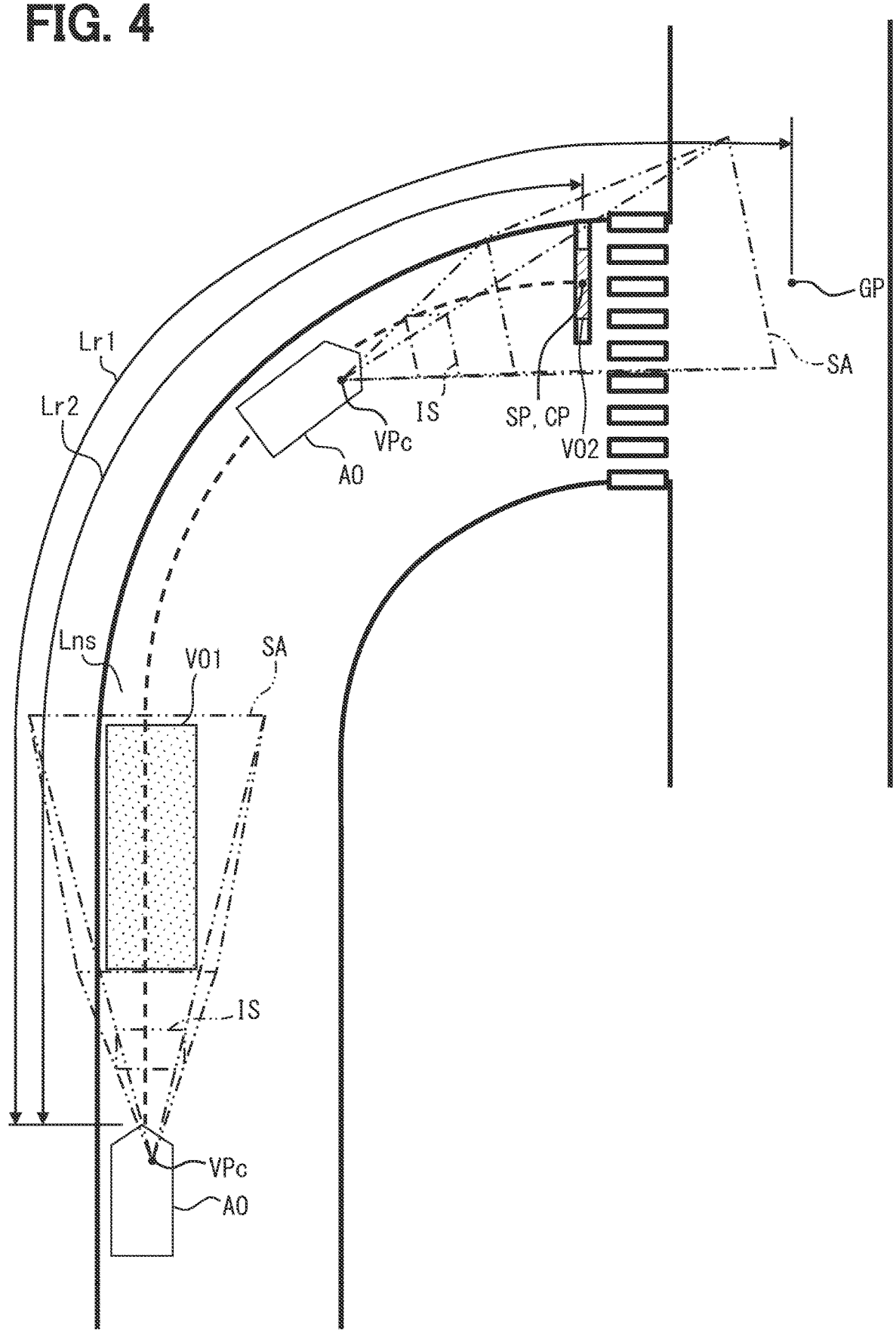
FIG. 4 is a diagram showing an example of a display layout simulation executed by a virtual layout unit in visible manner.

More specifically, as shown in FIG. 2 to FIG. 4, the virtual layout unit 108 sets an own vehicle object AO at a reference position in the virtual three-dimensional space. The virtual layout unit 108 maps, based on the own vehicle position information, a road model having a shape indicated by the high-precision map data or the navigation map data in association with the own vehicle object AO in the three-dimensional space. The virtual layout unit 108 can set peripheral objects such as a preceding vehicle and a pedestrian on the road model based on the received information, the detection information, and the like. The virtual layout unit 108 can set a planned travelling route on the road model based on the guidance information. The virtual layout unit 108 sets a virtual camera position VPc and a superimposition range SA in association with the own vehicle object AO.

The virtual camera position VPc is a virtual position corresponding to the driver's eye point EP. The display generation unit 109 successively corrects the virtual camera position VPc with respect to the own vehicle object AO based on the latest eye point coordinates acquired by the driver information acquisition unit 102. The superimposition range SA is a range in which the virtual image Vi can be displayed in superimposed manner. The display generation unit 109 sets a front range positioned inside the imaging plane IS as a superimposition range SA, when viewed forward from the virtual camera position VPc, based on the virtual camera position VPc and the outer edge position (coordinates) information of the projection range PA stored in advance in the storage unit 13 (see FIG. 1). The superimposition range SA corresponds to the angle of view VA of HUD 20.

The virtual layout unit 108 arranges a first virtual object VO1 and a second virtual object VO2 in the virtual space. The first virtual object VO1 is arranged in overlapped manner with the planned travelling route arranged on the road surface of the road model set in the three-dimensional space. The first virtual object VO1 is set in the virtual space when the route content CTr described later is displayed as a virtual image.

As an example, the first virtual object VO1 is a band-shaped object and covers a virtual road surface of the planned travel route. The first virtual object VO1 has a curved shape connecting an entrance lane and an exit lane at a right or left turn point of the intersection (see C of FIG. 9). The first virtual object VO1 defines the position and shape of the route content CTr. The shape of the first virtual object VO1 seen from the virtual camera position VPc corresponds to the virtual image shape of the route content CTr visually recognized from the eye point EP.

The virtual layout unit 108 sets the second virtual object VO2 in the virtual space when displaying the caution content as a virtual image. The virtual layout unit 108 determines whether the caution point CP is included in the angle of view VA, that is, whether the caution point CP set in the virtual space is included in the superposition range SA. When determining that the caution point CP is included in the angle of view VA, the virtual layout unit 108 displays the second virtual object VO2. The virtual layout unit 108 is an example of an angle of view determination unit.

The second virtual object VO2 is displayed at a position over the virtual road surface corresponding to the temporary stop point SP, the pedestrian crossing CW, the school zone SZ, the road construction section RcS, and the like. Specifically, when the temporary stop point SP exists as the caution point CP, the second virtual object VO2 has a shape similar to a temporary stop road sign (see B of FIG. 9) or a shape similar to a temporary stop line. When the pedestrian crossing CW, the school zone SZ, or the road construction section RcS exists as the caution point CP, the second virtual object VO2 clearly indicates a boundary on a front side of the pedestrian crossing CW, the school zone SZ, or the road construction section RcS.

The display generation unit 109 controls the presentation of information to the driver by the HUD 20 by generating video data that is successively output to the HUD 20. The display generation unit 109 is an example of a display control unit, and controls the superimposed display of the superimposed content CTs and the non-superimposed content CTn executed by the HUD 20. The display generation unit 109 controls drawing of the content and a display period of the content based on the various acquired information. The display generation unit 109 determines an original image to be drawn on each frame image constituting the video data based on the selection result of the content acquired from the virtual layout unit 108 and the layout information, that is, the display simulation result in the virtual space.

When the original image of the superimposed content CTs is to be drawn on the frame image, the display generation unit 109 corrects, by reflecting the result of the display simulation, the drawing position and drawing shape of the original image on the frame image corresponding to the eye point EP and the superimposition target. Thus, the superimposed content CTs is displayed at the position and shape correctly superimposed on the superimposition target when viewed from the eye point EP.

The display generation unit 109 properly uses the superimposed content CTs and the non-superimposed content CTn, and executes the route guidance at the guidance point GP, alerting at the caution point CP, notification of automatic deceleration, and the like. The following will describe details of the information presentation mainly performed by the display generation unit 109 with reference to FIG. 1 to FIG. 3 in association with multiple scenes 1 to 6 shown in FIG. 4 to FIG. 22.

(Scene 1: Attention to Temporary Stop During Route Guidance)

FIG. 4 to FIG. 9 show details of a display transition in the scene that requires attention to the temporary stop line at the guidance point GP for right turn guidance. In this scene, the display generation unit 109 displays the route content CTr for route guidance, and then displays a temporary stop content CTstop for a temporary stop guidance. The display generation unit 109 changes display modes of the route content CTr and the temporary stop content CTstop according to a distance from the guidance point GP to the vehicle A and a distance from the temporary stop point SP to the vehicle A.

The display generation unit 109 starts to display the route content CTr (see FIG. 5) in response to the guidance execution request being acquired by the guidance information acquisition unit 104. The route content CTr displays the planned travelling route of the vehicle A. The route content CTr is superimposed content CTs with the road surface of the planned travel route as the superimposition target. The shape of the route content CTr is drawn based on the first virtual object VO1 arranged in the display simulation. The route content CTr is displayed when the remaining distance Lr1 from the vehicle A to the guidance point GP decreases below the threshold value (for example, about 300 meters).

The shape of the route content CTr is drawn corresponding to the planned travel route, and indicates a planned travelling lane of the vehicle A, a point where a right or left turn is to be made, a point where a lane change is to be made, and the like. The shape of the route content CTr is drawn by imitating the shape of the lane included in the planned travelling route, and has a band shape which extends in the travelling direction of the vehicle A. The route content CTr has a linear shape when the travelling lane has a straight linear shape, and has a curved shape corresponding to a curved shape of the travelling lane. Within an intersection area, the route content CTr has a shape that connects the entrance travelling lane of the planned travelling route and the exit travelling lane of the planned travelling route. The route content CTr is updated with latest drawing shape at a predetermined update cycle so as to match the changing road surface shape viewed from the eye point EP during the traveling of the vehicle A.

When the vehicle A travels toward the guidance point GP after displaying the route content CTr, the point determination unit 106 determines that the caution point CP exists in the predetermined range. Based on the existence determination of the caution point CP by the point determination unit 106, the display generation unit 109 displays the caution content that notifies the existence of the caution point CP to the occupant. The display generation unit 109 notifies, to the occupant, the existence of the caution point CP by the caution content that is associated with the type determined by the point determination unit 106. As described above, when the point determination unit 106 determines existence of the temporary stop point SP, the display generation unit 109 displays the temporary stop content CTstop as the caution content indicating the existence of the temporary stop point SP.

The temporary stop content CTstop is the caution content associated with the temporary stop point SP. The temporary stop content CTstop is displayed when the remaining distance Lr2 from the vehicle A to the temporary stop point SP decreases below a threshold value (for example, about 100 meters, see the predetermined distance described above).

The display generation unit 109 may change the threshold value according to the speed of the vehicle A. For example, when the speed of the vehicle A is lower than a predetermined speed, a constant threshold value may be set. When the speed exceeds the predetermined speed, the threshold value may be set to increase with an increase of the vehicle speed. As a result, the temporary stop content CTstop is displayed at an earlier time before the temporary stop point SP with an increase of the speed of vehicle A. The display generation unit 109 controls the temporary stop content CTstop to be displayed with a higher priority than the route content CTr. Therefore, during the display period of the temporary stop content CTstop, a display of the route content CTr is deactivated.

The display generation unit 109 refers to a simulation result of the display layout generated by the virtual layout unit 108, and determines whether the caution point CP (temporary stop point SP) is included in the angle of view VA. When the display generation unit 109 determines that the temporary stop point SP is not included in the angle of view VA, the display generation unit 109 displays the temporary stop content CTstop as the non-superimposition content CTn which has no superimposition target. In other words, when determining that the temporary stop point SP is out of the superposition range SA in the simulation result of the display layout, the display generation unit 109 controls the temporary stop content CTstop to be displayed in non-AR mode. For example, when the temporary stop point SP exists at a front end of a curved road, a situation in which the temporary stop point SP exists out of the superimposition range SA may occur.

Even when the temporary stop point SP is included in the superimposition range SA in the simulation result of the display layout, but the temporary stop point SP cannot be visually recognized by the driver, the temporary stop content CTstop is displayed as the non-superimposition content CTn. For example, when the temporary stop point SP is blocked by a preceding vehicle or a specific road shape, although the temporary stop point SP is included in the superimposition range SA, the driver may fail to visually recognize the temporary stop point SP.

The temporary stop content CTstop displayed as the non-superimposed content CTn is displayed in a frame content CTf. The temporary stop content CTstop in this case includes a sign icon ICs, a stop line icon ICl, and an arrival route icon ICr.

The frame content CTf is a non-superimposed content CTn that notifies a display area of the temporary stop content CTstop within the angle of view VA. The frame content CTf is displayed at a position closer to the left or right (for example, near the right edge) than the center of the angle of view VA in the left-right direction, and is displayed before the temporary stop content CTstop (see A of FIG. FIG. 6). The frame content CTf has a frame shape, and includes a substantially rectangular main frame portion and a lower end portion having a width larger in the left-right direction than the main frame portion. The lower end portion is displayed before the entire frame portion. The entire frame portion is displayed in animation manner. Specifically, the entire frame portion extends upward from the lower end portion in animation manner (see B of FIG. 6). With this animated display, the frame content CTf notifies the driver the temporary stop content CTstop displayed as the non-superimposed content CTn in a virtual display manner.

Figure 6:
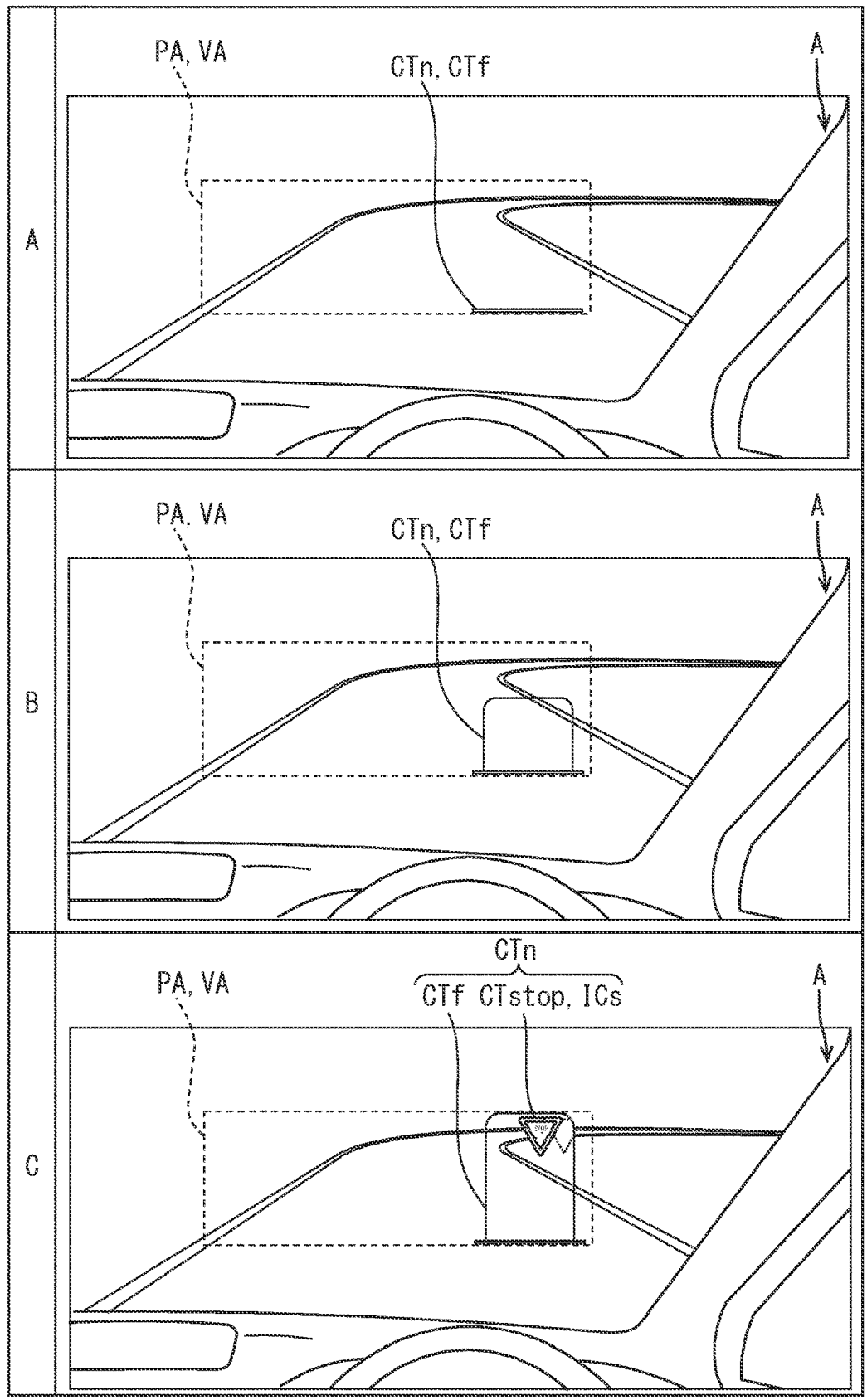
FIG. 6 is a diagram showing an example of displaying a temporary stop point as non-superimposed content.

The sign icon ICs is a content icon that is displayed after the animation display of the entire frame portion is completed (see C of FIG. 6). The sign icon ICs indicates the existence of temporary stop point SP by an icon. The sign icon ICs is displayed as an image of a stop sign. That is, in the case of Japan, the sign icon ICs is displayed as an image including a frame portion having a shape of inverted triangle and a character portion of "STOP" arranged inside the frame portion.

The sign icon ICs is displayed in animated manner so as to enter from an outside to an inside of the frame content CTf. In the animation display, the sign icon ICs is drawn so as to enter in a direction from the temporary stop point SP to the inside of the frame content (in the case of FIG. 6, from right to left). Further, in the animation display, a part of the sign icon ICs protruding outside from the frame content CTf is not displayed, and only a part included in the frame content CTf is displayed. The sign icons ICs may be displayed together with the entire frame portion of the frame content CTf in animated manner from the lower end portion of the frame content CTf. That is, the sign icon may extend, together with the entire frame portion of the frame content, upward from the lower end portion of the frame content in animation manner.

Figure 7:
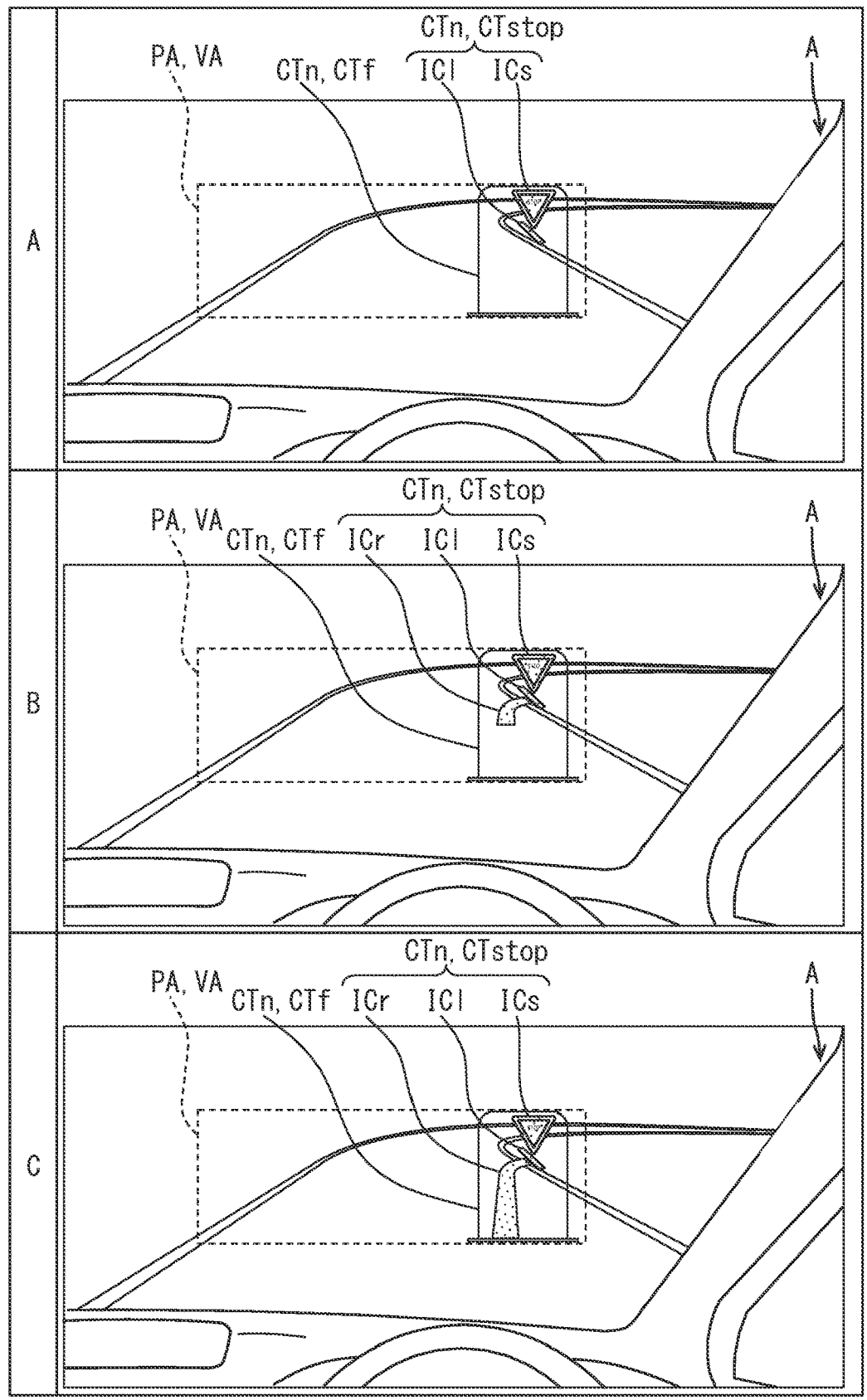
FIG. 7 is a diagram showing an example of displaying a temporary stop point as non-superimposed content.

The stop line icon ICI is displayed when the animation display of the sign icon ICs is completed and the sign icon ICs stops in the frame content CTf (see A of FIG. 7). The stop line icon ICI is displayed as a linear image indicating the temporary stop line. The stop line icon ICI is displayed in an inclined state according to an arrangement of the stop line with respect to the current position of the vehicle A. Specifically, the stop line icon ICI is displayed to have a shape of the stop line viewed from an above point of the current position of vehicle A in the traveling direction. That is, when a temporary stop line exists at a front end of a curved road that turns to the right as in this scene (see FIG. 4), the shape of stop line icon ICI is changed to extend diagonally from an upper left to a lower right linearly in a front area of the curved road (see A to C of FIG. 7 and A and B of FIG. 8). Then, when the vehicle A travels on the curved road for a predetermined distance, the stop line icon ICI is changed to a straight line extending horizontally.

The arrival route icon ICr is displayed following the stop line icon ICI (see B and C of FIG. 7). The arrival route icon ICr notifies information about the traveling route (hereinafter referred to as an arrival route) from the current position of the vehicle A to the temporary stop line. Specifically, the arrival route icon ICr notifies a shape of the arrival route and a distance to the stop line.

The arrival route icon ICr has a shape that imitates the arrival route. The arrival route icon ICr is drawn in a shape of the arrival route when viewed from an above point of the vehicle A. Specifically, the arrival route icon ICr is drawn to have shape which has a smaller width at a portion closer to the temporary stop line to provide a depth view effect. The arrival route icon ICr is displayed with a tip end close to the stop line icon ICI so that the arrival route icon ICr is viewed with an effect that the arrival route content displays the arrival route to the stop line icon ICI which indicates the temporary stop line.

The arrival route icon ICr is displayed with an animation that appears from the stop line toward the vehicle (in a direction from above to below within the angle of view VA). The appearance speed of the arrival route icon ICr in this appearance animation may increase with an increase of the speed of vehicle A. Therefore, a length of arrival time from the current position to the temporary stop point SP is notified to the driver by an extension speed of the arrival route icon ICr.

Figure 8:
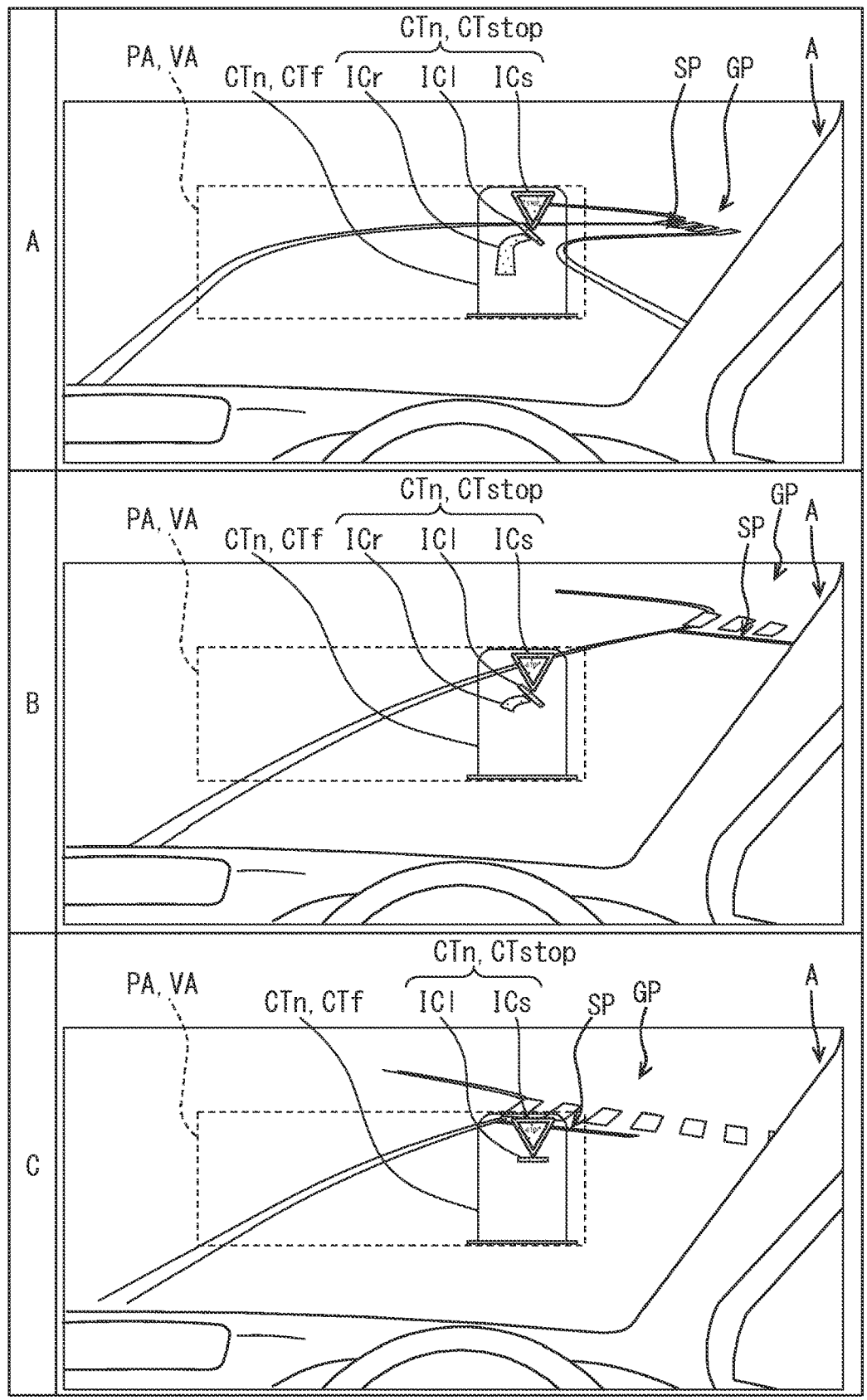
FIG. 8 is a diagram showing an example of displaying a temporary stop point as non-superimposed content.

A length of the arrival route icon ICr after the entire animation display is completed is decreased with a decrease of the distance between the vehicle A and the temporary stop point SP (see A to C of FIG. 8). Specifically, the arrival route icon ICr is animated so that a portion of the arrival route icon positioned on vehicle side (lower side in the angle of view VA) disappears as the vehicle A travels along the arrival route. As described above, the arrival route icon ICr notifies the driver with a sense of distance to the temporary stop point SP by the length change.

When the virtual layout unit 108 determines that the temporary stop point SP is included in the angle of view VA, the display generation unit 109 displays the temporary stop content CTstop as the superimposed content CTs. In other words, when determining that the temporary stop point SP is included in the superposition range SA in the simulation result of the display layout, the display generation unit 109 controls the temporary stop content CTstop to be displayed in AR mode. In this case, the virtual layout unit 108 arranges, in the display layout simulation, the second virtual object VO2 which imitates the temporary stop sign in the virtual space so that a front side of the temporary stop sign faces the own vehicle object.

The second virtual object VO2 (see FIG. 4) is arranged above the guidance point GP set on the virtual road surface. More specifically, the second virtual object VO2 is set to have coordinates (x, y) on a two-dimensional plane parallel to a horizontal plane of the virtual space, and the coordinates (x, y) of the second virtual object VO2 are set to the same as coordinates of the guidance point GP in the two-dimensional plane. The position of the second virtual object VO2 in the height (z) direction is set so that an entire portion of the second virtual object VO2 can be visually recognized from the virtual camera position VPc. That is, a lower end of the second virtual object VO2 is positioned above a straight line connecting the virtual camera position VPc and a top of the road surface. An upper end of the second virtual object VO2 is positioned below an upper end of the superimposition range SA. When the second virtual object VO2 protrudes above the upper end of the superimposing range SA with a preset initial size, the size in the up-down direction is decreased in order to adjust the second virtual object VO can be included in the superimposing range SA.

The temporary stop content CTstop displayed as the superimposed content CTs includes only the sign icon ICs drawn based on the above-mentioned second virtual object VO2 (see FIG. 9). The temporary stop point SP is the superimposition target of the sign icon ICs, and is displayed at a display position associated with the temporary stop point SP. The sign icon ICs is displayed above the temporary stop point SP as if the sign icon floats on the temporary stop point. When the temporary stop point SP enters the angle of view VA, the sign icon ICs changes from the non-superimposed content CTn to the superposed content CTs via an animation display that moves to the temporary stop point SP (see A and B of FIG. 9). Alternatively, the sign icon ICs may change from the non-superimposed content CTn to the superimposed content CTs by displaying the superimposed content at the display position associated with the temporary stop point SP after deactivating the display of the non-superimposed content. The sign icon ICs is updated to have latest drawing shape and drawing position at a predetermined update cycle so as to stay at the temporary stop point SP visible from the eye point EP during the traveling of the vehicle A.

The display of temporary stop content CTstop is deactivated when the recognition determination unit 107 determines that the driver has recognized the temporary stop point SP (see C of FIG. 9). When a display of route content CTr is in interrupted state at this time, the display of route content is restarted after deactivating the display of temporary stop content. The display of temporary stop content CTstop by the superimposed content CTs may be deactivated when the simulation result of display layout indicates that the temporary stop point SP or the second virtual object VO2 is out of the superimposition range SA. The display of temporary stop content CTstop by the non-superimposed content CTn may be deactivated or may be continued when the recognition determination unit 107 determines that the driver has recognized the temporary stop point SP.

(Scene 2-1: Attention to Temporary Stop/Emphasized Display of Road Surface Sign)

Figure 10:
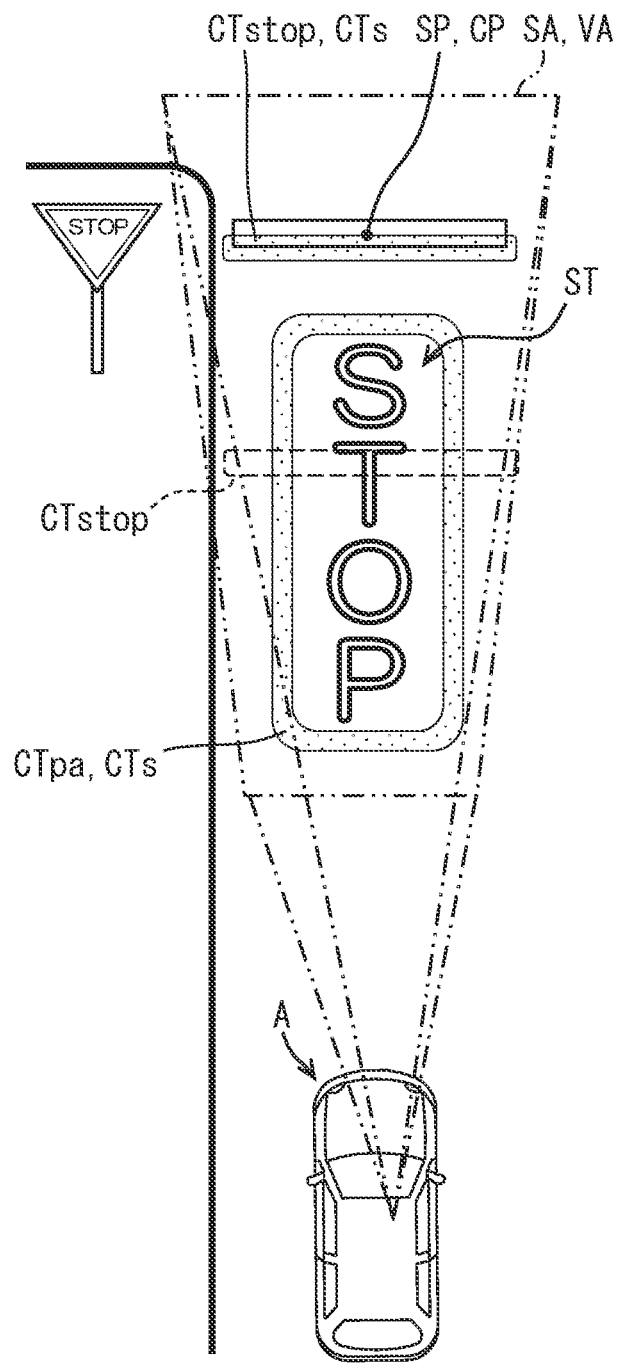
FIG. 10 is a diagram showing another display example in a case where a vehicle approaches a temporary stop point.

FIG. 10 shows a scene in which attention to the temporary stop line is required in a state where the route guidance to the destination is not carried out. In this scene, the display generation unit 109 displays the temporary stop content CTstop that notifies existence of the temporary stop point SP to the occupant in response to the point determination unit 106 determining that the temporary stop point SP exists. Since the temporary stop is always required to be made when there is a temporary stop line, the display generation unit 109 displays the temporary stop content CTstop indicating the temporary stop line in any situation.

When the temporary stop point SP exists outside the angle of view VA, the display generation unit 109 displays the non-superimposed content CTn as the temporary stop content CTstop (see FIG. 7) similar to a case where the route guidance is displayed. When the temporary stop point SP is within the angle of view VA, the display generation unit 109 displays the superimposed content CTs in a mode different from the case where the route guidance is displayed. In this scene, the display generation unit 109 displays, in a mode different from the case where the route guidance is displayed, the temporary stop content CTstop, a road surface sign emphasizing content CTpa in accordance with the approach to the temporary stop point SP.

The temporary stop content CTstop is drawn in a shape of a white line imitating the temporary stop line. The temporary stop content CTstop has a band shape that extends in the width direction of the road surface, and is displayed as a virtual painted mark in the superimposed manner right above the temporary stop line or slightly before (for example, 1 meter before) the temporary stop line in the foreground. Such temporary stop content CTstop corresponds to a first superimposed content in this scene.

The road surface sign emphasizing content CTpa is a superimposed content CTs with a related object ST existing before the temporary stop point SP as the superimposition target. The related object ST is an object related to the temporary stop point SP which corresponds to the caution point CP. The road surface sign emphasizing content CTpa is a superimposed content CTs with the related object as the superimposition target. In this scene, the road surface sign (road surface paint) with characters of "stop" painted on the road surface before the temporary stop line is regarded as the related object ST. The road surface sign emphasizing content CTpa is superimposed and displayed on the road surface in a rectangular or elliptical shape so as to surround the road surface sign of "stop". Such road surface sign emphasizing content CTpa corresponds to a second superimposed content in this scene.

Since the road surface sign emphasizing content CTpa is superimposed on the road surface before the temporary stop content CTstop, the display of road surface sign emphasizing content CTpa is started before the display of temporary stop content CTstop in accordance with the vehicle A approaches the temporary stop point SP. The display generation unit 109 changes the temporary stop content CTstop from the non-superimposed content CTn to the superposed content CTs in response to the display start of the road surface sign emphasizing content CTpa. The display generation unit 109 may continue to display the temporary stop content CTstop as the non-superimposed content CTn, until the temporary stop point SP is included within the angle of view VA.

The display generation unit 109 determines a risk level of the caution point CP, and changes the display mode of the caution content according to the determined risk level. The display generation unit 109 displays the caution content so that an emphasis degree of the caution point CP viewed by the driver increases with an increase of the risk level of the caution point CP. The display generation unit 109 may determine the risk level using a binary value, such as a value indicating a high level and a value indicating a low level. The display generation unit 109 determines the risk level in consideration of the speed of the vehicle A, presence or absence of a pedestrian or the like in the vicinity of the caution point CP. As an example, when either the vehicle speed is equal to or higher than a predetermined speed (for example, 50 km/h) or a pedestrian exists on the road, the display generation unit 109 determines that the risk level is higher than a threshold and sets the risk level as the high level.

In this scene where an attention is required to the temporary stop point SP, when the display generation unit 109 determines that the risk level is high, the display generation unit 109 displays the temporary stop content CTstop and the road surface sign emphasizing content CTpa in the above-mentioned manner as a normal display. When the display generation unit 109 determines that the risk level is low, each content is displayed with a decreased emphasis degree of the temporary stop point SP. That is, each content is displayed with a decreased brightness compared with the normal display.

The display generation unit 109 changes the superimposition position of the caution content displayed as the superimposition content CTs with respect to the caution point CP based on the accuracy of the map data acquired by the locator information acquisition unit 101. More specifically, the caution content drawn using the high-precision map data is less likely to shift back and forth, left and right, and up and down with respect to the caution point CP to be superimposed. On the contrary, the caution content drawn using the navigation map data tends to shift back and forth, left and right, and up and down with respect to the caution point CP. In particular, the up and down shift results in a large shift in the display position of the caution content in back and forth direction. Therefore, when it is determined that the accuracy of the map data is low, the display generation unit 109 sets the position on which the caution content is to be superimposed to be shifted toward the vehicle with respect to the caution point CP compared with the case where the accuracy of the map data is determined to be high. As described above, even when the display position shifts due to the accuracy of the map data, the caution content can be always displayed substantially on the front side of the caution point CP.

In a case where attention is required to be paid to the temporary stop point SP, when the locator information acquisition unit 101 determines that the accuracy of the map data is high, the display generation unit 109 displays the temporary stop content by superimposing the temporary stop content CTstop at a normal superimposition position (directly above or 1 meter before). When the locator information acquisition unit 101 determines that the accuracy of the map data is low, the display generation unit 109 sets the superposition position of the temporary stop content CTstop before the normal superimposition position in order to secure a margin of the display shift. Specifically, when the accuracy of the map data is low, the superimposition position of the temporary stop content CTstop is set to a position about 5 meters before the temporary stop point SP (temporary stop line) (see a broken line in FIG. 10). At this time, the display of the road surface sign emphasizing content CTpa is deactivated. Similar to the temporary stop content CTstop, the road surface sign emphasizing content CTpa may be superimposed and displayed after the superimposition position of the temporary stop content is set before the normal superimposition position.

(Scene 2-2: Attention to Temporary Stop/Emphasized Display of Railroad Crossing)

Figure 11:
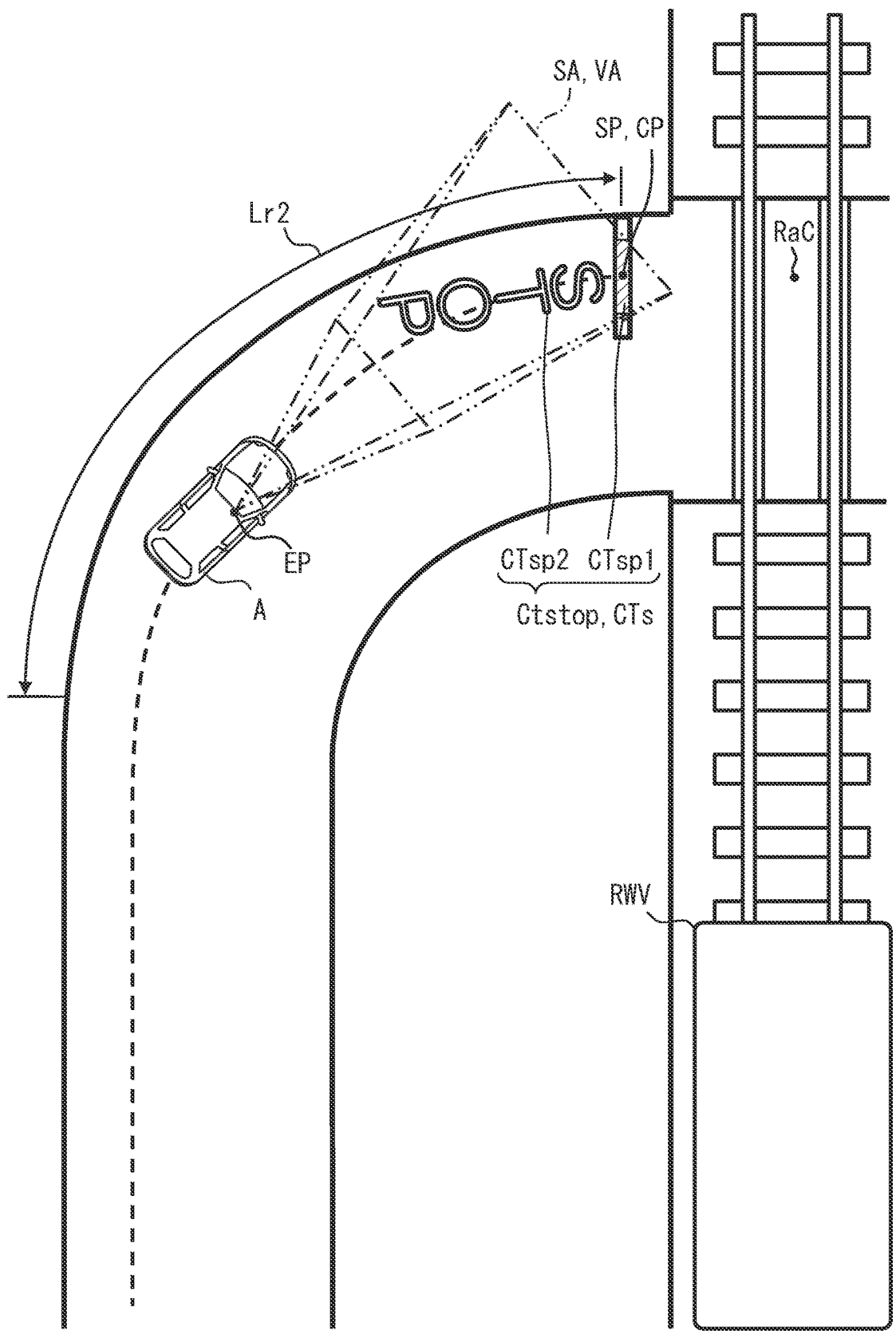
FIG. 11 is a diagram showing a display example in a case where a vehicle approaches a temporary stop point before a railroad crossing.

FIG. 11 shows a scene in which attention to the temporary stop line is required in a state where the route guidance to the destination is not carried out similar to FIG. 10. In this scene, the display generation unit 109 displays the temporary stop content CTstop that notifies existence of the temporary stop point SP to the occupant in response to the point determination unit 106 determining that the temporary stop point SP exists. The display generation unit 109 refers to the determination result (type information) of the point determination unit 106 which indicates whether the temporary stop point SP is related to the railroad crossing RaC, and changes the display mode of the caution content.

The display generation unit 109 displays the temporary stop content CTstop with a higher emphasized degree when the temporary stop point SP is determined to be related to the railroad crossing RaC compared with a case where the temporary stop point SP is determined to be not related to the railroad crossing RaC (see FIG. 10). Specifically, the display generation unit 109 displays, as the caution content that requires attention to the temporary stop line, the temporary stop content CTstop by combining a main stop content CTsp1 and a subsidiary stop content CTsp2.

The main stop content CTsp1 is substantially the same as the temporary stop content CTstop (see FIG. 10) indicating the temporary stop point SP that is not related to the railroad crossing RaC. The main stop content CTsp1 is the superimposed content CTs with the temporary stop line as the superimposition target, and the band shape of the main stop content CTsp1 extends in the width direction of the road along the temporary stop line.

The subsidiary stop content CTsp2 is the superimposed content CTs with the road surface before the temporary stop line (on the own vehicle side) as the superimposition target. As an example, the subsidiary stop content CTsp2 is drawn in a shape that imitates a road surface sign of characters "stop". In some cases, the road has no road surface sign of "stop" before the railroad crossing. Thus, the subsidiary stop content CTsp2 displays a virtual road surface paint of "stop" on the road surface in the vicinity of the railroad crossing RaC. The display generation unit 109 emphasizes the temporary stop point SP related to the railroad crossing RaC compared with a normal case by additionally displaying the subsidiary stop content CTsp2.

The display generation unit 109 displays the subsidiary stop content CTsp2 and the main stop content CTsp1 in order according to the approach of the vehicle toward the temporary stop point SP and the railroad crossing RaC. More specifically, the display generation unit 109 starts display of the subsidiary stop content CTsp2 in response to the point determination unit 106 determining that the remaining distance Lr2 to the caution point CP is shorter than the threshold value. The display generation unit 109 starts display of the main stop content CTsp1 at the time when the temporary stop point SP enters the angle of view VA. The display of subsidiary stop content CTsp2 and the main stop content CTsp1 may continue until the road surface and the temporary stop line, which are the respective superimposition targets of the subsidiary stop content and the main stop content, move out of the angle of view VA (superimposition range SA).

The display generation unit 109 may display the temporary stop point SP related to the railroad crossing RaC in emphasized manner compared with the normal display of the temporary stop point SP using a method different from the additional display of the subsidiary stop content CTsp2. As an example, the temporary stop point SP may be emphasized by a method of increasing a brightness or a saturation of the main stop content CTsp1 or by a method of blinking the main stop content CTsp1. As another example, the subsidiary stop content CTsp2 may be displayed as the non-superimposed content under a condition that the temporary stop point SP can be displayed in emphasized manner.

Whether to emphasize the temporary stop content CTstop may be changed based on an operation state of a crossing gate at the railroad crossing RaC, in other words, an approaching of the railroad vehicle RWV toward the railroad crossing RaC. When another vehicle is stopped in front of the own vehicle before the temporary stop point SP, at least the display of subsidiary stop content CTsp2 may be deactivated. At the temporary stop point SP before the railroad crossing RaC where the crossing gate is not installed, a horizontal bar-shaped superimposed content CTs imitating the crossing gate may be displayed above the main stop content CTsp1 as the subsidiary stop content CTsp2.

(Scene 3: Attention to Pedestrian Crossing)

Figure 12:
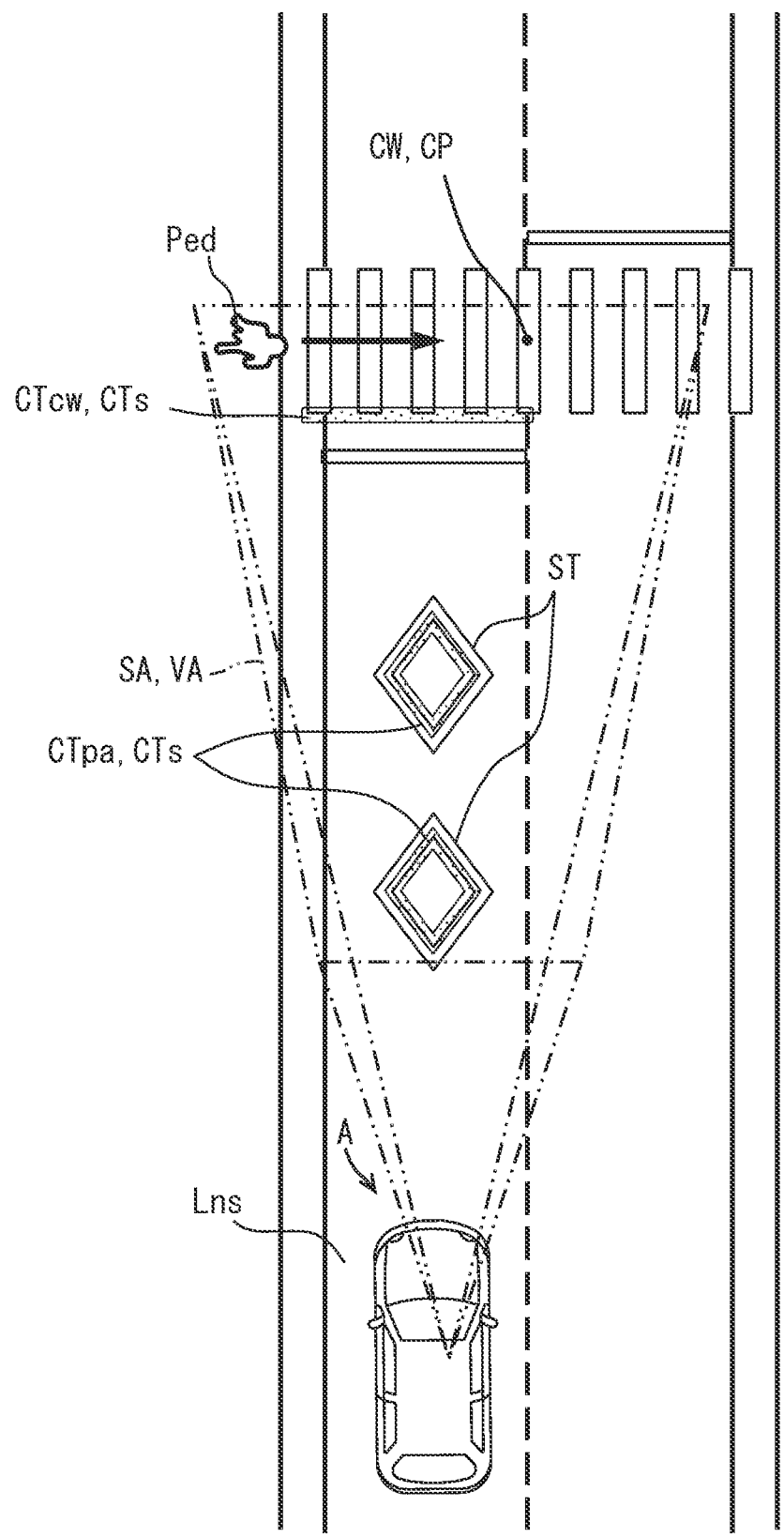
FIG. 12 is a diagram showing a display example in a case where a vehicle approaches a pedestrian crossing.
Figure 13:
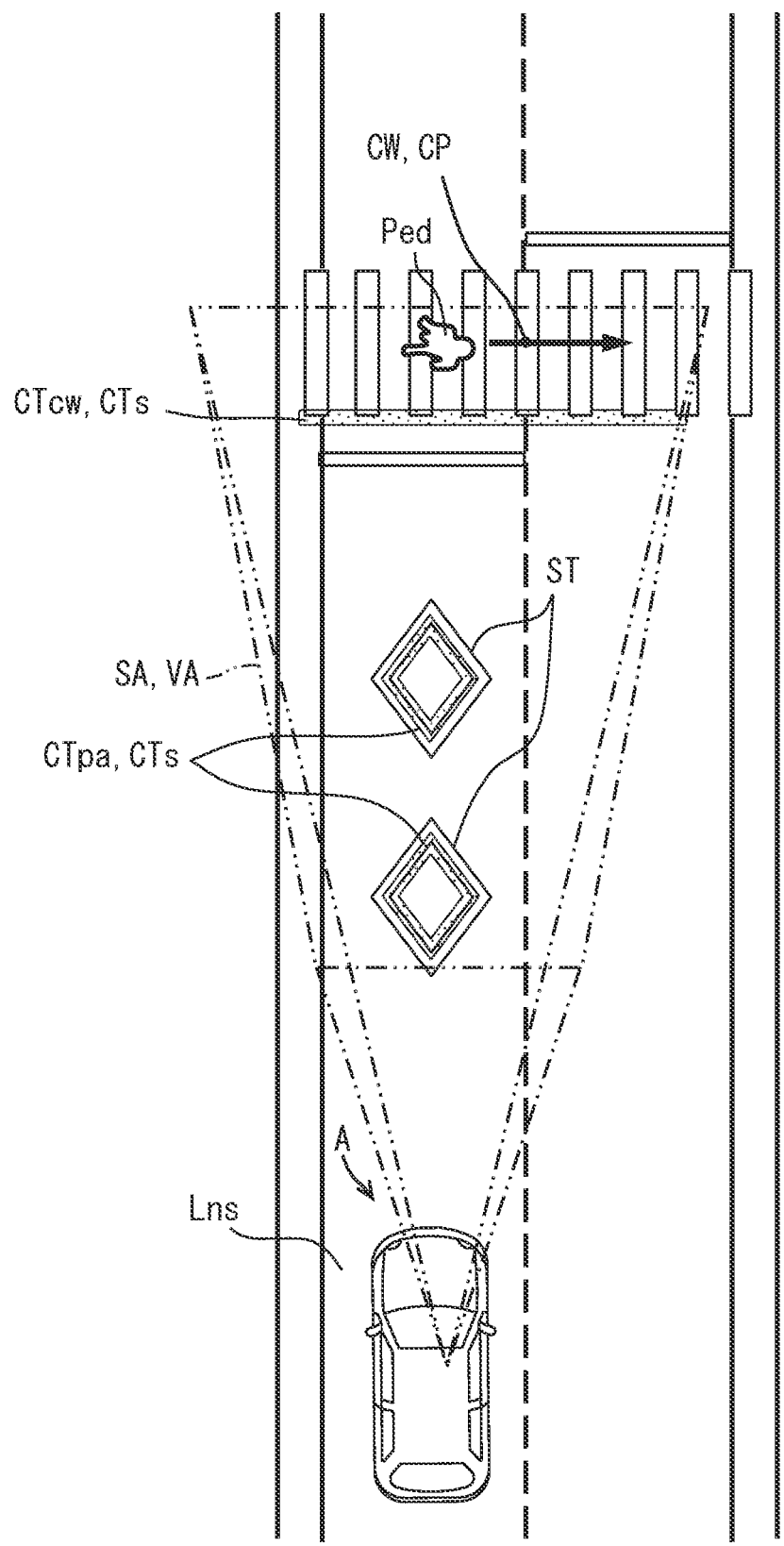
FIG. 13 is a diagram showing a change in a display content corresponding to a crossing position of a pedestrian on a pedestrian crossing.
Figure 14:
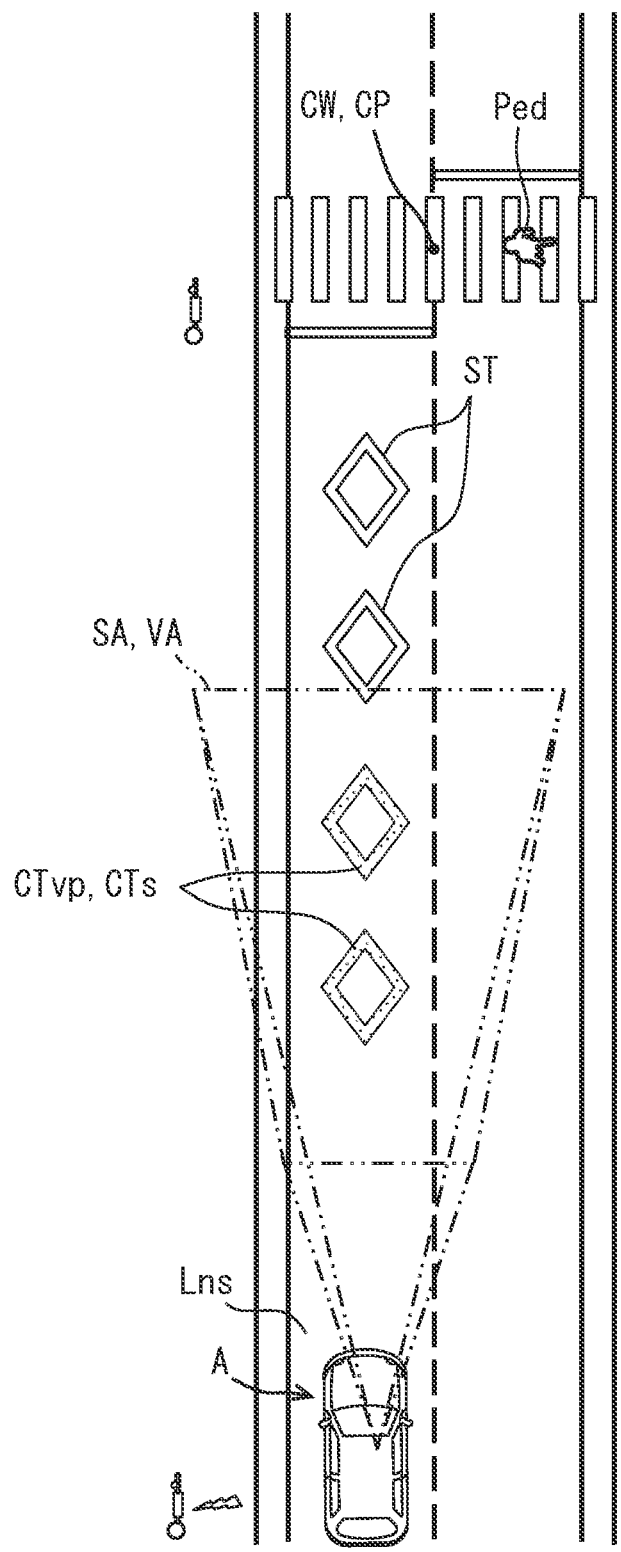
FIG. 14 is a diagram showing a display example when a caution is required, at an early stage, to a pedestrian crossing a pedestrian crossing in outside area of a view angle.

FIG. 12 to FIG. 14 show a scene that requires attention to the pedestrian crossing CW. In this scene, the display generation unit 109 displays a pedestrian crossing content CTcw notifies existence of the pedestrian crossing CW to the occupant in response to the point determination unit 106 determining existence of the pedestrian crossing CW and existence of pedestrian Ped on the pedestrian crossing.

According to the Road Traffic Act, if a pedestrian or a cyclist exists around the pedestrian crossing CW, the vehicle A should make a stop. In the present disclosure, the pedestrian also includes the cyclist or person who pushes the bicycle without riding on it. However, the vehicle A does not have to stop when there is no pedestrian around the pedestrian crossing. Therefore, the display generation unit 109 displays the pedestrian crossing content CTcw only when the pedestrian Ped exists. The display generation unit 109 may display the pedestrian crossing content CTcw in response to determination of pedestrian existence even when the general road vehicle speed control function by the vehicle speed control unit 50*a* is in activated state.

When the pedestrian crossing CW is outside the angle of view VA, the display generation unit 109 displays the pedestrian crossing content CTcw as the non-superimposed content CTn. As an example, a non-superimposed icon indicating a pedestrian crossing CW may be displayed near a lower end of the angle of view VA. The display generation unit 109 changes display mode of the pedestrian crossing content CTcw from the non-superimposed content CTn to the superposed content CTs in accordance with the approach to the pedestrian crossing CW. The display generation unit 109 may start display of a road surface sign emphasizing content CTpa prior to display of pedestrian crossing content CTcw, which is displayed as the superimposed content CTs.

The pedestrian crossing content CTcw is drawn in a band shape extending in the width direction of the road along the pedestrian crossing CW. The pedestrian crossing content CTcw is displayed in superimposed manner on a near end of the pedestrian crossing CW in the foreground. Alternatively, the pedestrian crossing content CTcw may be displayed in superimposed manner slightly (for example, about 1 meter) before the near end of the pedestrian crossing CW. Herein, the near end indicates an end close to the own vehicle. The pedestrian crossing content CTcw is displayed in AR mode as a virtual road paint that clearly indicates a near boundary of the pedestrian crossing CW. Herein, the near boundary indicates a boundary close to the own vehicle.

The display mode of pedestrian crossing content CTcw is changed according to the position of the pedestrian Ped with respect to the pedestrian crossing CW. When the pedestrian Ped is located around the pedestrian crossing and crossing on the pedestrian crossing CW is not yet started by the pedestrian, the pedestrian crossing content CTcw is set to have a length in extension direction slightly longer than a width of the own travelling lane Lns of vehicle (see FIG. 12). When the pedestrian Ped is in crossing state on the pedestrian crossing CW, the crosswalk content CTcw is set to have a length in extension direction to cover the own travelling lane Lns and an oncoming lane within the angle of view VA (see FIG. 13). The above-described pedestrian crossing content CTcw corresponds to a first superimposed content in this scene.

The road surface sign emphasizing content CTpa is the superimposed content CTs with the related object ST existing before the pedestrian crossing CW as the superimposition target. In this scene, a diamond-shaped road surface marking (road paint) provided on the road surface before the pedestrian crossing CW corresponds to the related object ST of the pedestrian crossing CW, and is set as the superimposition target of the road surface sign emphasizing content CTpa. The road surface sign emphasizing content CTpa is drawn in a diamond shape similar to the road surface sign, and is displayed in superimposed manner on the road surface sign. This road surface sign emphasizing content CTpa corresponds to a second superimposed content in this scene.

As an example, a detection range of the front camera 31 may be set to about 50 meters to 100 meters in front direction of the own vehicle. The superimposition range SA of the contents by the HUD 20 may be set to about 100 meters to 120 meters in front direction of the own vehicle. The road surface sign on the foremost side is provided at a position 50 meters in front direction of the pedestrian crossing CW. In the above case, the display generation unit 109 may fail to determine the presence or absence of the pedestrian Ped in the vicinity of the pedestrian crossing CW at the time when the diamond-shaped road surface sign enters the superimposition range SA. Therefore, the display generation unit 109 may superimpose and display the road surface sign emphasizing content CTpa regardless of the presence or absence of the pedestrian Ped in consideration of the detection range of the front camera 31 and the superimposition range SA of the HUD 20. Based on this configuration, it is possible to require the occupant to pay attention to the pedestrian crossing CW outside the angle of view VA at an early stage.

The display generation unit 109 may obtain a situation ahead of the detection range of the front camera 31 by, for example, road-to-vehicle communication. As an example, the display generation unit 109 may refer to the received information provided from the V2X communication device 46 to the external information acquisition unit 105, and obtains an existence of pedestrian Ped at a point (time point), for example, about 300 meters before the pedestrian crossing CW. In this case, the display generation unit 109 may displays virtual paint content CTvp in superimposed manner on the road surface before the actual diamond-shaped road surface sign (see FIG. 14).

Similar to the road surface sign emphasizing content CTpa, the virtual paint content CTvp is drawn in a diamond shape and is displayed in superimposed manner on the road surface at equal intervals so as to be spaced from the road surface sign. By the virtual paint content CTvp, the virtual road paint in AR display mode is added before the actual road paint, and the virtual paint content can notify the existence of the pedestrian crossing CW before the actual road paint enters the angle of view VA. In a case where an approach section to the pedestrian crossing CW has a curved shape and the pedestrian crossing CW and the diamond-shaped road surface sign are difficult to enter the angle of view VA, the virtual paint content CTvp provides convenience to the driver by notifying existence of the pedestrian crossing CW at an early time.

The display generation unit 109 may switch display of the virtual paint content CTvp between activated state and deactivated state according to the traveling speed of the vehicle A. As an example, when the vehicle A is traveling at a speed equal to or higher than a predetermined speed (for example, 20 km/h), the display generation unit 109 permits the display of the virtual paint content CTvp. When the vehicle A is travelling at a speed lower than the predetermined speed, the display generation unit 109 may deactivate the display of the virtual paint content CTvp.

The display generation unit 109 determines whether the current time is nighttime (dark place) as one of specific scene. The display generation unit 109 may determine whether the current time is daytime or nighttime based on the time information and the detection information of the front camera 31. When determining that the current time is nighttime, the display generation unit 109 changes a condition for displaying the pedestrian crossing content CTcw. Specifically, when the current time is daytime, the display generation unit 109 displays the pedestrian crossing content CTcw in response to existence of the pedestrian Ped as described above. When the current time is nighttime, the display generation unit 109 requires the occupant to pay attention to the pedestrian crossing CW by displaying the pedestrian crossing content CTcw regardless of the presence or absence of the pedestrian Ped on the pedestrian crossing in response to the point determination unit 106 determining the existence of the pedestrian crossing CW. Based on this configuration, in a case where the recognition of the pedestrian Ped is likely to be insufficient only by the activated headlight of the vehicle A at nighttime, the pedestrian crossing CW where the pedestrian Ped may exist can be securely alerted to the occupant.

The display generation unit 109 determines a presence of a traffic light installed to the pedestrian crossing CW as another specific scene. The display generation unit 109 enables the display of the pedestrian crossing content CTcw as described above for the pedestrian crossing CW without a traffic light. The display generation unit 109 excludes the pedestrian crossing CW with a traffic light from the alert targets. With this configuration, the pedestrian crossing content CTcw is not displayed to the occupant for the pedestrian crossing CW with a traffic light. As a result, it is possible to prevent the driver from being attracted by the emphasized display of road surface paint corresponding to the pedestrian crossing content CTcw in a case where the driver is required to recognize the traffic light.

In the scene of requiring the occupant to pay attention to the pedestrian crossing CW, the display generation unit 109 determines the risk level of the pedestrian crossing CW with respect to the own vehicle. Similar to the temporary stop scene, the display generation unit 109 determines the risk level as high level or low level. When the display generation unit 109 determines that the vehicle speed is higher than the threshold and thereby determining the risk level of the pedestrian crossing CW is high level, the existence of pedestrian crossing CW is notified to the occupant by the pedestrian crossing content CTcw regardless of existence of the pedestrian. When the display generation unit 109 determining the risk level of the pedestrian crossing CW is low level, the display generation unit 109 displays the pedestrian crossing content CTcw only when the pedestrian Ped exists as described above.

Further, the display generation unit 109 may adjust the superimposition position of the pedestrian crossing content CTcw based on the accuracy of the map data in the scene of attention to pedestrian crossing CW. Specifically, when the accuracy of the map data is low, the display generation unit 109 shifts the superimposition position of the pedestrian crossing content CTcw to a position before the pedestrian crossing CW compared with a case where the accuracy of the map data is high. A margin (an allowance) set to the superimposition position of the pedestrian crossing content CTcw may be smaller than a margin set to the superimposition position of the temporary stop content CTstop. Usually, the pedestrian crossing CW has a road sign with a larger depth compared with a road sign of the temporary stop line. Thus, the superimposition position of the pedestrian crossing may be set with a lower accuracy compared with the temporary stop line, and a shift in the front-rear direction and the up-down direction is allowed for the pedestrian crossing content. As an example, when drawing the contents using the navigation map data, the superimposed position of the pedestrian crossing content CTcw is set to a position about 3 meters before the near end of the pedestrian crossing CW. As described above, even when the display position shifts due to the accuracy of the map data, the pedestrian crossing content CTcw can be always displayed before a far end of the pedestrian crossing CW. When the contents are generated using the navigation map data, the margins set to the caution contents may be the same as one another regardless of the type of the caution point CP.

(Scene 4: Attention to School Zone)

Figure 15:
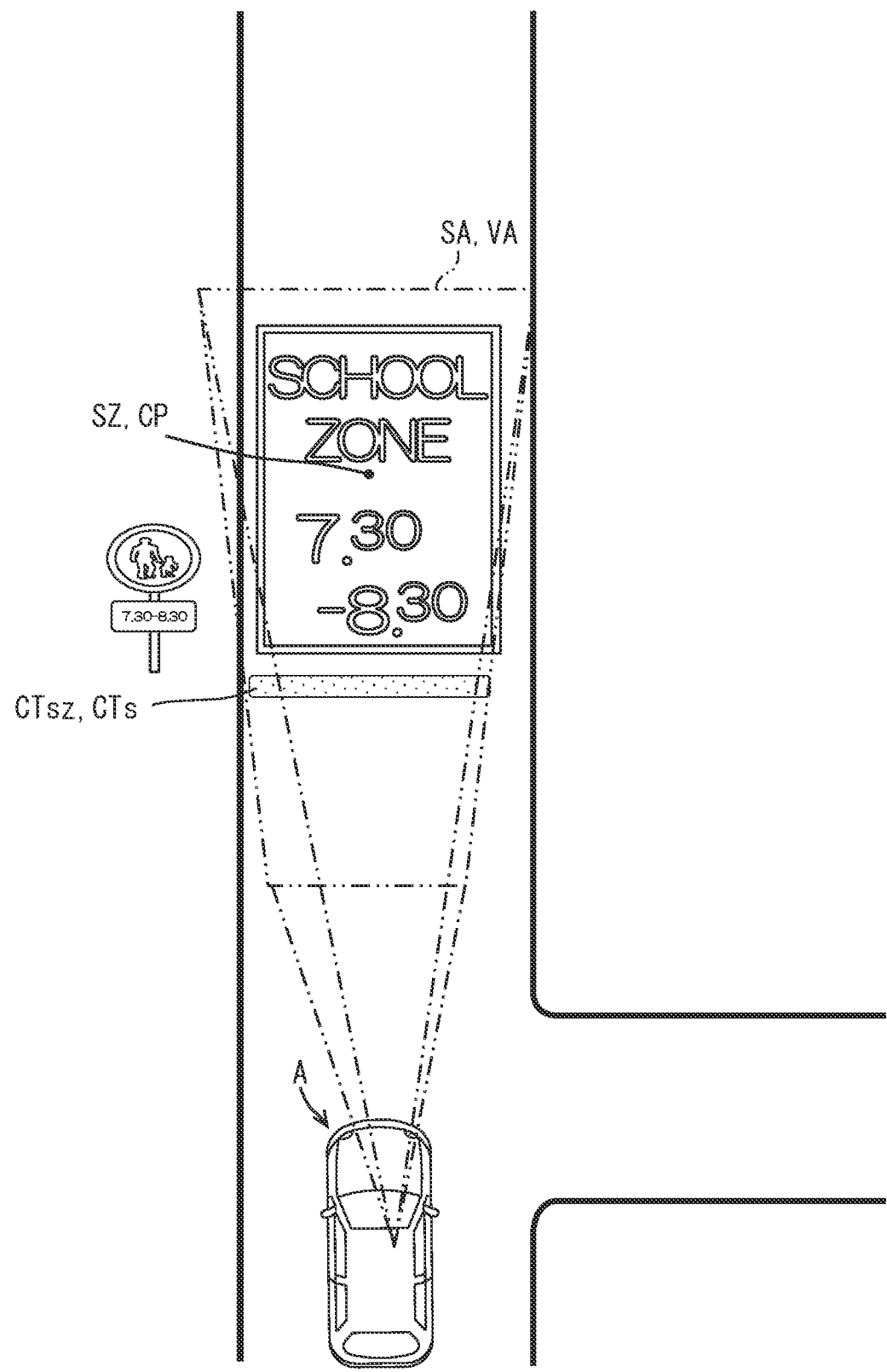
FIG. 15 is a diagram showing a display example in a situation of approaching toward a school zone.

FIG. 15 shows a scene that requires attention to a school zone SZ. In this scene, when the point determination unit 106 determines that the school zone SZ exists, the display generation unit 109 determines whether the current time is included in a regulation time zone during which the traffic regulation of the school zone SZ is effective. The display generation unit 109 displays a school zone content CTsz that indicates an existence of the school zone SZ to the occupant when existence of school zone SZ is determined and the current time is included in the regulation time zone.

When the road surface sign of the school zone SZ is outside the angle of view VA, the display generation unit 109 displays a non-superimposed icon CTn indicating existence of the school zone SZ as the school zone content CTsz. When the road surface sign of the school zone SZ enters the angle of view VA, the school zone content CTsz is changed from the non-superimposed content to the superimposed content CTs.

The school zone content CTsz as the superimposed content CTs is drawn in a band shape extending in the width direction of the road. The school zone content CTsz is displayed in superimposed manner on a near end of the road paint of school zone SZ in the foreground, or slightly (for example, about 1 meter) before the near end of the road paint of school zone SZ. The school zone content CTsz is displayed in AR mode as a virtual road paint that emphasizes an entrance boundary of the school zone SZ.

In this scene which requires attention to the school zone, the display generation unit 109 may determine whether the risk level of the school zone SZ, which is the alert target, is high level or low level with respect to the own vehicle. When the vehicle speed is higher than the threshold value, the display generation unit 109 determines that the risk level of the school zone SZ is high level, and then superimposes the school zone content on the entrance of the school zone SZ regardless of whether the current time is included in the regulation time zone. When the display generation unit 109 determines that the risk level of the school zone SZ is low level, the display generation unit 109 displays the school zone content CTsz only when the current time is included in the regulation time zone as described above.

The display generation unit 109 may adjust the superimposition position of the school zone content CTsz based on the accuracy of the map data in this scene which requires attention to the school zone SZ. When drawing the contents based on the navigation map data, the display generation unit 109 may shift the superimposition position of the school zone content CTsz to a position before the road paint of the school zone SZ, as compared with a case where the drawing of contents is performed based on the high-precision map data. As an example, the superimposition position of the school zone content CTsz may be set to a position about 3 meters before the road paint end of the school zone SZ, similar to the scene which requires attention to the pedestrian crossing CW.

(Scene 5: Attention to Road Construction Section)

Figure 16:
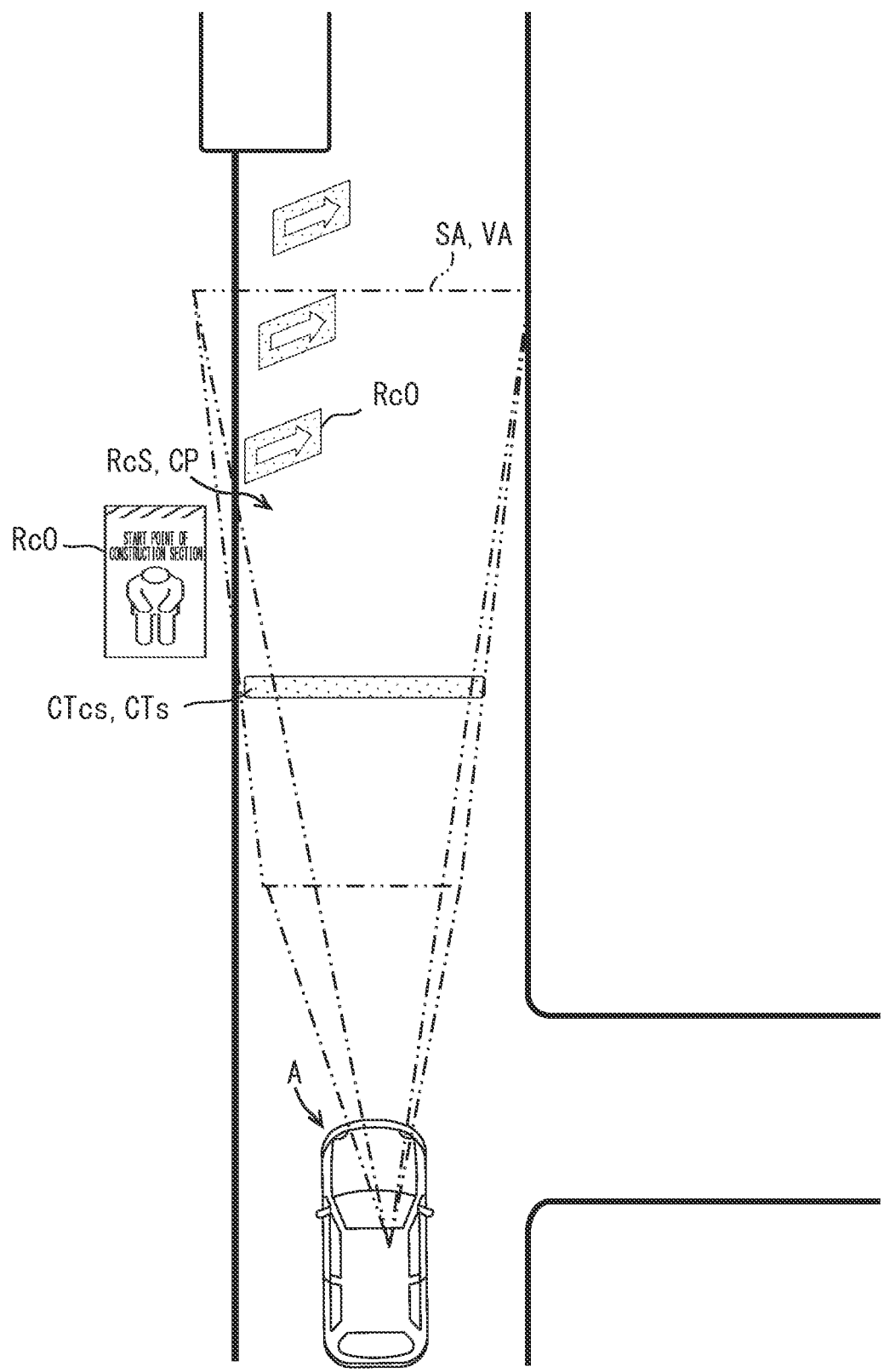
FIG. 16 is a diagram showing a display example in a situation of approaching toward a road construction section.

FIG. 16 shows a scene that requires attention to a road construction section RcS. In this scene, when the point determination unit 106 determines that the road construction section RcS exists, the display generation unit 109 displays the construction section content CTcs indicating existence of the road construction section RcS to the occupant.

The display generation unit 109 obtains a start point of the road construction section RcS based on traffic regulation information acquired through, for example, a radio wave beacon and an optical beacon. When the road surface at the start point of the road construction section RcS is outside the angle of view VA, the display generation unit 109 displays a construction section content CTcs as the non-superimposed content CTn. In this case, a non-superimposed icon indicating that the road construction is being carried out is displayed in the angle of view VA. Then, when the road surface at the start point of the road construction section RcS enters the angle of view VA, the construction section content CTcs is changed from the non-superimposed content CTn to the superimposed content CTs.

When displaying the construction section content CTcs as the superimposed content CTs, the construction section content CTcs is drawn in a band shape extending in the width direction of the road, similarly to the school zone content CTsz (see FIG. 15). The point determination unit 106 superimposes and displays the construction section content CTcs on the road surface at the start point of the road construction section RcS. The display generation unit 109 may adjust the superimposition position of the construction section content CTcs based on the detection information such as a construction target RcO related to the road construction recognized by the front camera 31. For example, the construction target RcO may be a sign board or a guide board installed on a roadside or installed on a road. The display generation unit 109 may move the construction section content CTcs to the road surface before the construction target RcO.

When the display generation unit 109 obtains an end point of the road construction section RcS based on the traffic regulation information, the display generation unit 109 may display a non-superimposed icon or a superimposed content CTs indicating the end of the road construction section RcS. A content notifying the end point of the road construction section RcS may be displayed in a mode that the content notifying the end point of the road construction section is less attractive than the content notifying the construction section content CTcs.

(Scene 6-1: Advance Notice of Automatic Deceleration)

Figure 17:
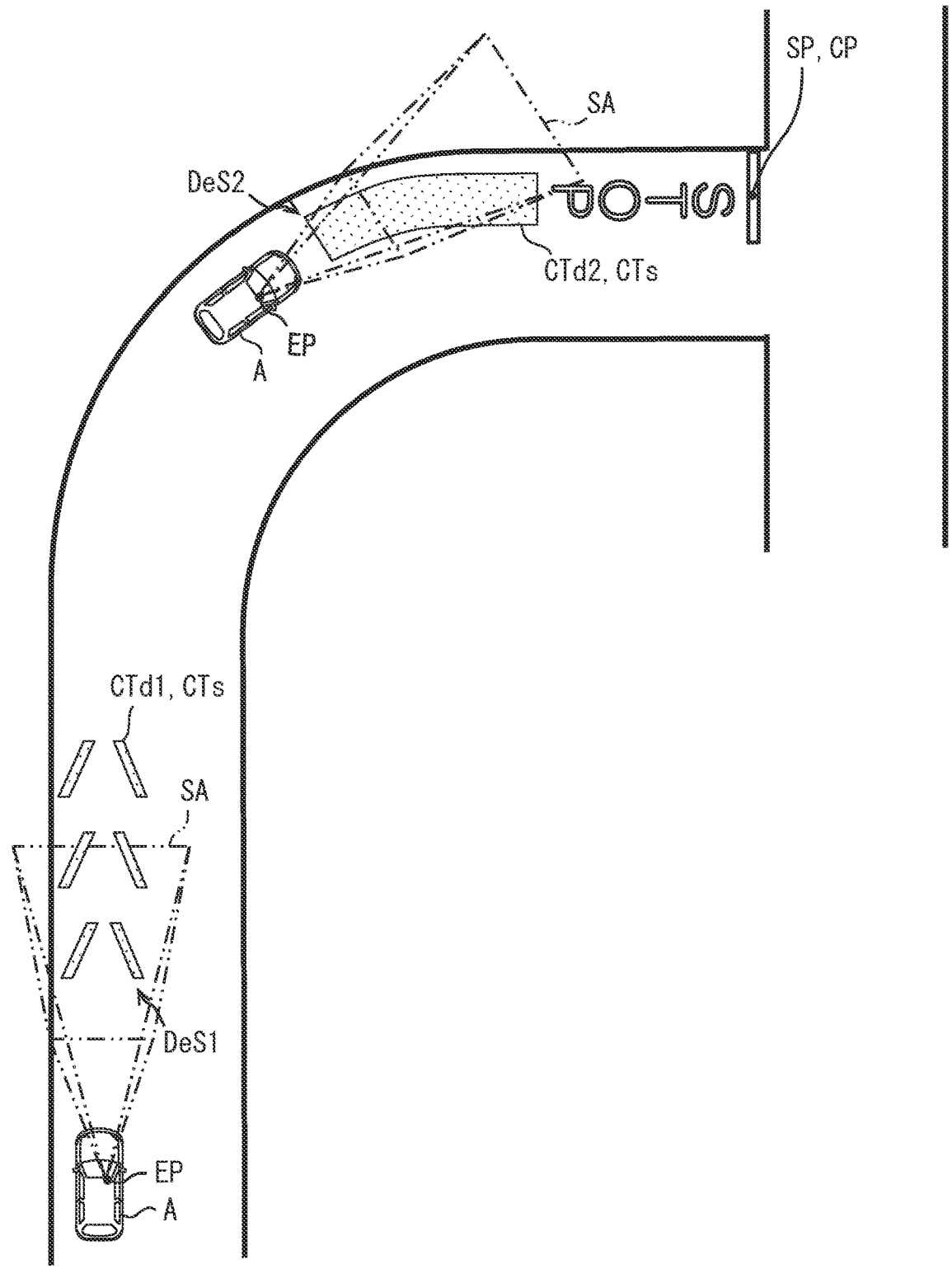
FIG. 17 is a diagram showing a display example in a situation where an automatic deceleration is carried out by a general road vehicle speed control function.
Figure 18:
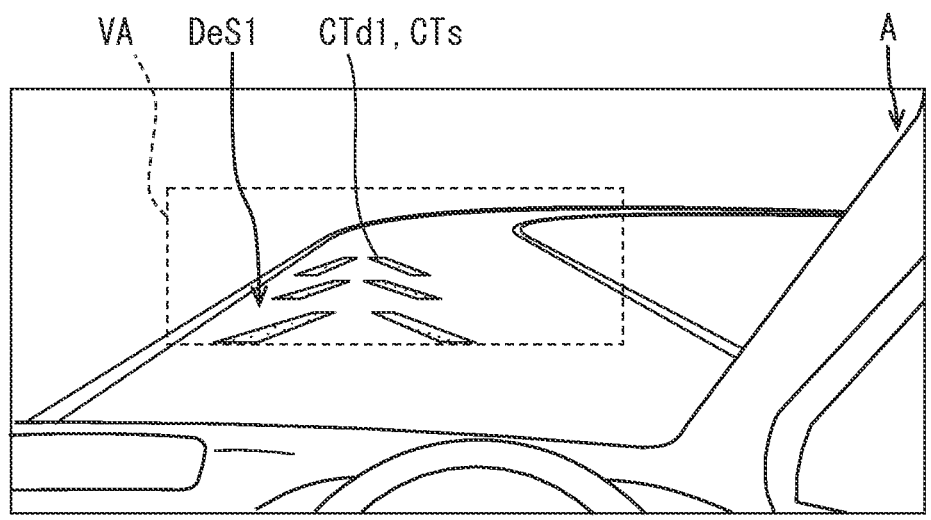
FIG. 18 is a diagram showing a display example of automatic deceleration notification before a curve.
Figure 19:
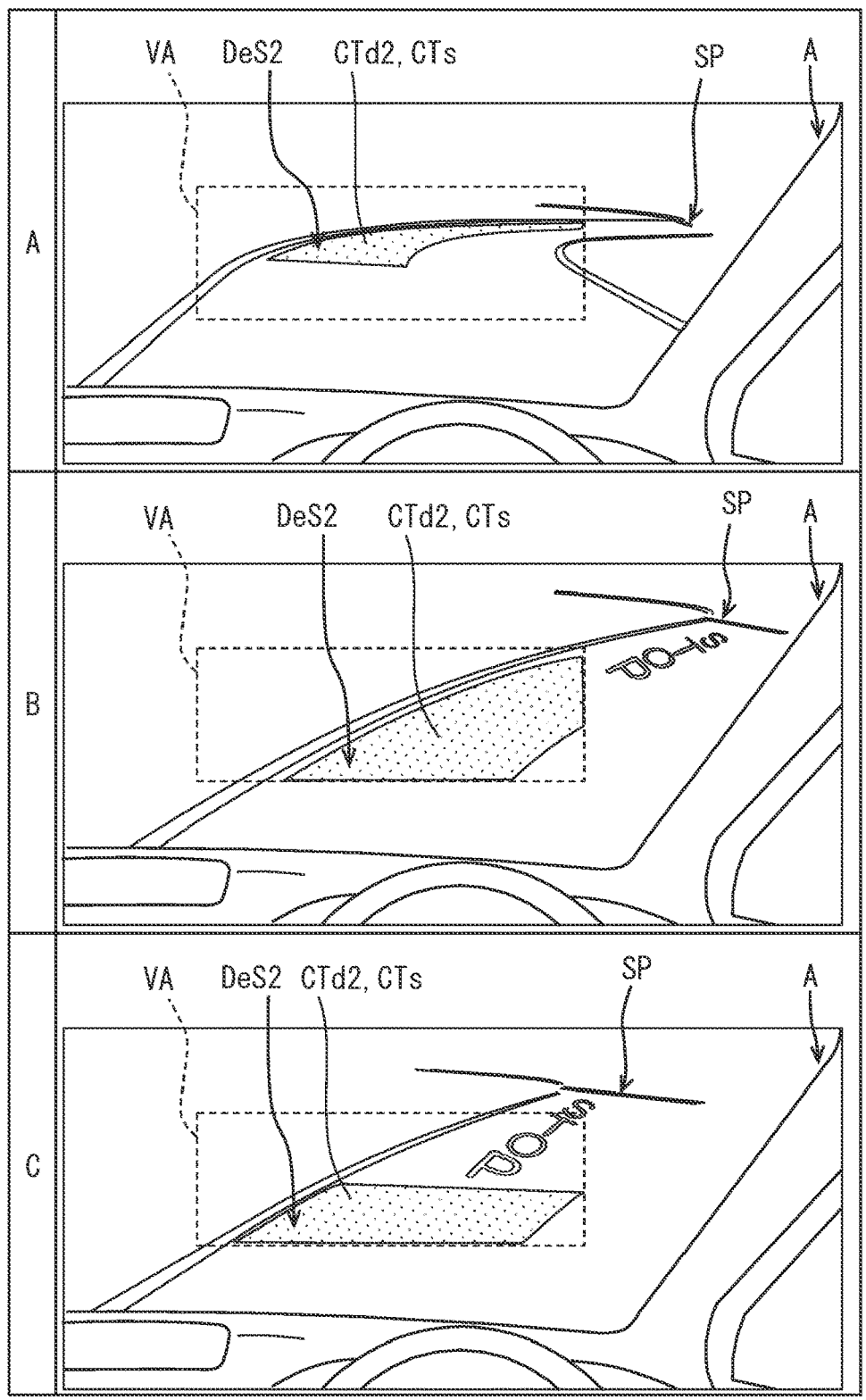
FIG. 19 is a diagram showing a display example of automatic deceleration notification before a temporary stop point.

FIG. 17 to FIG. 19 show a scene in which the vehicle speed control unit 50a notifies an automatic deceleration in advance. In this scene, the virtual layout unit 108 obtains an execution schedule of the deceleration control to be executed by the vehicle speed control unit 50a based on the control information acquired by the behavior information acquisition unit 103. The display generation unit 109 displays a deceleration notification content for notifying, in advance, the deceleration control execution based on the deceleration control execution schedule obtained by the virtual layout unit 108.

When the virtual layout unit 108 obtains the deceleration control execution schedule and a deceleration control execution section exists before the caution point CP, the virtual layout unit 108 executes a display arbitration between the deceleration notification content and the caution content. The display generation unit 109 restricts the display of caution content when the deceleration notification content is determined to be displayed based on the result of the display arbitration performed by the virtual layout unit 108. In this scene, the display generation unit 109 deactivates the display of caution content. Specifically, in a deceleration section DeS1 positioned before a curve, which will be described later, the display of sign icon ICs that requires attention to the temporary stop point SP is deactivated. According to such display restriction, it is possible to prevent a situation where the deceleration executed before a curve is mistaken as the deceleration for making a temporary stop. The display generation unit 109 may display the caution content so as not to overlap with the deceleration notification content, or may continue to display the caution content by decreasing a size of the caution content.

The vehicle A in this scene is traveling on a road that has a sharp curve in front of the temporary stop point SP, and the vehicle A travels toward the temporary stop point SP. In this scene, the general road vehicle speed control function performs deceleration control within two sections, that is, a deceleration section DeS1 before the curve and a deceleration section DeS2 before the temporary stop point.

The deceleration section DeS1 before the curve is a linear section which exists before an entrance of the curve. The higher the traveling speed of the vehicle A, the more the deceleration section DeS1 before the curve extends toward a near side (own vehicle side). In the deceleration section DeS1 before the curve, the vehicle A decelerates to a predetermined traveling speed (for example, 20 to 30 km/h) in order to stably travel the curve.

The deceleration section DeS2 is set to before the temporary stop sign of "stop" which is positioned before the temporary stop line. In the deceleration section DeS2 positioned before the temporary stop point, the vehicle A decelerates the speed to a predetermined low speed so that the vehicle A can stably stop before the temporary stop line. In a case where the driver does not execute a braking operation, the general road vehicle speed control function may extend the deceleration section DeS2 positioned before the temporary stop and stop the vehicle A immediately before the temporary stop line.

The display generation unit 109 notifies the driver, by deceleration notification contents CTd1 and CTd2, that the general road vehicle speed control function is activated and the vehicle A is to be automatically decelerated. When the virtual layout unit 108 determines that the deceleration section DeS1 positioned before the curve has entered the angle of view VA (superimposition range SA), the display generation unit 109 starts display of deceleration notification content CTd1 (see FIG. 18).

The deceleration notification content CTd1 is a superimposed content CTs including the road surface of the deceleration section DeS1 positioned before the curve. The road surface of the deceleration section DeS1 is a superimposition target of the deceleration notification content CTd1. As an example, the display generation unit 109 displays multiple pairs of left and right band-shaped images in the traveling direction on the road surface of the deceleration section DeS1 positioned before the curve. When viewed from the eye point EP, a distance between the pair of left and right band-shaped images is defined to be wider on the own vehicle side and becomes narrower toward a front side apart from own vehicle in a state projected on the road surface of the deceleration section DeS1 positioned before the curve. The display generation unit 109 continues to display the deceleration notification content CTd1 by repeatedly drawing of multiple pairs of left and right band-shaped images until the virtual layout unit 108 determines that the deceleration section DeS1 positioned before the curve is outside the angle of view VA.

When the virtual layout unit 108 determines that the deceleration section DeS2 before the temporary stop point has entered the angle of view VA (superimposition range SA), the display generation unit 109 starts display of the deceleration notification content CTd2 (see A of FIG. 19). The deceleration notification content CTd2 is a superimposed content CTs including the road surface of the deceleration section DeS2 positioned before the temporary stop point. The road surface of the deceleration section DeS2 is a superimposition target of the deceleration notification content CTd2. The deceleration notification content CTd2 has a shape different from that of the deceleration notification content CTd1. As an example, the display generation unit 109 displays the deceleration notification content CTd2 in a manner of filling the road surface of the deceleration section DeS2 positioned before the temporary stop. The display color, luminance, and the like of the deceleration notification content CTd2 may be set so that the deceleration notification content CTd2 is less attractive than the deceleration notification content CTd1.

Within the angle of view VA, the display generation unit 109 displays the deceleration notification content CTd2 in an area that overlaps with the deceleration section DeS2 positioned before the temporary stop point as the content indicates the planned travelling route of the own vehicle (see B of FIG. 19). The display generation unit 109 continues to display the deceleration notification content CTd2 while successively updating the drawing shape until the virtual layout unit 108 determines that the deceleration section DeS2 positioned before the temporary stop point is outside the angle of view VA. In accordance with the traveling of own vehicle, the deceleration notification content CTd2 is framed out of the angle of view VA since the deceleration section DeS2 positioned before the temporary stop point moves in rear direction (see C of FIG. 19).

Figure 20:
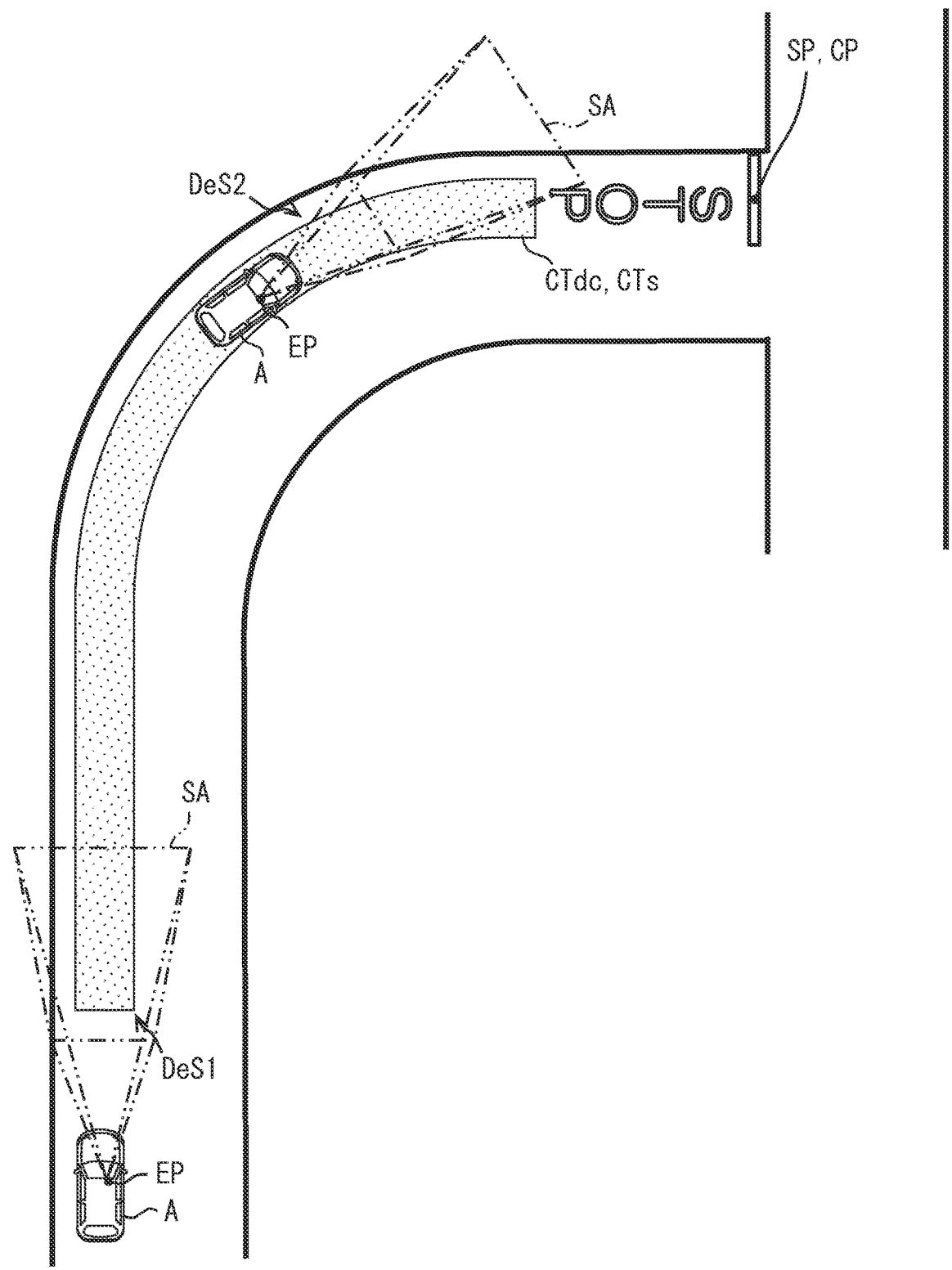
FIG. 20 is a diagram showing another display example of automatic deceleration notification.

The general road vehicle speed control function may continue the activated state from the deceleration section DeS1 positioned before the curve to the deceleration section DeS2 positioned before the temporary stop point, although the deceleration operation may be interrupted in the middle. Therefore, as shown in FIG. 20, the display generation unit 109 may display the deceleration notification content CTdc that integrally notifies the deceleration section DeS1 positioned before the curve and the deceleration section DeS2 positioned before the temporary stop point.

Similar to the deceleration notification content CTd1 (see FIG. 17), the display of deceleration notification content CTdc may start at a time when the deceleration section DeS1 positioned before the curve enters the angle of view VA. The deceleration notification content CTdc continues to be displayed in the superimposed manner on the road surface even when the automatic deceleration is temporarily interrupted in a section between the deceleration section DeS1 positioned before the curve and the deceleration section DeS2 positioned before the temporary stop point. Similar to the deceleration notification content CTd2 (see FIG. 17), the deceleration notification content CTdc continues to be displayed until the deceleration section DeS2 positioned before the temporary stop point is outside the angle of view VA. As described above, the deceleration notification content CTdc can indicate to the driver that the general road vehicle speed control function is in the activated state even though the automatic deceleration is temporarily interrupted. This configuration can provide, to the driver, improved sense of security.

(Scene 6-2: Advance Notice of Automatic Deceleration/ with Brake Operation)

Figure 21:
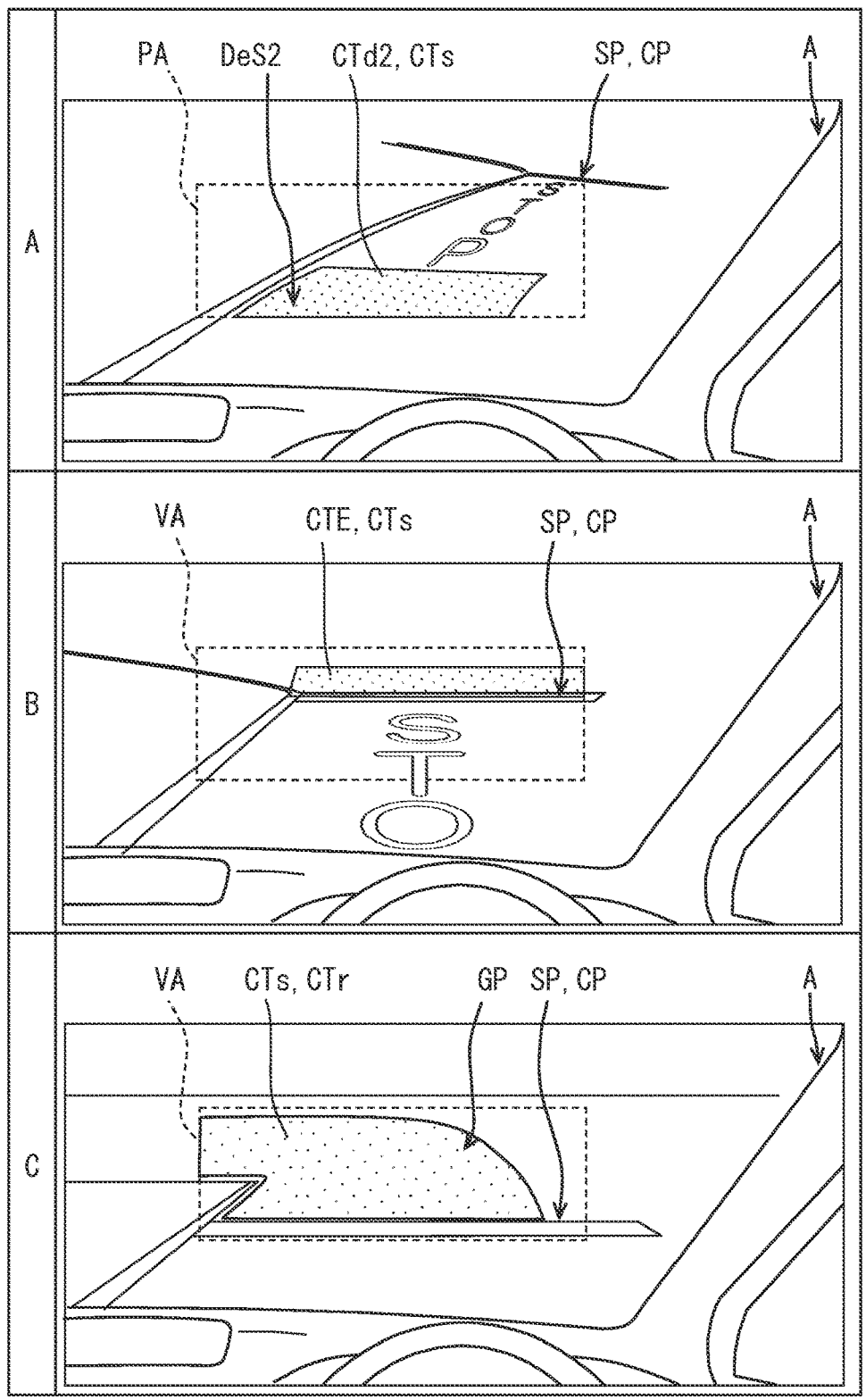
FIG. 21 is a diagram showing a display example of emphasized temporary stop point displayed in response to an execution of automatic deceleration.
Figure 22:
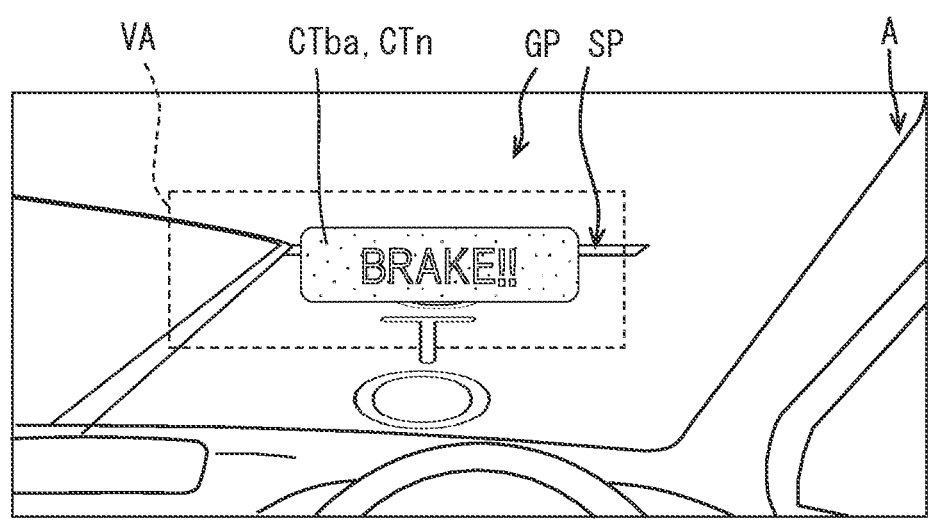
FIG. 22 is a diagram showing a display example of brake execution request to a driver.

FIG. 21 and FIG. 22 show a scene of notifying automatic deceleration by the vehicle speed control unit 50a before the temporary stop line similar to the case shown in FIG. 19. In this scene, the general road vehicle speed control function decelerates the vehicle A to a predetermined speed (for example, 20 km/h). In this scene, after automatically decelerating the vehicle to the predetermined speed, the brake operation for stopping the vehicle A needs to be performed by the driver.

Similar to the case where the general road vehicle speed control function stops the vehicle A, the display generation unit 109 superimposes the deceleration notification content CTd2 on the deceleration section DeS2 positioned before the temporary stop road surface sign "stop" (see A of FIG. 21). As the vehicle A approaches the temporary stop point SP, the deceleration notification content CTd2 moves out of the angle of view VA together with the deceleration section DeS2 positioned before the temporary stop point, and is not displayed.

When the vehicle speed control unit 50a performs deceleration control before the temporary stop point SP, which corresponds to the caution point CP, the display generation unit 109 deactivates display of the deceleration notification content CTd2 and then displays a stop emphasis content CTE (see B of FIG. 21). The stop emphasis content CTE is a superimposed content CTs that is displayed in place of the temporary stop content CTstop (see FIG. 10). The stop emphasis content CTE displays the caution point CP with a higher emphasized degree than the temporary stop content CTstop.

As an example, the stop emphasis content CTE is displayed in a wall-shape which extends in the left-right direction along the temporary stop line. The stop emphasis content CTE is drawn to have a posture raised with respect to the road surface compared with the temporary stop content CTstop. The stop emphasis content CTE is displayed in a color that is more attractive than the temporary stop content CTstop, and emphasizes the superimposed temporary stop line.

When a display end condition of the stop emphasis content CTE is satisfied, the display generation unit 109 ends display of the content related to the general road vehicle speed control function. As an example, when the own vehicle stops, or when the temporary stop point SP is outside the angle of view VA, the display generation unit 109 determines that the end condition is satisfied. After ending display of the content related to the general road vehicle speed control function, the display generation unit 109 may restart the superimposed display of the route content CTr to, for example, the guidance point GP (see C of FIG. 21).

The display generation unit 109 displays the above-mentioned stop emphasis content CTE when the brake operation by the driver is started after the automatic deceleration executed by the general road vehicle speed control function. When the brake operation by the driver is not started after the automatic deceleration, the display generation unit 109 may deactivate display of the deceleration notification content CTd2 and then display a brake warning content CTba instead of the stop emphasis content CTE (see FIG. 22).

The brake warning content CTba is a non-superimposed content CTn displayed in the center of the angle of view VA. The brake warning content CTba is drawn with the driver's comprehensibility and immediate notification effect as higher priority, and is mainly include a text message such as "brake". The display generation unit 109 ends the display of brake warning content CTba in response to satisfaction of the same end condition as in the case of displaying the stop emphasis content CTE. Also in this case, the display generation unit 109 may restart the superimposed display of route content CTr to the guidance point GP (see C of FIG. 21).

Figure 23:
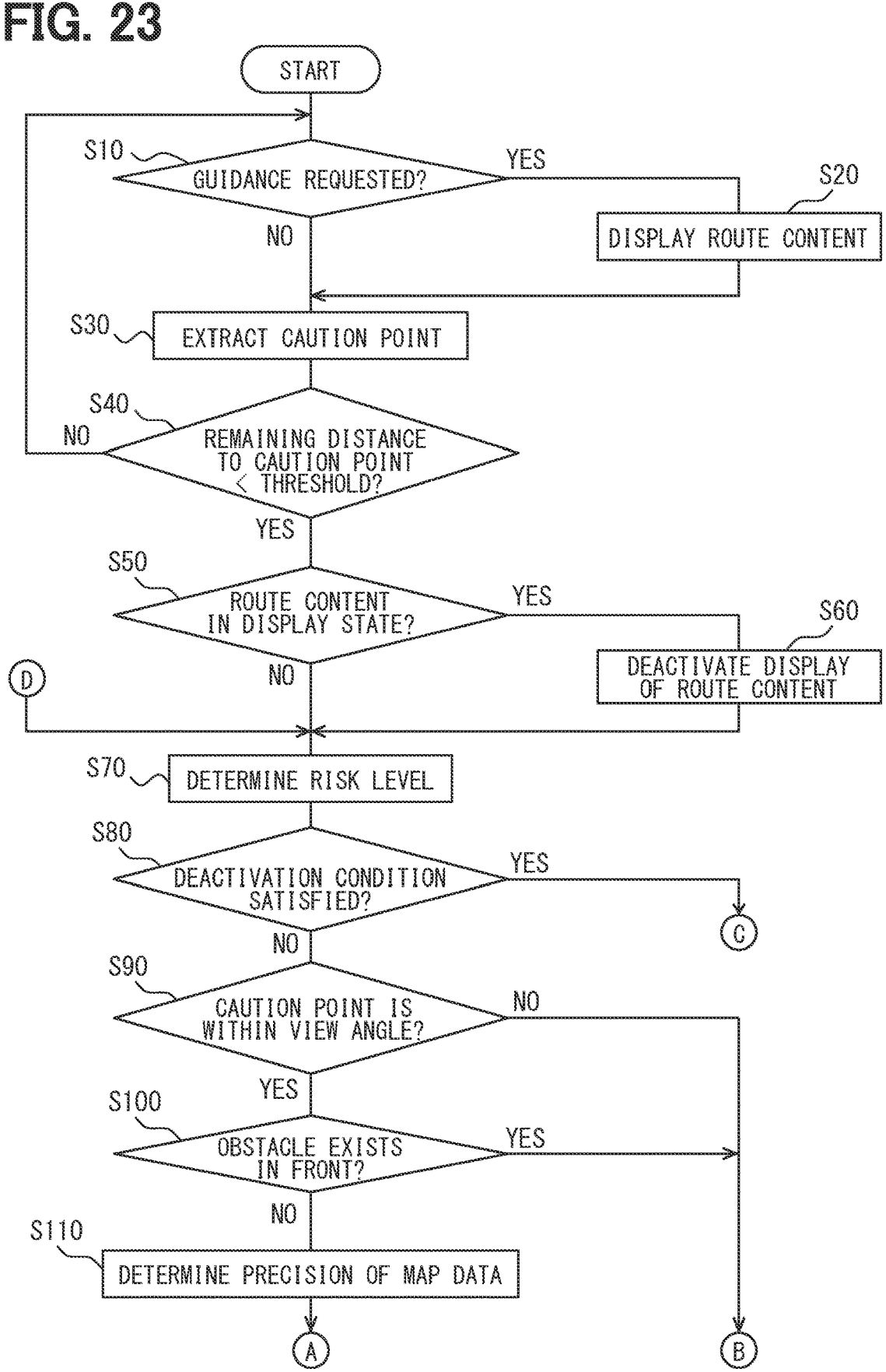
FIG. 23 is a flowchart showing an example of a display control method according to the first embodiment.
Figure 24:
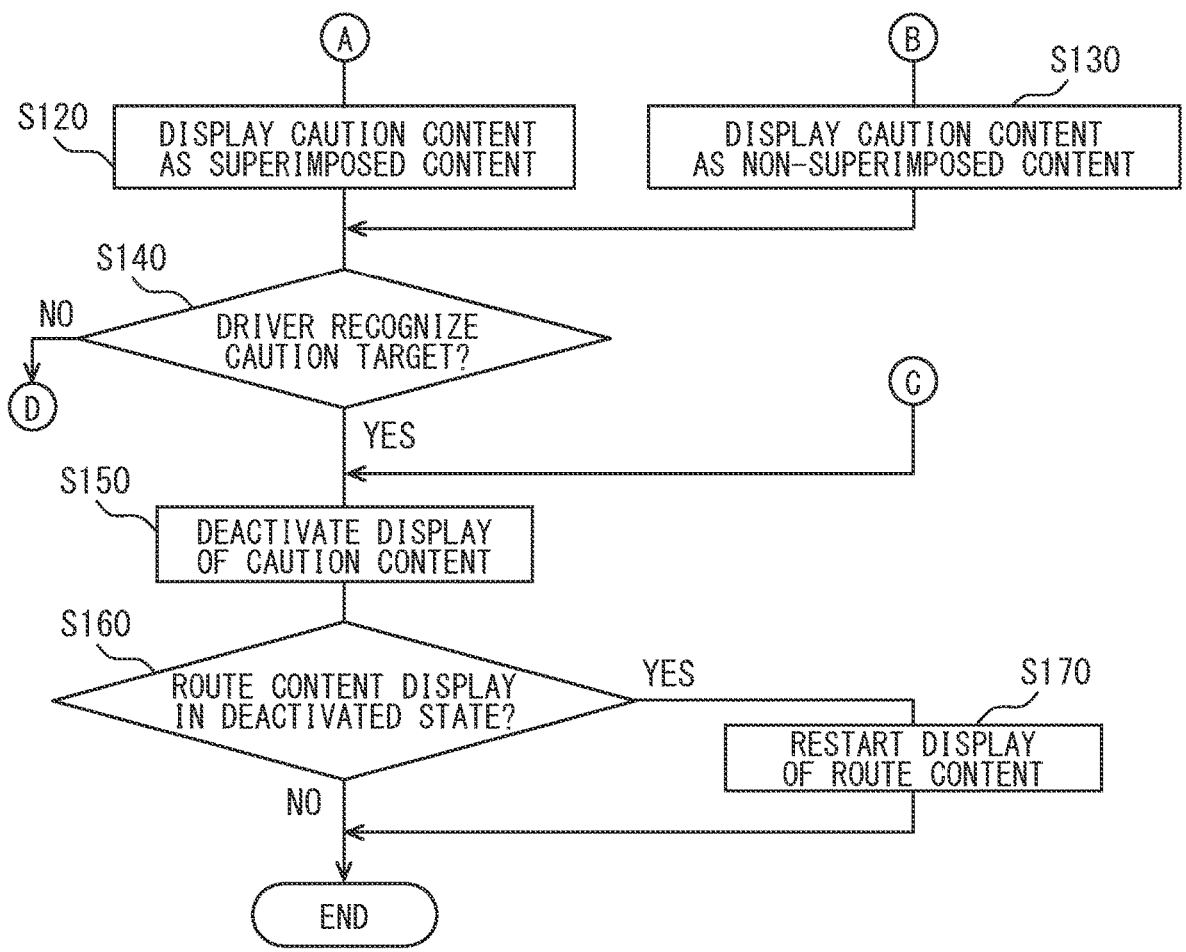
FIG. 24 is a flowchart showing an example of the display control method according to the first embodiment.
Figure 25:
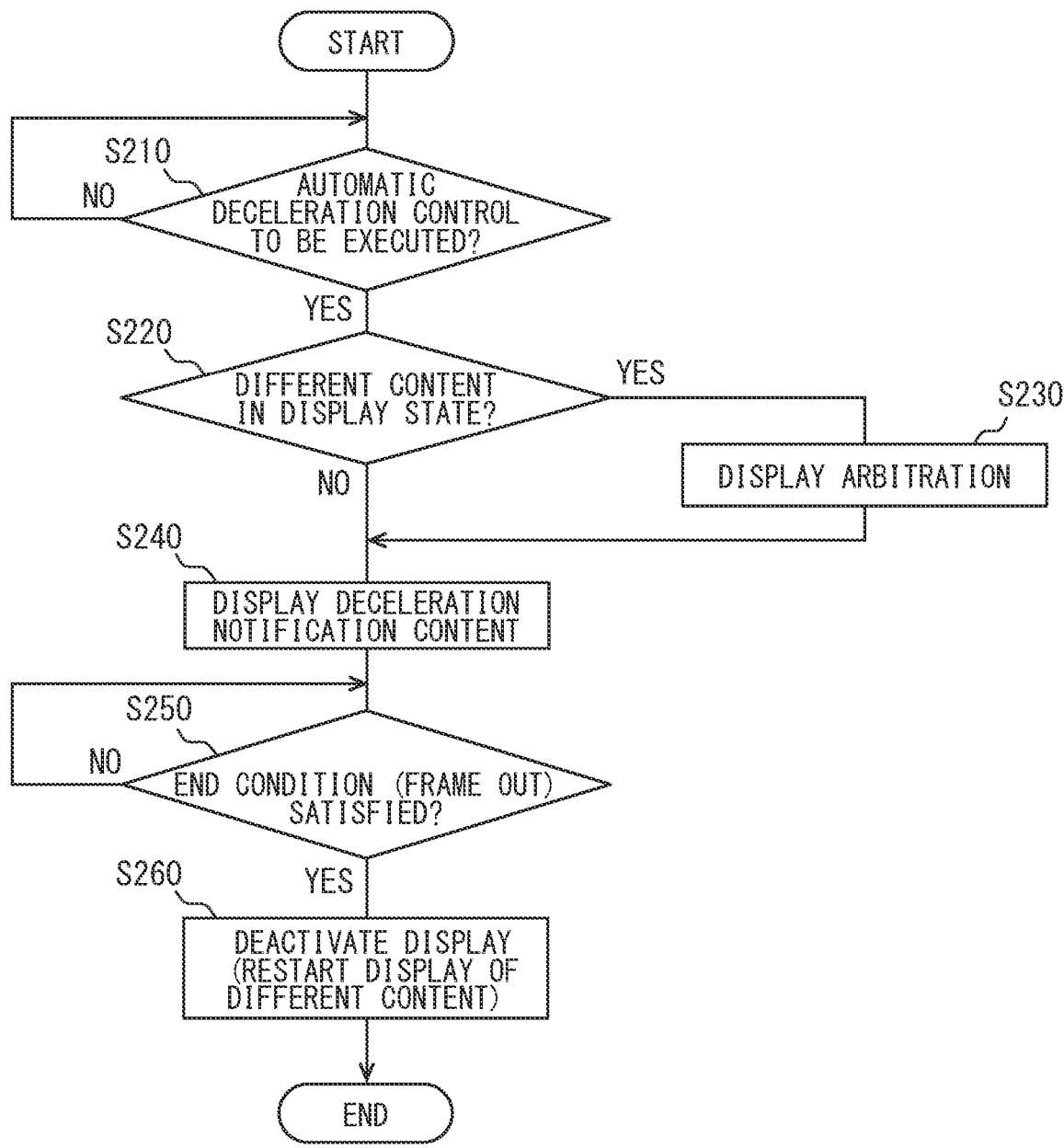
FIG. 25 is a flowchart showing an example of a display control method in a case where an automatic deceleration is executed by a general road vehicle speed control function.

The following will describe, based on display control programs, details of display control method for switching each display related to the caution point CP and details of display control method for notifying the automatic deceleration with reference to flowcharts shown in FIG. 23 to FIG. 25. In the description of display control methods, FIG. 3 and FIG. 4 to FIG. 22 may be referred. The display control process shown in FIG. 23 and FIG. 24 is executed by the HCU 100 after completing a start-up process. For example, by switching a vehicle power to an on state, the start-up process may start. The HCU 100 continuously executes the display control process until the vehicle power is turned off. The display control process shown in FIG. 25 is executed by the HCU 100 in response to an activation of the vehicle speed control unit 50a, and is continuously executed until the vehicle speed control unit 50a is turned off.

(Display Control Process Related to Caution Point)

In the display control process shown in FIG. 23 and FIG. 24, the HCU 100 determines in S10 whether a guidance execution request is received from the navigation ECU 62. When determining that the guidance execution request is received, the process proceeds to S20. In S20, the route content CTr is displayed, and the process proceeds to S30. When determining that no guidance execution request is received, the process proceeds to S30 without executing the display of route content CTr.

In S30, the caution point CP existing in front along the traveling direction is extracted, and the process proceeds to S40. In S30, the temporary stop point SP, the pedestrian crossing CW without a traffic light, the school zone SZ, or the like may be extracted as the caution point.

In S40, the process determines whether the remaining distance Lr2 from the vehicle A to the caution point CP is shorter than a threshold value. When the remaining distance Lr2 is equal to or longer than the threshold value, the process returns to S10. When determining that the remaining distance Lr2 is shorter than the threshold value, the process proceeds to S50.

In S50, the process determines whether display of the route content CTr is in activated state. When determining that display of the route content CTr is in activated state, the process proceeds to S60. In S60, the display of route content CTr is deactivated, and the process proceeds to S70. As a result, the route content CTr switches to non-displayed state. When determining in S50 that display of the route content CTr is in deactivated state, the process proceeds to S70 without executing S60.

In S70, the risk level of the caution point CP is estimated, and the process proceeds to S80. In S80, the process determines, by referring to the risk level, a condition for deactivating display of the caution content is satisfied according to the type of the caution point CP. As an example, when the pedestrian crossing CW is set as an attention target, the condition for deactivating display of the caution content is satisfied when the risk level is estimated as low level and absence of pedestrian Ped on or around the pedestrian crossing is determined, or when the current time is determined as daytime and absence of pedestrian Ped on or around the pedestrian crossing is determined. When the school zone SZ is set the attention target, the condition for deactivating display of the caution content is satisfied when the risk level is estimated as low level and the current time is out of the regulation time zone. When determining, in S80, that condition for deactivating display of the caution content is satisfied, the process proceeds to S150. When determining, in S80, that condition for deactivating display of the caution content is not satisfied, the process proceeds to S90.

In S90, the process determines whether the caution point CP is included in the angle of view VA. When determining that the caution point is included in the angle of view VA, the process proceeds to S100, and further determines whether an obstacle which blocks the caution point exists in front of vehicle. When determining that no obstacle exists, the process proceeds to S110. In S110, the process determines the accuracy of the map data used for drawing the superimposed content CTs, and the process proceeds to S120. In S120, the caution content corresponding to the type of caution point CP is displayed as superimposed content CTs, and the process proceeds to S140.

When determined in S80 that the caution point CP is out of the angle of view VA, the process proceeds to S130. When determining in S100 that an obstacle which blocks a visibility of the caution point CP exists in front of the vehicle, the process proceeds to S130. In S130, the caution content is displayed as a non-superimposed content CTn, and the process proceeds to S140. When the display of route content CTr is in deactivated state, the superimposed display of the route content CTr may be restarted in S130.

In S140, the process determines whether the driver has recognized the caution point CP. When determining that the caution point CP is not recognized by the driver, the process returns to S70. When determining that the caution point CP is recognized by the driver, the process proceeds to S150. During the display state of caution content as the superimposed content CTs in S120, when the caution point CP or the caution content moves out of the angle of view VA, the process may proceed to S150.

During the display state of the caution content as the non-superimposed content CTn in S130, when the caution point CP or the caution content moves out of the angle of view VA, the process may return to S70 regardless of the recognition determination result in S140. In other words, the determination in S140 does not have to be executed when S130 is executed immediately before. In this case, as long as the caution point CP is out of the angle of view VA, the display of the caution content as the non-superimposed content CTn is continued until the vehicle A reaches the caution point CP. When the vehicle reaches the caution point, the process may proceed to S140. In S140, when determining that the driver does not recognize the caution point CP while displaying the caution content as the superimposed content CTs, the process may proceed to S150 in response to the vehicle A reaching the caution point CP. In S150, the display of caution content is deactivated, and the process proceeds to S160.

In S160, the process determine whether the display of route content CTr is in deactivated state, that is, the process determines whether S60 has been executed. When determining that display of the route content CTr is not in deactivated state, the processes is terminated. When determining that display of the route content CTr is in deactivated state, the process proceeds to S170. In S170, the process restarts the display of route content CTr for performing the route guidance, and then the process is terminated.

(Display Control Process Related to Automatic Deceleration)

In the display control process shown in FIG. 25, the HCU 100 determines, in S210, whether there is control information indicating the execution schedule of automatic deceleration. When determining existence of control information indicating the execution schedule of automatic deceleration, the process proceeds to S220. When determining that there is no control information indicating the execution schedule of automatic deceleration, the determination in S210 is repeated, and the acquisition of the control information enters stand-by state.

In S220, the process determines whether a different content is in display state. In S220, when determining that no different content is in display state, the process proceeds to S240 to start display of the deceleration notification content. In S220, when determining that a different content, such as the route content CTr or the caution content is in display state, the process proceeds to S230.

In S230, the process performs display arbitration between the deceleration notification content and the different content in display state. Then, the process proceeds to S240, and the main display target is switched from the different content to the deceleration notification content. In S230, display arbitration may be executed to deactivate display of the different content. As another example, display arbitration may be executed to decrease a size of the different content in display state or display the different content using an icon. As another example, display arbitration may be executed to reduce an attractiveness of the different content in display state.

In S250, the process determines whether the end condition of the deceleration notification content display of which is activated in S240 is satisfied. As described above, the end condition may include a stop of the vehicle A, a deceleration of the vehicle A to a predetermined speed, a moving of the superimposition target out of the angle of view VA, or the like. When determining in S250 that the end condition is not satisfied, the display of deceleration notification content is continued.

When determining in S250 that the end condition is satisfied, the process proceeds to S260 to end the display of the deceleration notification content. In addition, in S260, the different content whose display is deactivated in the display arbitration executed in S230 is reset to the normal display state, that is, the display of different content is restarted. As a result, the display of the route content CTr is restarted. In S260, a display change from the deceleration notification content to the stop emphasis content CTE may be executed instead of resetting the different content to the normal display state.

The following will describe a configuration, an operation and effect of the HCU 100 according to the first embodiment of the present disclosure.

When the caution point CP existing in front of the vehicle along the traveling direction is included in the angle of view VA, the display generation unit 109 of the HCU 100 displays the caution content as the superimposed content CTs. When the caution point CP exists outside of the angle of view VA, the display generation unit 109 displays the caution content as the non-superimposed content CTn. Therefore, even when the caution content cannot be displayed as the superimposed content CTs, the presence of the caution point CP is notified to the driver, who corresponds to an occupant, by displaying the caution content as the non-superimposed content CTn. Thus, the HCU 100 can display caution points in an easy-to-understand manner to the occupants.

The display generation unit 109 notifies existence of the caution point CP to the occupant by the caution content, which is associated with the corresponding type. The point determination unit 106 determines the type of caution point, and provides the type information together with the determined caution point to the display generation unit 109. Therefore, the caution content can emphasize the existence of caution point CP together with the object or target that actually exists at the caution point CP. As a result, an oversight of the caution point CP can be further suppressed.

When the temporary stop point SP exists in front of the vehicle along the traveling direction, the display generation unit 109 displays the temporary stop content CTstop as the caution content. The display generation unit 109 determines the risk level of the temporary stop point SP, and displays the temporary stop content CTstop in a manner the higher the risk level, the stronger the emphasis degree of the temporary stop point SP. With this configuration, the temporary stop content CTstop can appropriately notifies the existence of temporary stop point SP while suppressing providing, to the occupant, excessive annoyance caused by the display of temporary stop content.

The display generation unit 109 displays the temporary stop content CTstop when the point determination unit 106 determines that the temporary stop point SP is related to the railroad crossing RaC. The temporary stop content CTstop in this case is configured to emphasize the temporary stop point SP compared with a case where the temporary stop point SP is determined to be not related to the railroad crossing RaC. As described above, usually, the temporary stop sign is not installed to the railroad crossing. With this configuration, the existence of temporary stop point SP can be appropriately and securely notified to the occupant when the vehicle approaches toward the railroad crossing RaC in a high-risk scene.

The display generation unit 109 displays the subsidiary stop content CTsp2 imitating the road surface sign "stop" in order to emphasize the temporary stop point SP. Therefore, even in the vicinity of the railroad crossing RaC, which usually does not have road surface sign "stop", it is possible to reliably notify the driver to make a temporary stop.

When the pedestrian crossing CW exists in front of the vehicle along the traveling direction, the display generation unit 109 determines existence of a pedestrian Ped on or around the pedestrian crossing, and then displays the pedestrian crossing content CTcw as the caution content in response to determining existence of a pedestrian Ped on or around the pedestrian crossing. With this configuration, in the scene where it is not necessary to make a temporary stop at the pedestrian crossing CW, the content that forces the temporary stop is not displayed in principle. This configuration provides improved user convenience.

When the display generation unit 109 determines that the current time is nighttime, the display generation unit 109 displays the pedestrian crossing content CTcw regardless of the presence or absence of the pedestrian Ped existing on or around the pedestrian crossing. With this configuration, it is possible to avoid a situation in which the pedestrian crossing CW is not notified to the occupant due to a bad recognition accuracy of the pedestrian Ped existing on or around the pedestrian crossing caused by the performance degradation of the front camera 31 in the nighttime.

The display generation unit 109 excludes the pedestrian crossing CW with a traffic light from the notification targets. Here, the notification targets are the pedestrian crossings that are notified to the occupant by the corresponding crossing contents CTcw. With this configuration, in the scene the vehicle approaches the pedestrian crossing with a traffic light, the pedestrian crossing content CTcw is not displayed to the occupant for the pedestrian crossing CW. With this configuration, when the actual traffic light is required to be recognized by the driver, a possibility that the driver pays attention to the temporary stop line can be prevented.

When the school zone SZ exists in front of the vehicle in the traveling direction, the display generation unit 109 determines whether the current time is included in the regulation time zone. When determining that the current time is included in the regulation time zone, the display generation unit 109 displays the school zone content CTsz as the caution content. With this configuration, in a case where the current time is not included in the regulation time zone, it is possible to prevent a display of the school zone content CTsz as if the current time is included in the regulation time zone.

The display generation unit 109 determines the risk level of the pedestrian crossing CW when the pedestrian crossing CW exists in front of the vehicle in the traveling direction. When determining that the risk level is high level, the display generation unit displays the pedestrian crossing content CTcw regardless of the presence or absence of the pedestrian Ped on or around the pedestrian crossing. The display generation unit 109 determines the risk level of the school zone SZ when the school zone SZ exists in front of the vehicle in the traveling direction. When determining that the risk level is high level, the display generation unit displays the school zone content CTsz regardless of whether the current time is included in the regulation time zone. With this configuration, each content CTcw and CTsz can assist the driver's operation so that the risk level of the caution point CP with respect to the own vehicle is decreased.

When the accuracy of the map data used for drawing the superimposed content CTs is low, the display generation unit 109 shifts the superimposition position of the superimposed content CTs to a position before the caution point CP. With this configuration, within the road section where the high-precision map data is not prepared, even when the navigation map data is used for drawing the superimposed content CTs, the driver's misidentification due to the deviation of the superimposition position can be avoided When determining that the related object ST existing before the caution point CP is included in the angle of view VA, the display generation unit 109 determines starts display of the road surface sign emphasizing content CTpa with the related object ST as the superimposition target. Therefore, the driver can recognize the existence of the caution point CP by the road surface sign emphasizing content CTpa at a time before the caution point CP enters the angle of view VA.

When the vehicle speed control unit 50a performs deceleration control before the caution point CP, the display generation unit 109 displays the deceleration notification content CTd1, which includes the deceleration section DeS1 positioned before the curve as the superimposition target, and the deceleration notification content CTd2, which includes the deceleration section DeS2 positioned before the temporary stop point as the superimposition target. Therefore, even when the general road vehicle speed control function, which is a driving support function, is activated and the vehicle A is automatically decelerated to an appropriate traveling speed, the driver can recognize the execution of the automatic deceleration in advance by the deceleration notification contents CTd1 and CTd2. As a result, the driver's reliance to the operation of the general road vehicle speed control function can be improved.

When the deceleration control is performed by the vehicle speed control unit 50a, the display generation unit 109 displays the stop emphasis content CTE that emphasizes the caution point CP (for example, the temporary stop point SP) rather than the caution content with the caution point CP as the superimposition target. As described above, when the automatic deceleration by the general road vehicle speed control function is activated, there may be a concern that the driver's awareness of driving may be lowered. Therefore, by intentionally emphasizing the caution point CP, it is possible to remind the driver that proper driving operation needs to be carried out continuously.

When displaying the deceleration notification content, the display generation unit 109 limits a display of different superimposed content CTs, such as the caution content or the route content CTr. With this configuration, it is possible to avoid a situation in which complicated information is notified to the driver by simultaneously displaying multiple different types of contents thereby increasing the driver's anxiety about automatic deceleration.

The display generation unit 109 display the temporary stop content CTstop as the non-superimposed content CTn when it is estimated that the temporary stop point SP is invisible to the driver even when the temporary stop point SP is included in the angle of view VA. With this configuration, when the temporary stop point SP in the foreground is blocked by an obstacle or the like, the display generation unit 109 can notify existence of the temporary stop point SP by the temporary stop content CTstop using the non-superimposed content CTn. Therefore, the display generation unit 109 can avoid giving the driver a sense of discomfort which is caused by superimposing the temporary stop content on the obstacle that blocks the temporary stop point SP.

When the display generation unit 109 determines that the driver recognizes the temporary stop point SP in the display state of the temporary stop content CTstop as the superimposed content CTs, the display generation unit 109 deactivates display of the superimposed content CTs. When the driver recognizes the temporary stop point SP, it is less necessary to notify the temporary stop point SP using the temporary stop content CTstop displayed in superimposed manner. In such a case, the display generation unit 109 can perform simple display inside the angle of view VA by deactivating the display of temporary stop content CTstop displayed as the superimposed content CTs.

When the display generation unit 109 determines existence of the temporary stop point SP in the display state of the route content CTr in superimposed manner, the display generation unit 109 deactivates the display of route content CTr. With this configuration, when determining the existence of temporary stop point SP, the display generation unit 109 can lead the driver's attention to the temporary stop content CTstop. In particular, since the route content CTr is switched from the displayed state to the non-displayed state, for the driver, it is possible to make impression on the temporary stop content CTstop displayed instead of the route content.

When determining that the driver has recognized the temporary stop point SP in the non-displayed state of the route content CTr, the display generation unit 109 restarts the display of route content CTr as superimposed content CTs. With this configuration, the display generation unit 109 can restart the superimposed display of the route content CTr when the need for the temporary stop content CTstop is reduced in response to the driver recognizing the temporary stop point SP. Therefore, the display generation unit 109 can control the display state of each content CTr and CTstop in consideration of the driver state, that is, the recognition state of the caution point.

The display generation unit 109 includes the arrival route icon ICr showing information about the traveling route to the temporary stop point SP in the temporary stop content CTstop to be displayed as the non-superimposed content CTn. With this configuration, when the display generation unit 109 displays the temporary stop content CTstop as the non-superimposed content CTn, the display generation unit 109 can notify not only the existence of temporary stop point SP but also information about the traveling route to the temporary stop point SP to the driver. Therefore, the display generation unit 109 can display the content to the driver in an easy-to-understand manner.

The display generation unit 109 displays the arrival route icon ICr as if the arrival route icon appears from the temporary stop point SP toward the vehicle A. The route shape near the temporary stop point SP, that is, farther from the driver is difficult to see from the driver. With this configuration, the appearance of the arrival route icon ICr can be improved by displaying the route portion near the temporary stop point at an early time to the driver.

The display generation unit 109 increases the appearance speed of the arrival route icon ICr with an increase of the speed of the vehicle A. With this configuration, the display generation unit 109 can notify to the driver a length of arrival time from the current position of the vehicle A to the temporary stop point SP by the extension speed of the arrival route icon ICr.

In the first embodiment, the locator information acquisition unit 101 corresponds to a map accuracy determination unit. The behavior information acquisition unit 103 corresponds to a control information acquisition unit. The virtual layout unit 108 corresponds to an angle of view determination unit. The display generation unit 109 corresponds to a display control unit. The HCU 100 corresponds to a display control device. Each of the temporary stop content CTstop, the pedestrian crossing content CTcw, the school zone content CTsz, and the construction section content CTcs corresponds to a caution content or a first superimposed content. The arrival route icon ICr corresponds to an arrival route content, the road surface sign emphasizing content CTpa corresponds to a second superimposed content, and the stop emphasis content CTE corresponds to an emphasis content. Each of the deceleration section DeS1 positioned before the curve and the deceleration section DeS2 positioned before the temporary stop point corresponds to a deceleration control execution section.

Second Embodiment

Figure 26:
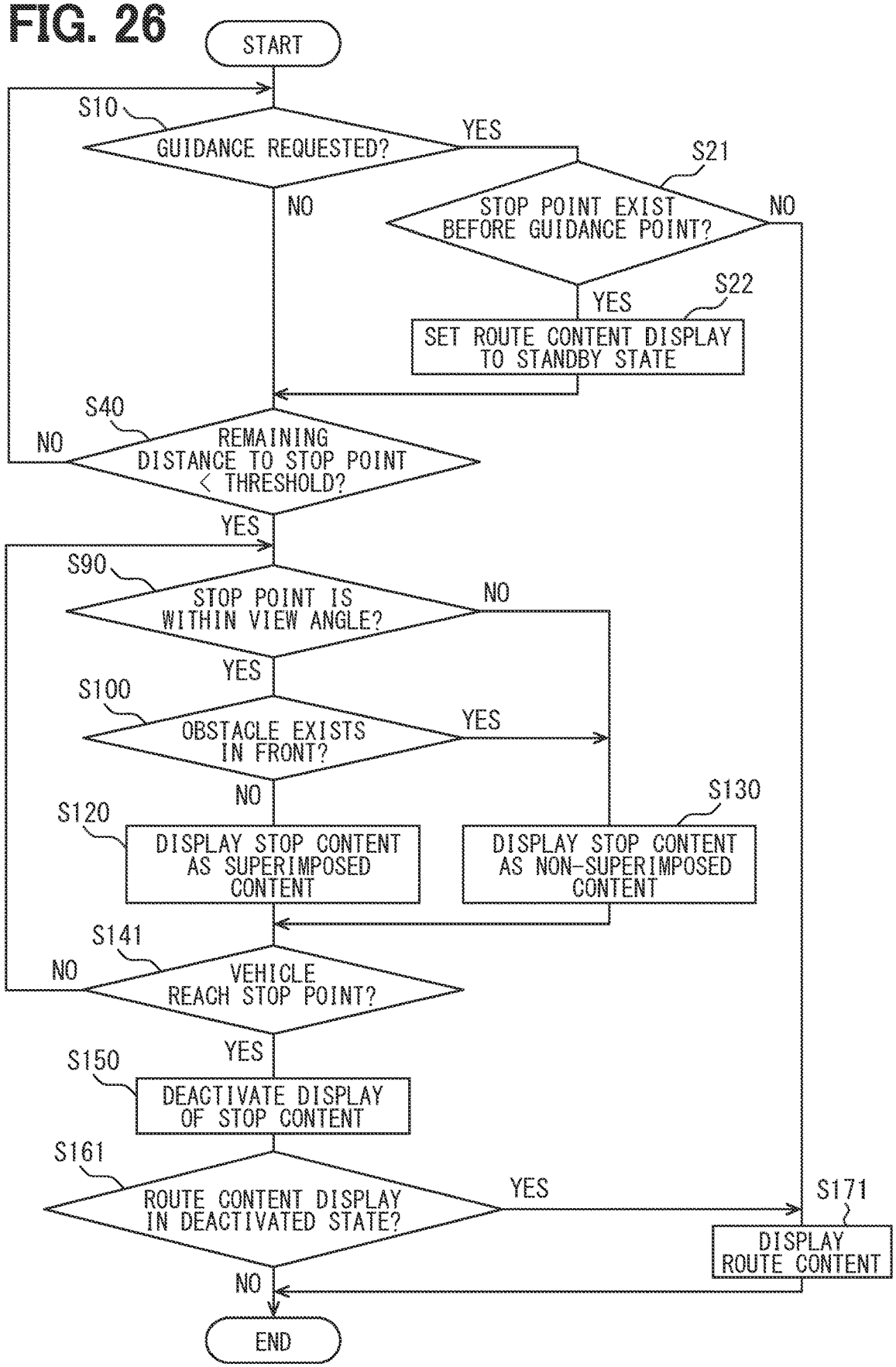
FIG. 26 is a flowchart showing an example of a display control method according to a second embodiment of the present disclosure.

The second embodiment will describe a modification of the HCU 100 described in the first embodiment. In FIG. 26, components denoted by the same reference symbols as those in the drawings of the first embodiment are similar components and exhibit the same operation and effects. In the HCU 100 of the second embodiment, the display time of the route content CTr is different from that of the first embodiment. In the second embodiment, the temporary stop point SP is set as the caution point CP, but the pedestrian crossing CW and the school zone SZ are not set as the caution point CP.

The following will describe a display control method according to the second embodiment with reference to the flowchart shown in FIG. 26. When the HCU 100 determines in S10 that guidance execution request is received, the HCU 100 proceeds to S21. In S21, the process determines existence of temporary stop point SP before the guidance point GP. Specifically, based on the vehicle position information acquired from the locator ECU 44 and the high-precision map data, the point determination unit 106 determines whether the temporary stop point SP exists in a specific section. The specific section is defined to have a predetermined threshold length from the guidance point GP toward the own vehicle.

When determining in S21 that the temporary stop point SP exists before the guidance point GP, the process proceeds to S22. In S22, the display of route content CTr is set to a standby state even though there is a guidance execution request, and the process proceeds to S40. When determining that the remaining distance Lr2 is shorter than a second threshold value in S40, the processes from S90 to S130 are executed.

When the process in S120 or the process in S130 is executed, the process proceeds to S141. In S141, the process determines whether the vehicle A has reached the temporary stop point SP. For example, when the recognition determination unit 107 determines that the driver has recognized the temporary stop point SP based on the execution of the deceleration operation, it is considered that the vehicle reaches the temporary stop point SP. Alternatively, the point determination unit 106 or the virtual layout unit 108 may simply make a determination based on the position of the vehicle A and the position of the temporary stop point SP. When determining, in S141, that the vehicle A has not reached the temporary stop point SP, the process returns to S90. When determining, in S141, that the vehicle A has reached the temporary stop point SP, the process proceeds to S150.

After executing S150, the process proceeds to S161, and determines whether the display of route content CTr is in the standby state, that is, whether the process in S22 has been executed. When determining that the display of route content CTr is not in the standby state, that is, when it is not necessary to display the route content CTr, the processes is terminated.

When determining absence of temporary stop point SP before the guidance point GP in S21, or when determining the standby state of the route content CTr in S161, the process proceeds to S171. In S171, the process restarts the display of route content CTr, and executes the route guidance.

When there is no temporary stop point SP before the guidance point GP, the route content CTr is displayed in response to the guidance execution request being acquired. When the temporary stop point SP exists before the guidance point GP, the route content CTr is not displayed until the vehicle reaches the temporary stop point SP and the display of the temporary stop content CTstop is deactivated. Therefore, according to the display control method of the second embodiment, when the vehicle approaches the temporary stop point SP, the driver can be more conscious of the stop operation of the vehicle A at the temporary stop point SP than the travelling under the route guidance.

Other Embodiments

The disclosure in the present specification is not limited to the above-described embodiments. The present disclosure includes embodiments described above and modifications of the above-described embodiments made by a person skilled in the art. For example, the present disclosure is not limited to a combination of the components and/or elements described in the embodiments. The present disclosure may be executed by various different combinations. The present disclosure may include additional configuration that can be added to the above-described embodiments. The present disclosure also includes modifications which include partial components/elements of the above-described embodiments. The present disclosure includes replacements of components and/or elements between one embodiment and another embodiment, or combinations of components and/or elements between one embodiment and another embodiment. The technical scope disclosed in the present disclosure is not limited to the above-described embodiments.

In the above-described embodiments, the HCU 100 includes the sign icon ICs, the stop line icon ICl, and the arrival route icon ICr in the temporary stop content CTstop displayed as the non-superimposed content CTn. Alternatively, the HCU 100 may display, as the temporary stop content, at least one of the three icons, that is, the sign icon ICs, the stop line icon ICl, and the arrival route icon ICr The HCU 100 may display the content that notifies an existence of the temporary stop point SP by a character information image such as "stop point ahead" instead of the sign icon ICs.

In the above-described embodiments, the HCU 100 displays the sign icon ICs when displaying the temporary stop content CTstop as the superimposed content CTs. The temporary stop content CTstop as the superimposed content CTs is not limited to this configuration. For example, the HCU 100 may display a superimposed content CTs that highlights the temporary stop line, the temporary stop sign, and the like.

Figure 27:
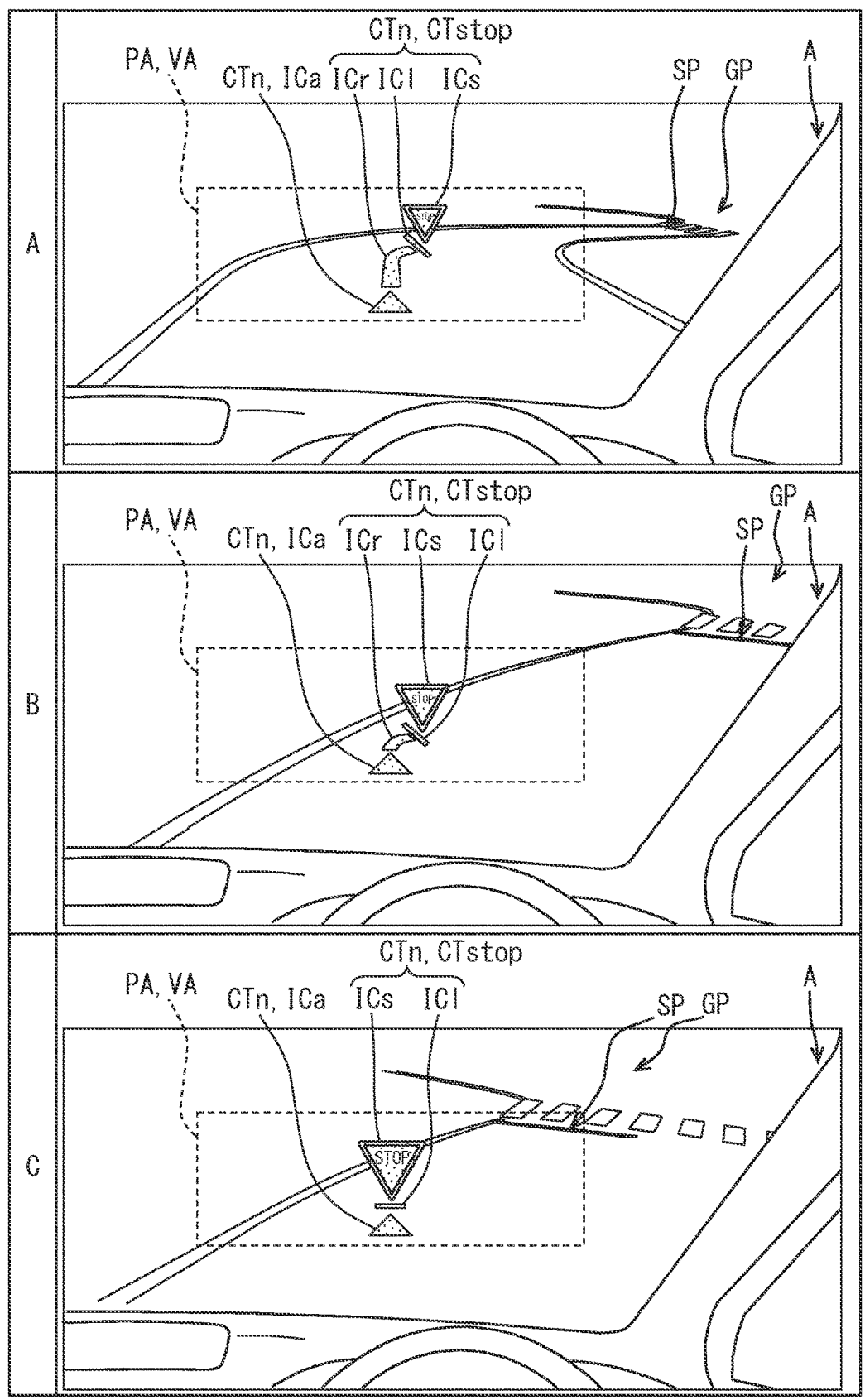
FIG. 27 is a diagram showing a display example of a temporary stop point as a non-superimposed content according to another embodiment of the present disclosure.

Instead of, or in addition to the embodiments described above, the HCU 100 may display an own vehicle icon ICa, which is the non-superimposed content CTn indicating the vehicle A, as shown in FIG. 27. For example, the own vehicle icon ICa may have a substantially triangular shape with one apex facing forward in the traveling direction. The HCU 100 may display an end of the arrival route icon ICr on the vehicle side by positioning it in front of the own vehicle icon ICa in the travelling direction. In this case, the HCU 100 display may display an animation that shortens the arrival route icon ICr with the traveling of vehicle A, and the end of the arrival route icon ICr positioned on the vehicle side with respect to the own vehicle icon ICa may be displayed in fixed manner. As a result, the HCU 100 can notify a proceeding degree of the vehicle A with respect to the temporary stop point SP to the driver in an easy-to-understand manner. Further, in this case, the HCU 100 may display the sign icon ICs in a larger size as the vehicle A proceeds toward the temporary stop point. As a result, the HCU 100 can more intuitively notify to the driver the proceeding degree of the vehicle A with respect to the temporary stop point SP.

The method for determining whether the superimposition target, such as the caution point CP is within the angle of view VA may be appropriately changed. Specifically, the virtual layout unit 108 may reproduce the traveling environment of the vehicle A in the virtual space based on various information provided by the virtual layout function, and determines whether the superimposition target is within the angle of view VA. As another example, a remaining distance or arrival time to an entrance of the superimposition target into the angle of view VA may be set in advance as a threshold value. Then, when determining an actual remaining distance or actual arrival time to the superimposition target estimated based on the position information and map data is equal to or shorter than the threshold value, the method may determine that the superimposition target is within the angle of view VA.

In the above-described embodiments, when the temporary stop content CTstop is displayed as the non-superimposed content CTn, the HCU 100 displays the temporary stop content in the frame content CTf. Alternatively, the HCU 100 may not display the frame content CTf, that is, display the temporary stop content without the frame content.

In the above-described embodiments, the HCU 100 deactivates display of the temporary stop content CTstop when the driver recognizes the temporary stop point SP in the display state of the temporary stop content CTstop as the superimposed content CTs. Instead, the HCU 100 may switch the temporary stop content CTstop to the non-superimposed content CTn when the driver recognizes the temporary stop point SP. In a case where the HCU 100 displays the temporary stop content CTstop as the non-superimposed content CTn, since the non-superimposed content CTn is fixed in the angle of view VA without movement different from the superimposed content which moves in the angle of view VA, moving objects within the angle of view VA can be reduced. With this configuration, the HCU 100 enables simple display within the angle of view VA.

In the above-described embodiments, the HCU 100 secures a display space in the angle of view VA by deactivating display of the route content CTr while displaying the temporary stop content CTstop. Instead of this configuration, the HCU 100 may secure a display space in the angle of view VA by displaying the route content CTr as the non-superimposed content CTn. In this case, the route content CTr may be displayed as an arrow image showing the traveling direction of the vehicle A at the guidance point GP, an image simply showing the planned travelling route at the guidance point GP, or the like.

In the first embodiment, the HCU 100 deactivates the display of route content CTr when displaying the temporary stop content CTstop. Instead of this configuration, the HCU 100 may display the temporary stop content CTstop together with the route content CTr.

In the above-described embodiments, the HCU 100 deactivates display of the route content CTr in a display state of temporary stop content CTstop, so that the temporary stop content is preferentially displayed over the route content. Instead of this configuration, the HCU 100 may be display the route content CTr with a lowered visibility in the display state of the temporary stop content CTstop. The HCU 100 may lower the visibility of the route content CTr by, for example, decreasing a brightness and increasing a transmittance of the route content.

In the above-described embodiments, the HCU 100 determines the risk level with a binary value showing high and low levels based on the vehicle speed and the like. Alternatively, the HCU 100 may determine the risk level based on other information. The risk level may be estimated in multiple levels or as a continuous value. In this configuration, the HCU 100 may change a logic of displaying the contents when the risk level exceeds a specific threshold value, and display, in superimposed manner, the caution content regardless of the presence or absence of a pedestrian and the regulation time zone.

In the above-described embodiments, the HCU 100 adjusts the superimposition position of the superimposed content according to the accuracy of the map data. The HCU 100 may be configured not adjust the superimposition position based on the accuracy of the map data. Further, only the high-precision map data or only the navigation map data may be used for drawing the superimposed contents.

In the above-described embodiments, the temporary stop point SP, the pedestrian crossing CW, and the school zone SZ are described as examples of the caution point CP. The examples of caution point CP is not limited to these. For example, a "no entry point" or the like may be set an attention target of the caution point CP. The position information of the "no entry point" may be registered in the navigation map data or the high-precision map data in the same manner as the temporary stop point SP or the like. The HCU 100 may set various points requiring attention as the caution point CP under a condition that the points requiring attention is registered in the map data in advance.

In the above-described embodiment, the display control function provided by the HCU 100 may be provided by another in-vehicle ECU mounted on the vehicle A. As an example, the display control function may be installed to the navigation ECU 62 of the navigation device 60. As another example, the display control function may be installed to the control circuit of the HUD 20. Further, the HCU 100 may be an electronic control device mounted on the vehicle A as a meter ECU.

The processor of the above-described embodiments is a processing unit including one or more central processing units (CPU). The processor may be provided by a processing unit which includes a graphics processing unit (GPU), a data flow processor (DFP), and the like in addition to the CPU. The processing unit and the processor may include a field programmable gate array (FPGA) and another IP core such as a neural network processing unit (NPU) specialized in specific processing such as learning and inference of artificial intelligence (AI). Each arithmetic circuit unit of the processor may be individually mounted on a printed circuit board, or may be mounted on an application specific integrated circuit (ASIC), an FPGA, or the like.

As a memory device for storing the display control program or the like, various non-transitory tangible storage medium, such as a flash memory and a hard disk can be adopted. The form of such a storage medium may be appropriately changed. For example, the storage medium may be in the form of a memory card or the like, and may be inserted into a slot portion provided in the in-vehicle ECU and electrically connected to the control circuit.

The control unit and method thereof according to the present disclosure may be implemented by one or more special-purposed computers. Such a special-purposed computer may be provided (i) by configuring (a) a processor and a memory programmed to execute one or more functions embodied by a computer program, or (ii) by configuring (b) a processor including one or more dedicated hardware logic circuits, or (iii) by configuring by a combination of (a) a processor and a memory programmed to execute one or more functions embodied by a computer program and (b) a processor including one or more dedicated hardware logic circuits. The technique for realizing the functions of each functional unit included in the HCU does not necessarily need to include software, and all the functions may be realized using one or more hardware circuits. Further, the computer program may be stored in a computer-readable non-transitory tangible storage medium as instructions to be executed by a computer.

The following additional notes are included as aspects of the above-described embodiments and modifications of the present disclosure.

(Note 1)

A display control device, which is used in a vehicle (A) to control a display on a head-up display (20), includes: a temporary stop determination unit (106) that determines whether a temporary stop point (SP) exists in front of the vehicle in a traveling direction of the vehicle; an angle of view determination unit (108) that determines whether the temporary stop point is included in an angle of view (VA) of the head-up display; and a display control unit (109) that displays a temporary stop content (CTstop) notifying an existence of the temporary stop point to an occupant of the vehicle in response to the temporary stop determination unit determining the existence of the temporary stop point.

When the angle of view determination unit determines that the temporary stop point is included in the angle of view, the display control unit displays the temporary stop content as a superimposed content (CTs), which is displayed with the temporary stop point as a superimposition target. When the angle of view determination unit determines that the temporary stop point is not included in the angle of view, the display control unit displays the temporary stop content as a non-superimposed content (CTn), which is displayed with no superimposition target.

(Note 2)

When the temporary stop point is included in the angle of view but the temporary stop point is estimated to be not visible by the occupant, the display control unit temporary stop content as the non-superimposed content.

(Note 3)

The display control device further includes a recognition determination unit that determines whether the temporary stop point is recognized by the occupant.

When the recognition determination unit determines that the temporary stop point is recognized by the occupant in a display state of the temporary stop content as the superimposed content, the display control unit (i) deactivates display of the temporary stop content as the superimposed content or (ii) changes the temporary stop content from the superimposed content to the non-superimposed content.

(Note 4)

The display control unit displays a route content (CTr) indicating a planned travelling route of the vehicle as the superimposed content, and the superimposed content is displayed with a road surface as a superimposition target.

When determining an existence of the temporary stop point in a display state of the route content as the superimposed content, the display control unit (i) deactivates display of the route content or (ii) changes the route content from the superimposed content to the non-superimposed content.

(Note 5)

When determining that the temporary stop point being recognized by the occupant (i) in a display deactivated state of the route content or (ii) a display state of the route content as the non-superimposed content, the display control unit restarts a display of the route content as the superimposed content.

(Note 6)

The display control unit displays the temporary stop content displayed as the non-superimposed content in a manner that the temporary stop content includes an arrival route content (ICr) indicating information about an arrival route to the temporary stop point.

(Note 7)

The display control unit displays the arrival route content that has a shape of the arrival route to the temporary stop point, and the display control unit displays the arrival route content in an animated manner that the shape of the arrival route content appears from the temporary stop point toward the vehicle.

(Note 8)

The display control unit increases an appearance speed of the arrival route content with an increase of a speed of the vehicle.

(Note 9)

A display control program used in a vehicle (A) to control a display on a head-up display (20) is provided as a program product stored in a computer-readable non-transitory tangible storage medium. The program product includes instructions to be executed by a processor (11). The instructions include: determining (S40) whether a temporary stop point (SP) exists in front of the vehicle in a travelling direction of the vehicle; determining whether the temporary stop point is included in an angle of view (VA) of the head-up display; in response to determining that the temporary stop point existing in front of the vehicle and the temporary stop point being included in the angle of view, displaying (S120) a temporary stop content (CTstop) as a superimposed content (CTs), which is displayed with the temporary stop point as a superimposition target, the temporary stop content indicating an existence of the temporary stop point; and in response to determining that the temporary stop point existing in front of the vehicle and the temporary stop point being not included in the angle of view, displaying (S130) the temporary stop content (CTstop) as a non-superimposed content (CTn), which is displayed with no superimposition target.

According to the above technical features, when the temporary stop point is included in the angle of view, the temporary stop content is displayed as the superimposed content, and when the temporary stop point is not included in the angle of view, the temporary stop content is displayed as the non-superimposed content. Thus, even when the temporary stop point is not included in the angle of view and the temporary stop content cannot be displayed as the superimposed content, the temporary stop content displayed as the non-superimposed content can notify existence of the temporary stop point to the occupant. As described above, it is possible to provide a display control device and a display control program product each of which is capable of displaying contents with improved convenience to the occupant.

What is claimed is:

1. A display control device used in a vehicle to control a display on a head-up display, the display control device comprising:
   a point determination unit determining whether a caution point exists in front of the vehicle along a traveling direction of the vehicle;
   an angle of view determination unit determining whether the caution point is included in an angle of view of the head-up display; and
   a display control unit displaying a caution content notifying an existence of the caution point to an occupant of the vehicle in response to the point determination unit determining the existence of the caution point,
   wherein
   the display control unit displays the caution content as a superimposed content, which is displayed with the caution point as a superimposition target, in response to the angle of view determination unit determining that the caution point is included in the angle of view,
   the display control unit displays the caution content as a non-superimposed content, which is displayed with no superimposition target, in response to the angle of view determination unit determining that the caution point is not included in the angle of view,
   the point determination unit determines a type of the caution point, and
   the display control unit notifies the existence of the caution point to the occupant by displaying the caution content associated with the type of the caution point determined by the point determination unit.

2. The display control device according to claim 1, wherein
   as the caution point, the point determination unit determines whether a temporary stop point exists in front of the vehicle along the traveling direction,
   in response to the point determination unit determining an existence of the temporary stop point, the display control unit displays the caution content indicating the existence of the temporary stop point,
   the point determination unit further determines whether the temporary stop point is related to a railroad crossing, and
   the display control unit displays the caution content in a manner that an emphasis degree of the temporary stop point indicated by the caution content is increased in a case where the temporary stop point is determined to be related to the railroad crossing by the point determination unit, compared with a case where the temporary stop point is determined to be not related to the railroad crossing.

3. The display control device according to claim 2, wherein
   as the caution point, the point determination unit determines whether a pedestrian crossing exists in front of the vehicle along the traveling direction,
   the display control unit determines whether a pedestrian exists on or around the pedestrian crossing, and
   in response to the point determination unit determining an existence of the pedestrian crossing and the display control unit determining an existence of the pedestrian on or around the pedestrian crossing, the display control unit displays the caution content that notifies the existence of the pedestrian crossing to the occupant.

4. The display control device according to claim 3, wherein
   the display control unit further determines whether a current time is a nighttime, and
   in response to determining the current time being the nighttime, the display control unit notifies the existence of the pedestrian crossing to the occupant by displaying the caution content regardless of the existence of the pedestrian on or around the pedestrian crossing.

5. The display control device according to claim 3, wherein
   the point determination unit further determines whether the pedestrian crossing has a traffic light, and
   in response to the point determination unit determining that the pedestrian crossing having the traffic light, the display control unit excludes the pedestrian crossing from a caution target which is required to be notified to the occupant by displaying the caution content.

6. The display control device according to claim 3, wherein
   the display control unit determines a risk level of the pedestrian crossing, and
   in response to determining that the risk level of the pedestrian crossing is higher than a threshold level, the display control unit notifies the existence of the pedestrian crossing to the occupant by displaying the caution content regardless of the existence of the pedestrian on or around the pedestrian crossing.

7. The display control device according to claim 1, wherein
   as the caution point, the point determination unit determines whether a pedestrian crossing exists in front of the vehicle along the traveling direction,
   the display control unit determines whether a pedestrian exists on or around the pedestrian crossing,
   in response to the point determination unit determining an existence of the pedestrian crossing and the display control unit determining an existence of the pedestrian on or around the pedestrian crossing, the display control unit displays the caution content that notifies the existence of the pedestrian crossing to the occupant,
   the display control unit further determines whether a current time is a nighttime, and
   in response to determining the current time being the nighttime, the display control unit notifies the existence of the pedestrian crossing to the occupant by displaying the caution content regardless of the existence of the pedestrian on or around the pedestrian crossing.

8. The display control device according to claim 7, wherein
the point determination unit further determines whether the pedestrian crossing has a traffic light, and
in response to the point determination unit determining that the pedestrian crossing having the traffic light, the display control unit excludes the pedestrian crossing from a caution target which is required to be notified to the occupant by displaying the caution content.

9. The display control device according to claim 1, wherein
as the caution point, the point determination unit determines whether a pedestrian crossing exists in front of the vehicle along the traveling direction,
the display control unit determines whether a pedestrian exists on or around the pedestrian crossing,
in response to the point determination unit determining an existence of the pedestrian crossing and the display control unit determining an existence of the pedestrian on or around the pedestrian crossing, the display control unit displays the caution content that notifies the existence of the pedestrian crossing to the occupant,
the point determination unit further determines whether the pedestrian crossing has a traffic light, and
in response to the point determination unit determining that the pedestrian crossing having the traffic light, the display control unit excludes the pedestrian crossing from a caution target which is required to be notified to the occupant by displaying the caution content.

10. The display control device according to claim 9, wherein
the display control unit determines a risk level of the pedestrian crossing, and
in response to determining that the risk level of the pedestrian crossing is higher than a threshold level, the display control unit notifies the existence of the pedestrian crossing to the occupant by displaying the caution content regardless of the existence of the pedestrian on or around the pedestrian crossing.

11. The display control device according to claim 1, wherein
as the caution point, the point determination unit determines whether a pedestrian crossing exists in front of the vehicle along the traveling direction,
the display control unit determines whether a pedestrian exists on or around the pedestrian crossing,
in response to the point determination unit determining an existence of the pedestrian crossing and the display control unit determining an existence of the pedestrian on or around the pedestrian crossing, the display control unit displays the caution content that notifies the existence of the pedestrian crossing to the occupant,
the display control unit determines a risk level of the pedestrian crossing, and
in response to determining that the risk level of the pedestrian crossing is higher than a threshold level, the display control unit notifies the existence of the pedestrian crossing to the occupant by displaying the caution content regardless of the existence of the pedestrian on or around the pedestrian crossing.

12. The display control device according to claim 11, wherein
as the caution point, the point determination unit determines whether a temporary stop point exists in front of the vehicle along the traveling direction, and
in response to the point determination unit determining an existence of the temporary stop point, the display control unit displays the caution content indicating the existence of the temporary stop point.

13. The display control device according to claim 12, wherein
the point determination unit further determines whether the temporary stop point is related to a railroad crossing, and
the display control unit displays the caution content in a manner that an emphasis degree of the temporary stop point indicated by the caution content is increased in a case where the temporary stop point is determined to be related to the railroad crossing by the point determination unit, compared with a case where the temporary stop point is determined to be not related to the railroad crossing.

14. The display control device according to claim 12, wherein
the display control unit determines a risk level of the temporary stop point, and
the display control unit displays the caution content in a manner that an emphasis degree of the temporary stop point indicated by the caution content increases with an increase of the risk level of the temporary stop point.

15. The display control device according to claim 11, wherein
as the caution point, the point determination unit determines whether a school zone exists in front of the vehicle along the travelling direction,
the display control unit determines whether a current time is included in a regulation time zone during which traffic regulation of the school zone is effective, and
in response to the point determination unit determining an existence of the school zone and the display control unit determining that the current time is included in the regulation time zone, the display control unit displays the caution content that notifies the existence of the school zone to the occupant.

16. The display control device according to claim 15, wherein
the display control unit determines a risk level of the school zone, and
in response to determining that the risk level of the school zone is higher than a threshold level, the display control unit notifies the existence of the school zone to the occupant by displaying the caution content even though the current time is not included in the regulation time zone.

17. The display control device according to claim 1, wherein
as the caution point, the point determination unit determines whether a school zone exists in front of the vehicle along the travelling direction,
the display control unit determines whether a current time is included in a regulation time zone during which traffic regulation of the school zone is effective,
in response to the point determination unit determining an existence of the school zone and the display control unit determining that the current time is included in the regulation time zone, the display control unit displays the caution content that notifies the existence of the school zone to the occupant,
the display control unit further determines a risk level of the school zone, and
in response to determining that the risk level of the school zone is higher than a threshold level, the display control unit notifies the existence of the school zone to the occupant by displaying the caution content even though the current time is not included in the regulation time zone.

18. The display control device according to claim 17, wherein
as the caution point, the point determination unit determines whether a temporary stop point exists in front of the vehicle along the traveling direction, and
in response to the point determination unit determining an existence of the temporary stop point, the display control unit displays the caution content indicating the existence of the temporary stop point.

19. The display control device according to claim 18, wherein
the display control unit determines a risk level of the temporary stop point, and
the display control unit displays the caution content in a manner that an emphasis degree of the temporary stop point indicated by the caution content increases with an increase of the risk level of the temporary stop point.

20. The display control device according to claim 17, wherein
as the caution point, the point determination unit determines whether a pedestrian crossing exists in front of the vehicle along the traveling direction,
the display control unit determines whether a pedestrian exists on or around the pedestrian crossing, and
in response to the point determination unit determining an existence of the pedestrian crossing and the display control unit determining an existence of the pedestrian on or around the pedestrian crossing, the display control unit displays the caution content that notifies the existence of the pedestrian crossing to the occupant.

21. The display control device according to claim 17, further comprising
a control information acquisition unit that acquires control information output from a vehicle speed control unit, wherein
the vehicle speed control unit controls a traveling speed of the vehicle, and
in response to the vehicle speed control unit executing a deceleration control before the caution point, the display control unit displays a deceleration notification content with an execution section of the deceleration control as a superimposition target.

22. The display control device according to claim 21, wherein
in response to the vehicle speed control unit executing the deceleration control before the caution point, the display control unit further displays an emphasis content with the caution point as a superimposition target, and
the emphasis content indicates the caution point in a higher emphasized manner compared with the caution content.

23. The display control device according to claim 21, wherein
in a display state of the deceleration notification content, the display control unit restricts a display of the caution content.

24. A display control device used in a vehicle to control a display on a head-up display, the display control device comprising:
a point determination unit determining whether a caution point exists in front of the vehicle along a traveling direction of the vehicle;
an angle of view determination unit determining whether the caution point is included in an angle of view of the head-up display;
a display control unit displaying a caution content notifying an existence of the caution point to an occupant of the vehicle in response to the point determination unit determining the existence of the caution point; and
a control information acquisition unit that acquires control information output from a vehicle speed control unit, the vehicle speed control unit controlling a traveling speed of the vehicle,
wherein
the display control unit displays the caution content as a superimposed content, which is displayed with the caution point as a superimposition target, in response to the angle of view determination unit determining that the caution point is included in the angle of view,
the display control unit displays the caution content as a non-superimposed content, which is displayed with no superimposition target, in response to the angle of view determination unit determining that the caution point is not included in the angle of view, and
the display control unit displays a deceleration notification content with an execution section of the deceleration control as a superimposition target, in response to the vehicle speed control unit executing a deceleration control before the caution point.

25. The display control device according to claim 24, wherein
in response to the vehicle speed control unit executing the deceleration control before the caution point, the display control unit further displays an emphasis content with the caution point as a superimposition target, and
the emphasis content indicates the caution point in a higher emphasized manner compared with the caution content.

26. The display control device according to claim 25, wherein
in a display state of the deceleration notification content, the display control unit restricts a display of the caution content.

27. The display control device according to claim 24, wherein
in a display state of the deceleration notification content, the display control unit restricts a display of the caution content.

28. The display control device according to claim 27, wherein
the point determination unit determines a type of the caution point, and
the display control unit notifies the existence of the caution point to the occupant by displaying the caution content associated with the type of the caution point determined by the point determination unit.

29. The display control device according to claim 28, wherein
as the caution point, the point determination unit determines whether a temporary stop point exists in front of the vehicle along the traveling direction, and
in response to the point determination unit determining an existence of the temporary stop point, the display control unit displays the caution content indicating the existence of the temporary stop point.

30. The display control device according to claim 29, wherein
the display control unit determines a risk level of the temporary stop point, and the display control unit displays the caution content in a manner that an emphasis degree of the temporary stop point indicated by the caution content increases with an increase of the risk level of the temporary stop point.

31. The display control device according to claim 28, wherein
as the caution point, the point determination unit determines whether a pedestrian crossing exists in front of the vehicle along the traveling direction,
the display control unit determines whether a pedestrian exists on or around the pedestrian crossing, and
in response to the point determination unit determining an existence of the pedestrian crossing and the display control unit determining an existence of the pedestrian on or around the pedestrian crossing, the display control unit displays the caution content that notifies the existence of the pedestrian crossing to the occupant.

32. The display control device according to claim 28, wherein
as the caution point, the point determination unit determines whether a school zone exists in front of the vehicle along the travelling direction,
the display control unit determines whether a current time is included in a regulation time zone during which traffic regulation of the school zone is effective, and
in response to the point determination unit determining an existence of the school zone and the display control unit determining that the current time is included in the regulation time zone, the display control unit displays the caution content that notifies the existence of the school zone to the occupant.

33. The display control device according to claim 27, further comprising
a map accuracy determination unit that determines an accuracy of map data used for drawing the superimposed content,
wherein
the display control unit increases a distance from the caution point to a superimposition position of the superimposed content with a decrease of the accuracy of map data used for drawing the superimposed content, and
the superimposition position of the superimposed content is positioned before the caution point toward the vehicle.

34. The display control device according to claim 27, wherein
the caution content displayed as the superimposed content in superimposed manner on the caution point is referred to as a first superimposed content,
the display control unit further prepares a second superimposed content with a related object as a superimposition target,
the related object is an object related to the caution point and is positioned before the caution point,
the angle of view determination unit further determines whether the related object is included in the angle of view, and
in response to the angle of view determination unit determining that the related object being included in the angle of view, the display control unit displays the second superimposed content that is superimposed on the related object of the caution point.

35. A display control program product used in a vehicle to control a display on a head-up display, the display control program product being stored in a computer-readable non-transitory tangible storage medium, the display control program product includes instructions to be executed by a processor, the instructions comprising:
determining whether a caution point exists in front of the vehicle along a traveling direction of the vehicle;
determining a type of the caution point;
determining whether the caution point is included in an angle of view of the head-up display;
in response to determining that the caution point existing in front of the vehicle and being included in the angle of view, displaying a caution content as a superimposed content, which is displayed with the caution point as a superimposition target, the caution content indicating an existence of the caution point and being displayed associated with the determined type of the caution point; and
in response to determining that the caution point existing in front of the vehicle and being not included in the angle of view, displaying the caution content as a non-superimposed content, which is displayed with no superimposition target, the caution content being displayed associated with the determined type of the caution point.

36. A display control program product used in a vehicle to control a display on a head-up display, the display control program product being stored in a computer-readable non-transitory tangible storage medium, the display control program product includes instructions to be executed by a processor, the instructions comprising:
determining whether a caution point exists in front of the vehicle along a traveling direction of the vehicle;
determining whether the caution point is included in an angle of view of the head-up display;
acquiring control information output from a vehicle speed control unit, the vehicle speed control unit controlling a traveling speed of the vehicle;
in response to determining that the caution point existing in front of the vehicle and being included in the angle of view, displaying a caution content as a superimposed content, which is displayed with the caution point as a superimposition target, the caution content indicating an existence of the caution point;
in response to determining that the caution point existing in front of the vehicle and being not included in the angle of view, displaying the caution content as a non-superimposed content, which is displayed with no superimposition target; and
in response to the vehicle speed control unit executing a deceleration control before the caution point, the display control unit displays a deceleration notification content with an execution section of the deceleration control as a superimposition target.

\* \* \* \* \*